US007253920B2

(12) United States Patent
Hosoda

(10) Patent No.: US 7,253,920 B2
(45) Date of Patent: Aug. 7, 2007

(54) DATA PROCESSING APPARATUS AND IMAGE RECORDING APPARATUS, METHOD FOR CONTROLLING DATA PROCESSING APPARATUS AND METHOD FOR CONTROLLING IMAGE RECORDING APPARATUS, AND STORAGE MEDIUM

(75) Inventor: Yuichi Hosoda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 817 days.

(21) Appl. No.: 09/739,373

(22) Filed: Dec. 19, 2000

(65) Prior Publication Data

US 2001/0022662 A1 Sep. 20, 2001

(30) Foreign Application Priority Data

Dec. 20, 1999 (JP) ................................ 11-361720

(51) Int. Cl.
*G06F 15/00* (2006.01)
*G06K 1/00* (2006.01)

(52) U.S. Cl. ...................... 358/1.9; 358/1.15; 358/1.16

(58) Field of Classification Search ................. 358/1.9, 358/1.1, 1.11-1.18; 399/1, 403
See application file for complete search history.

(56) References Cited

U.S. PATENT DOCUMENTS 5,815,764 A * 9/1998 Tomory ......................... 399/1
5,898,592 A * 4/1999 Salgado et al. ............. 700/214
6,141,111 A * 10/2000 Kato ......................... 358/1.15
6,292,267 B1 * 9/2001 Mori et al. ................ 358/1.15

FOREIGN PATENT DOCUMENTS

EP 936536 A2 * 8/1999

* cited by examiner

*Primary Examiner*—Gabriel I. Garcia
*Assistant Examiner*—Thierry L. Pham
(74) *Attorney, Agent, or Firm*—Fitzpatrick, Cella, Harper & Scinto

(57) ABSTRACT

A mailbox sheet discharge designation environment which flexibly deals with various requests from each user and inhibits a user's load is provided. In this environment, a host computer registers plural discrimination names including a user name and names of plural groups to which a user corresponding to the user name belongs for each of plural holding units of an image recording apparatus, and then transmits a printing job including sheet discharge address designation by the plural registered discrimination names to the image recording apparatus. The image recording apparatus registers in a memory the plural discrimination names transmitted from the host computer to each of the holding units, and then discharges the printing job to the holding unit to which the discrimination name same as the discrimination name designated to the printing job has been registered.

17 Claims, 33 Drawing Sheets

FIG. 1

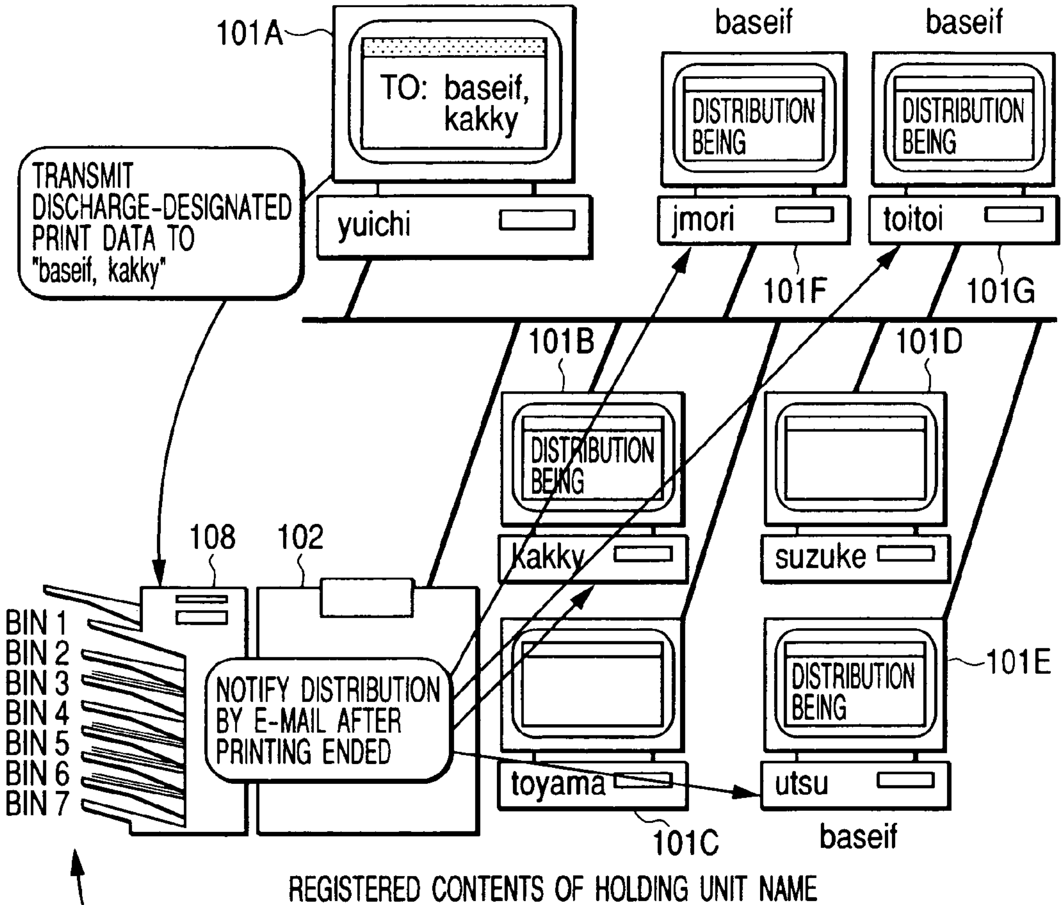

REGISTERED CONTENTS OF HOLDING UNIT NAME

| | |
|---|---|
| BIN 1 | yuichi,sch,kannnon<br>yuichi@xxx.kannnon.co.jp |
| BIN 2 | kakky,sch,kannnon<br>kakky@xxx.kannnon.co.jp |
| BIN 3 | toyama,sch,kannnon<br>toyama@yyy.kannnon.co.jp |
| BIN 4 | suzuke,sch,kannnon<br>suzuke@yyy.kannnon.co.jp |
| BIN 5 | utsu,baseif,kannnon<br>utsu@xxx.kannnon.co.jp |
| BIN 6 | jmori,baseif,kannnon<br>jmori@xxx.kannnon.co.jp |
| BIN 7 | toitoi,baseif,kannnon<br>toitoi@xxx.kannnon.co.jp |

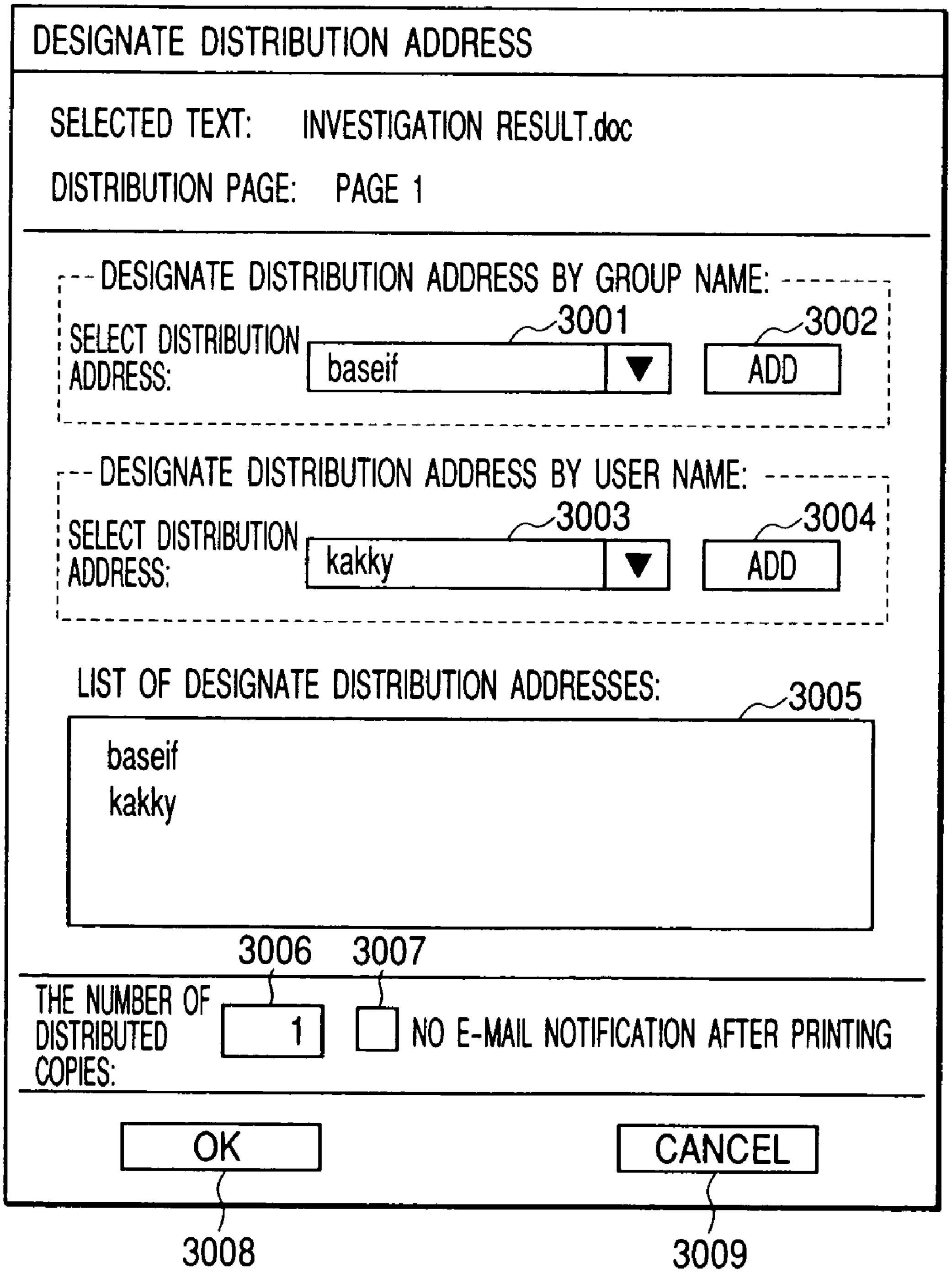

FIG. 4

```
DESIGNATE DISTRIBUTION ADDRESS
───────────────────────────────────────────────
SELECTED TEXT:    INVESTIGATION RESULT.doc
DISTRIBUTION PAGE:   PAGE 1
───────────────────────────────────────────────
  ┌─ DESIGNATE DISTRIBUTION ADDRESS BY GROUP NAME: ─┐
  │                        3001          3002      │
  │ SELECT DISTRIBUTION  [baseif    ▼]  [ ADD ]    │
  │ ADDRESS:                                        │
  └─────────────────────────────────────────────────┘

  ┌─ DESIGNATE DISTRIBUTION ADDRESS BY USER NAME: ──┐
  │                        3003          3004      │
  │ SELECT DISTRIBUTION  [kakky     ▼]  [ ADD ]    │
  │ ADDRESS:                                        │
  └─────────────────────────────────────────────────┘

  LIST OF DESIGNATE DISTRIBUTION ADDRESSES:  3005
  ┌────────────────────────────────────────────┐
  │ baseif                                     │
  │ kakky                                      │
  │                                            │
  └────────────────────────────────────────────┘
                     3006    3007
 THE NUMBER OF      ┌─────┐ ┌──┐
 DISTRIBUTED        │  1  │ │  │ NO E-MAIL NOTIFICATION AFTER PRINTING
 COPIES:            └─────┘ └──┘
───────────────────────────────────────────────
       [    OK    ]              [  CANCEL  ]
            3008                      3009
```

FIG. 12A

| JOB ID |
|---|
| 1 |
| 2 |
| 3 |
| 4 |

FIG. 12B

| JOB ID |
|---|
| 1 |
| 2 |
| 3 |
| 4 |
| 5 |

ADD OF JOB 5 → 5

FIG. 12C

| JOB ID |
|---|
| 2 |
| 3 |
| 4 |
| 5 |

→ END OR CANCEL OF JOB 1 PRINTING

FIG. 16

VC ··· VIDEO CONTROLLER
EC ··· ENGINE CONTROLLER

| SIGNAL NAME | DIRECTION | CONTENTS |
|---|---|---|
| /CPRDY | VC→EC | SIGNAL REPRESENTING THAT VIDEO CONTROLLER 103 IS IN STATE ENABLING TO COMMUNICATE WITH ENGINE CONTROLLER 105 |
| /PPRDY | VC←EC | SIGNAL REPRESENTING THAT ENGINE CONTROLLER 105 IS IN STANDBY STATE ENABLING TO COMMUNICATE WITH VIDEO CONTROLLER 103 |
| /RDY | VC→EC | SIGNAL REPRESENTING THAT ENGINE CONTROLLER 105 IS IN STANDBY STATE ENABLING TO PERFORM PRINTING |
| /PRNT | VC→EC | SIGNAL CAUSING VIDEO CONTROLLER 103 TO ISSUE PRINTING REQUEST TO ENGINE CONTROLLER 105 |
| /VSREQ | VC←EC | SIGNAL CAUSING ENGINE CONTROLLER 105 TO REQUEST VERTICAL SYNC SIGNAL TO VIDEO CONTROLLER 103 |
| /VSYNC | VC→EC | VERTICAL SYNC SIGNAL CAUSING VIDEO CONTROLLER 103 TO PERFORM OUTPUT TO ENGINE CONTROLLER 105 |
| /BD | VC←EC | HORIZONTAL SYNC SIGNAL CAUSING ENGINE CONTROLLER 105 TO PERFORM OUTPUT TO VIDEO CONTROLLER 103 |
| /CCRT | VC←EC | SIGNAL INFORMING VIDEO CONTROLLER 103 OF STATE CHANGE BY BECOMING "TRUE" WHEN CONTENT OF STATUS NOT DIRECTLY CONCERNING RDY SIGNAL CHANGES |
| /SCLK | VC→EC | SYNC CLOCK SIGNAL FOR SERIAL COMMUNICATION |
| /CMD | VC→EC | COMMAND SIGNAL CAUSING VIDEO CONTROLLER 103 TO ISSUE INSTRUCTION TO ENGINE CONTROLLER 105 |
| /CBSY | VC→EC | STROBE SIGNAL FOR COMMAND OUTPUT |
| /STS | VC←EC | SIGNAL REPRESENTING STATUS IN ENGINE UNIT PERFORMING OUTPUT TO COMMAND FROM VIDEO CONTROLLER 103 |
| /SBSY | VC←EC | SIGNAL FOR STATUS OUTPUT |

FIG. 17

VC ··· VIDEO CONTROLLER
OC ··· OPTION CONTROLLER
EC ··· ENGINE CONTROLLER

| SIGNAL NAME | DIRECTION | CONTENTS |
|---|---|---|
| SERIAL COMMUNICATION I/F | VC↔OC | I/F PERFORMING SHEET FEED DESIGNATION TO SHEET FEED OPTION, SHEET DISCHARGE BIN DESIGNATION TO SHEET DISCHARGE OPTION, COMMAND DESIGNATION, ETC. THROUGH SHARED MEMORY |
| /OPTRDY | VC←OC | SIGNAL REPRESENTING READY STATE FOR FUNCTION OF DESIGNATED OPTION APPARATUS |
| /POUTT | EC→OC | TIMING SIGNAL FOR CAUSING PRINTER BODY TO DISCHARGE RECORDING SHEET |
| /PFEDT | EC→OC | TIMING SIGNAL FOR CAUSING PRINTER BODY TO RECEIVE RECORDING SHEET FROM OPTION UNIT |
| /SPCNG | EC→OC | SIGNAL FOR SLOWING DOWN RECORDING SHEET HIGH-SPEED CARRIED IN OPTION APPARATUS TO MATCH IT WITH CARRYING SPEED OF PRINTER BODY |

FIG. 29

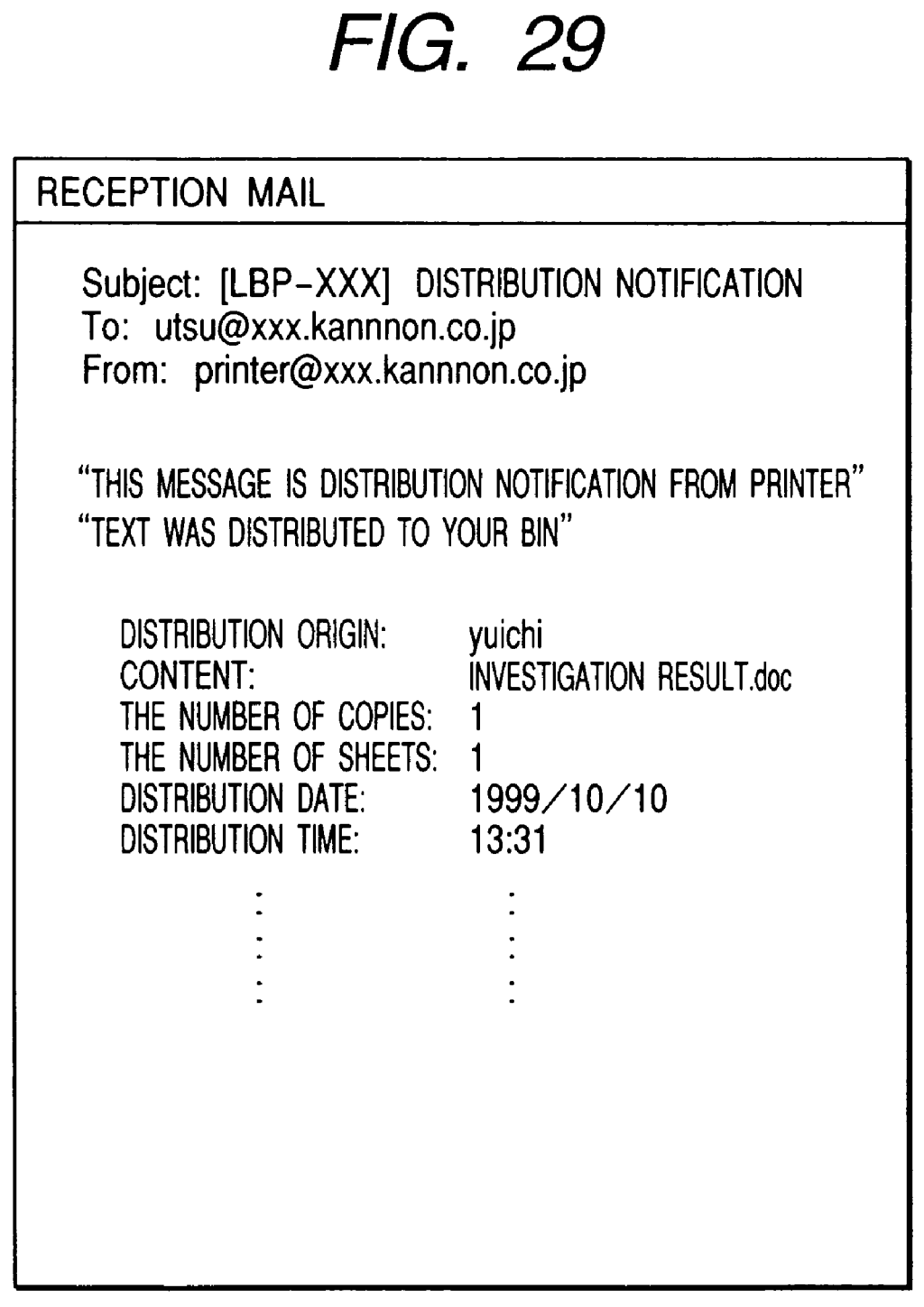

RECEPTION MAIL

Subject: [LBP-XXX] DISTRIBUTION NOTIFICATION
To: utsu@xxx.kannnon.co.jp
From: printer@xxx.kannnon.co.jp "THIS MESSAGE IS DISTRIBUTION NOTIFICATION FROM PRINTER"
"TEXT WAS DISTRIBUTED TO YOUR BIN"

| | |
|---|---|
| DISTRIBUTION ORIGIN: | yuichi |
| CONTENT: | INVESTIGATION RESULT.doc |
| THE NUMBER OF COPIES: | 1 |
| THE NUMBER OF SHEETS: | 1 |
| DISTRIBUTION DATE: | 1999/10/10 |
| DISTRIBUTION TIME: | 13:31 |
| ⋮ | ⋮ |

FIG. 32

STORAGE MEDIUM SUCH AS FD, CD-ROM, ETC.

| DIRECTORY INFORMATION |
|---|
| 1ST DATA PROC PROGRAM<br>A GROUP OF PROGRAM CODES CORRESPONDING TO STEPS IN FLOW CHARTS OF FIGS. 7 AND 8 |
| 2ND DATA PROC PROGRAM<br>A GROUP OF PROGRAM CODES CORRESPONDING TO STEPS IN FLOW CHART OF FIG. 9 |
| 3RD DATA PROC PROGRAM<br>A GROUP OF PROGRAM CODES CORRESPONDING TO STEPS IN FLOW CHART OF FIG. 11 |
| 4TH DATA PROC PROGRAM<br>A GROUP OF PROGRAM CODES CORRESPONDING TO STEPS IN FLOW CHART OF FIG. 20 |
| 5TH DATA PROC PROGRAM<br>A GROUP OF PROGRAM CODES CORRESPONDING TO STEPS IN FLOW CHART OF FIG. 21 |
| 6TH DATA PROC PROGRAM<br>A GROUP OF PROGRAM CODES CORRESPONDING TO STEPS IN FLOW CHART OF FIG. 26 |
| 7TH DATA PROC PROGRAM<br>A GROUP OF PROGRAM CODES CORRESPONDING TO STEPS IN FLOW CHART OF FIG. 27 |
| 8TH DATA PROC PROGRAM<br>A GROUP OF PROGRAM CODES CORRESPONDING TO STEPS IN FLOW CHART OF FIG. 28 |
| 9TH DATA PROC PROGRAM<br>A GROUP OF PROGRAM CODES CORRESPONDING TO STEPS IN FLOW CHART OF FIG. 30 |
| 10TH DATA PROC PROGRAM<br>A GROUP OF PROGRAM CODES CORRESPONDING TO STEPS IN FLOW CHART OF FIG. 31 |

MEMORY MAP OF STORAGE MEDIUM

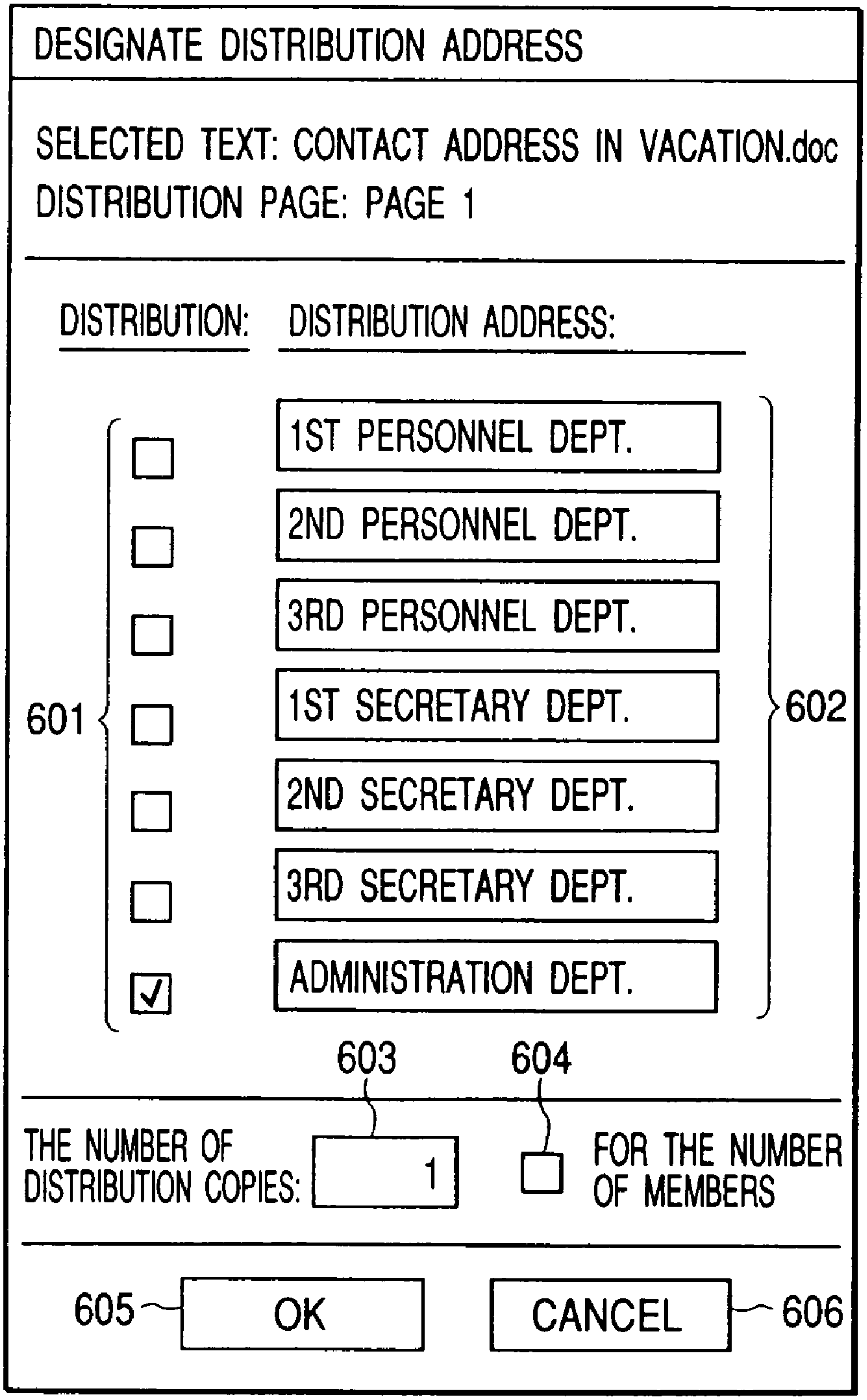

FIG. 35

```
DESIGNATE DISTRIBUTION ADDRESS

SELECTED TEXT: CONTACT ADDRESS IN VACATION.doc
DISTRIBUTION PAGE: PAGE 1
```

| DISTRIBUTION: | DISTRIBUTION ADDRESS: |
|---|---|
| ☐ | 1ST PERSONNEL DEPT. |
| ☐ | 2ND PERSONNEL DEPT. |
| ☐ | 3RD PERSONNEL DEPT. |
| ☐ | 1ST SECRETARY DEPT. |
| ☐ | 2ND SECRETARY DEPT. |
| ☐ | 3RD SECRETARY DEPT. |
| ☑ | ADMINISTRATION DEPT. |

601 — checkboxes column
602 — distribution address column

THE NUMBER OF DISTRIBUTION COPIES: [1] (603)   ☐ FOR THE NUMBER OF MEMBERS (604)

605 — OK        CANCEL — 606

DATA PROCESSING APPARATUS AND IMAGE RECORDING APPARATUS, METHOD FOR CONTROLLING DATA PROCESSING APPARATUS AND METHOD FOR CONTROLLING IMAGE RECORDING APPARATUS, AND STORAGE MEDIUM

BACKGROUND OF THE INVENTION

1. Field of the Invention

The present invention relates to a data processing apparatus which can transmit a printing job to an image recording apparatus having plural holding units for holding sheets (or paper) on which images are formed or to an image recording apparatus to which an option apparatus having plural holding units can be connected, and an image recording apparatus, a method for controlling a data processing apparatus, a method for controlling an image recording apparatus, and a storage medium.

2. Related Background Art

In recent years, computers are connected to each other by a LAN (local area network), and LAN connection is possible not only for printers but also for various peripheral apparatuses such as a multifunctional image processing apparatus and the like equipped with copying and facsimile functions.

In a conventional image recording apparatus, various sheet discharge methods such as mailbox sheet discharge, job separate sheet discharge, sort sheet discharge and stack sheet discharge are being proposed in a network environment connected to a LAN, an environment to which a sheet discharge option unit having plural holding units is connected, or a case where the body of the image recording apparatus has plural holding units.

The mailbox sheet discharge and the job separate sheet discharge are the sort methods in which a peculiar name is set for each of the holding units provided in the image recording apparatus, and the holding unit is distinguished and a sheet discharge address (or a sheet discharge destination) is determined on the basis of such the set name.

The difference between the mailbox sheet discharge and the job separate sheet discharge is as follows. Namely, in the mailbox sheet discharge, the distinguished name previously registered for each holding unit of the image recording apparatus is designated as the sheet discharge address when printing is performed, whereby it is possible to designated the sheet discharge address with a name easily distinguishable by a user. On the other hand, in the job separate sheet discharge, a user name being a printing designation origin is automatically registered to a holding unit on which any sheet is not stacked yet while printing is being performed, and the holding unit registered in the first-time printing is retrieved if the printing designation is again issued by the same user, and the sheet is discharged to the retrieved holding unit. Thus, even if the apparent sheet discharge address is not designated by the user in the printing, it is possible to appropriately sort a printing job for each user.

Further, the sort sheet discharge is the sheet discharge method in which copies of a printing job are sorted to holding units whose number corresponds to the designated copies, by using the plural continuous holding units. The stack sheet discharge is the sheet discharge method in which copies of a printing job keep being discharged to an identical holding unit until this holding unit becomes full of the sheets, and when this holding unit is full of the sheets the holding unit is changed to a next-priority holding unit and similar sheet discharge is performed to this changed holding unit.

Hereinafter, a mailbox sheet discharge mode in such various sheet discharge modes as above will be especially explained with reference to FIGS. 33, 34 and 35.

FIG. 33 is a diagram for explaining the concept of the sort of the printing job in the mailbox sheet discharge mode.

In FIG. 33, the image recording apparatus is connected to a network shared by plural users and used in the mailbox sheet discharge mode.

When a user A is the manager who manages the setting and the like for the image recording apparatus, this user A registers, as mailbox addresses, names easily recognizable by the user such as “first personnel department”, “second personnel department”, “third personnel department”, “first secretary department”, “second secretary department”, “third secretary department” and “administration department” respectively for the holding units (bins 1 to 7), on a user interface (UI) shown in later-described FIG. 34.

When each holding unit of the image recording apparatus is registered with a post name, one bin acts as the mailbox shared by the plural users belonging to the post registered for this bin. Thus, in order to be able to distribute an identical text in the number corresponding to the number of belonging users, the number of group members (i.e., belonging users) can be registered for each holding unit.

By previously registering the number of group members, when the printing is performed, the copies in the number of group members can be distributed to the registration-target bin on the basis of the name of the distribution address.

In the state that the image recording apparatus is used in the mailbox sheet discharge mode, for example, when a data output address (or a data output destination) is designated on a screen as shown in later-described FIG. 35 and the printing is then performed, the printing (i.e., the copy) designated by the user A is discharged to the “bin 7” registered with the name “administration department” as shown in FIG. 33.

As described above, in the mailbox sheet discharge mode, for the printing job in which the sheet discharge address is designated based on the holding unit name, the holding unit whose name coincident with the designated holding unit name has been previously registered is retrieved and the sheet discharge is then performed through the retrieved holding unit. Thus, it is thought to exclusively control the holding units for the plural users who share the network.

FIG. 34 is a diagram schematically showing an example of a holding unit name registration screen for the image recording apparatus. FIG. 34 is corresponding to an UI screen on which a driver on a host computer registers a name for each holding unit of the image recording apparatus so as to use the image recording apparatus in the mailbox sheet discharge mode.

In FIG. 34, numeral 501 denotes fixed holding unit display area. For example, in this area, the fixed holding units such as “bin 1”, “bin 2”, “bin 3”, . . . , and “bin 7” previously registered in the memory of the image recording apparatus and captured by the host computer of the user A are displayed.

Numeral 502 denotes a holding unit name registration area. The holding unit names (a user name, a group name, a post name, and the like: discrimination information representing an owner using the holding unit) such as “first personnel department”, “second personnel department”, “third personnel department”, “first secretary department”, “second secretary department”, “third secretary department” and “administration department” respectively corresponding to the fixed holding units (“bin 1”, “bin 2”, “bin 3”, and “bin 7”) of the image recording apparatus displayed in the fixed holding unit display area 501 and easily recognizable by the user as mailbox addresses (or mailbox destinations) can be input by using a not-shown keyboard of the host computer or selected from among the plural holding unit names previously stored in a not-shown ROM or another recording medium, and the obtained holding unit names can be then registered in the holding unit name registration area 502.

Further, as shown in FIG. 34, when the holding unit of the printer is registered based on the post name, one bin acts as the mailbox shared by the plural users belonging to the post registered for this bin. Thus, in order to be able to distribute an identical text in the number corresponding to the number of belonging users, the number of group members (i.e., belonging users) can be registered for each holding unit.

Numeral 503 denotes a group member number registration area. The number of members (users) belonging to the group registered in the holding unit name registration area 502 can be input by the keyboard (not-shown) of the host computer, and the obtained number of members can be then registered in the group member number registration area 503.

As described above, in the printing, since the number of members belonging to the group is previously registered, the copies the number of which corresponds to the number of the belonging members of this group can be automatically distributed to the registered corresponding bin by only designating the name of the distribution address.

Numeral 504 denotes an OK key. By indicating the OK key 504 with a not-shown pointing device of the host computer, actual registration of the content on the holding unit name registration screen is validated, and this screen ends. Numeral 505 denotes a cancel key. By indicating the cancel key 505 with a not-shown pointing device of the host computer, the registration of the content on the holding unit name registration screen is invalidated, and this screen ends.

As the name registered in the mailbox sheet discharge as the holding unit name, i.e., as the name registered in the holding unit name registration area 502, in addition to such the post names as shown in FIG. 34, discrimination information representing owners (e.g., user names, group names or the like) who use the holding units is efficient.

Hereinafter, the UI of a printer driver for designating the mailbox sheet discharge will be explained with reference to FIG. 35.

FIG. 35 is a diagram schematically showing an example of a distribution address designation screen for designating the distribution of the mailbox sheet discharge. The distribution address designation screen is displayed on a display unit of the host computer by the printer driver on the host computer.

In FIG. 35, numeral 602 denotes a distribution address display area in which all the distribution addresses are displayed by the holding unit names registered on the holding unit name registration screen shown in FIG. 34. Numeral 601 denotes distribution designation check boxes. By pointing the check box with the not-shown pointing device of the host computer, it is possible to designate whether there is a distribution or not can be indicated to each distribution address displayed in the distribution address display area 602.

Numeral 603 denotes a number of distribution copies input area. By inputting the number in this input area with a not-shown keyboard of the host computer, the input number of texts (or documents) can be distributed to the distribution addresses to which distribution is instructed by the distribution designation check box 601. Numeral 604 denotes a distribution for all members designation check box. By pointing this check box with the not-shown pointing device of the host computer, the number of texts for the number of group members of each distribution address (the number of group members registered in the number of group members registering area 503 shown in FIG. 34) can be distributed to the distribution addresses to which the distribution is instructed in the distribution designation check box 601.

Further, when the distribution for all members designation check box 604 is checked, the designation in the number of distribution input area 603 is invalidated.

Numeral 605 denotes an OK key. By pointing this key with the not-shown pointing device of the host computer, the designation of the mailbox sheet discharge designation screen is validated, and this screen ends. Numeral 606 denotes a cancel key. By pointing this key with the not-shown pointing device of the host computer, the designation of the mailbox sheet discharge designation screen is invalidated, and this screen ends.

However, in the abovementioned mailbox sheet discharge mode, there is a possibility that the following problems occur.

For example, when the holding unit names are registered as the post names such as "first personnel department", "second personnel department", and "third personnel department" as shown in FIG. 34 and used as shown in FIG. 33, it is assumed that a user B has the request that it wants to distribute the printing job to one specific user X of "first personnel department".

At this time, the user B designates the distribution address to be "first personnel department" and the number of copy to be "1" in such the designation manner as shown in FIG. 35, and then performs the printing. In order to surely pass the copy (printing job) to the user X, it is thought that the user B needs work of reporting to the user X the distribution of the copy to the holding unit of "first personnel department" after the printing process such that other users in "first personnel department" do not remove the distributed and discharged copy.

However, when the copy is often distributed only to the specific user, it is inconvenient for the user B to contact the specific user at each printing. Thus, there is some fear that the operation in the mailbox sheet discharge mode becomes inconvenient oppositely.

On the other hand, when the user name is used as the name to be registered as the holding unit name in the mailbox sheet discharge mode, it is assumed that a user C has the request that it wants to distribute the printing job to all the users of "first personnel department".

At this time, the user C must designate the names of all the users of "first personnel department" as the distribution addresses, whereby it is inconvenient for the user C if it is necessary to frequently perform such a designation operation. Thus, there is some fear that the operation in the mailbox sheet discharge mode becomes inconvenient oppositely.

As described above, in the form of merely allocating the owner to the bin beforehand and then, at the printing, designating the owner's name of the usable bin to discharge the copy to the designated bin, it is impossible to flexibly deal with the various requests from each user. Thus, in order to fill the request, it depends on the operation by the operator who issued the request, whereby there is a possibility that the load inconveniently rests upon the user.

Further, if the holding unit name which has been registered for the corresponding holding unit according to user's favor can be changed by everyone, there is some fear that the exclusive control of the holding unit which is the essential purpose of the mailbox is stultified.

SUMMARY OF THE INVENTION

An object of the present invention is to provide data processing and image recording apparatuses which solved the abovementioned problems, methods for controlling the data processing and recording apparatuses, and a storage medium.

Another object of the present invention is to provide data processing and image recording apparatuses which can provide a flexible mailbox sheet discharge designation environment for flexibly dealing with various requests from each user and inhibiting a user's load, methods for controlling the data processing and recording apparatuses, and a storage medium.

Other objects and features of the present invention will be clarified through the following description in the specification and the attached drawings.

BRIEF DESCRIPTION OF THE DRAWINGS

FIG. 1 is a diagram schematically showing a sorting method of an image recording system to which a data processing apparatus and an image recording apparatus according to the first embodiment of the present invention are applicable;

FIG. 4 is a diagram schematically showing an example of the distribution address designation screen at the time when a user designates the mailbox sheet discharge to a printer driver on a host computer to perform printing in a mailbox sheet discharge mode;

FIGS. 12A, 12B and 12C are explanatory diagrams schematically showing a job reading table shown in FIG. 10;

FIG. 16 is a diagram schematically showing signals exchanged between a video controller (VC) and an engine controller (EC);

FIG. 17 is a diagram schematically showing signals exchanged among the video controller (VC), the engine controller (EC) and an option controller (OC);

FIG. 29 is a diagram schematically showing an example of the content of an E-mail transmitted to a user at the distribution address after the printing in the mailbox sheet discharge mode ended;

FIG. 32 is a diagram schematically showing a memory map of a storage medium storing various kinds of control process programs that can be read out by the data processing apparatus and the image recording apparatus according to the present invention;

FIG. 35 is a diagram schematically showing an example of the distribution address designation screen for designating the distribution in the mailbox sheet discharge.

DESCRIPTION OF THE PREFERRED EMBODIMENTS

First Embodiment

Figure 2:
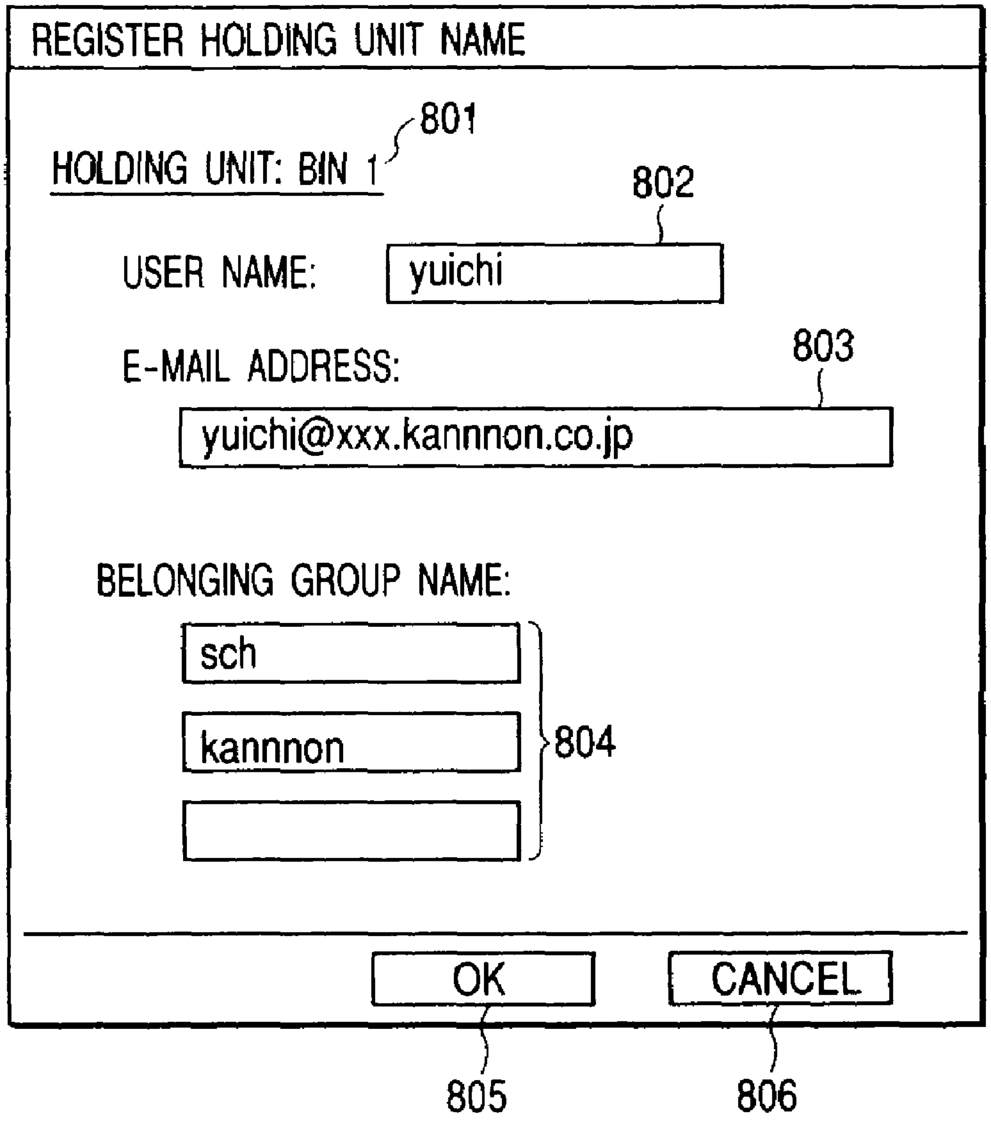
FIG. 2 is a diagram schematically showing an example of a holding unit name registration screen of the image recording apparatus shown in FIG. 1.

Hereinafter, one embodiment of the present invention will now be described.

FIG. 1 is a diagram schematically showing a sorting method of an image recording system to which a data processing apparatus and an image recording apparatus according to the first embodiment of the present invention are applicable. Especially, in a case where the image recording apparatus in which a user name, an E-mail address and plural group names are registered to each holding unit is used in a mailbox sheet discharge mode (a detailed setting method for such parameters will be described later), concept of a sorting process in a printing job whose distribution address is designated by the user name or the group name and a sheet discharge notification process will be explained in FIG. 1.

Hereinafter, actual use of the image recording apparatus will be explained with reference to FIG. 1.

In FIG. 1, numeral 102 denotes an image recording apparatus (a printer) which is connected to host computers (external apparatuses) 101A, 101B, 101C, 101D, 101E, 101F and 101G (also called host computers 101 simply hereinafter) of plural users such as "yuichi", "kakky", "toyama", "suzuke", "utsu", "jmori" and "toitoi" through a predetermined communication medium such as a local interface defined by IEEE1284 or the like or a network interface such as Ethernet. The image recording apparatus 102 performs image recording on a recording medium on the basis of image information transmitted from each host computer, and then discharges the recording medium to bins 1 to 7 of a sheet discharge option unit 108. Further, the image recording apparatus 102 is used in the mailbox sheet discharge mode as a sheet discharge mode.

In the image recording apparatus 102, the name of a user, the E-mail address of this user and the names of the plural groups to which this user belongs are registered according to an image recording apparatus environment setting application on the host computer of FIG. 2 later described, by a manager who manages environment setting or the like for the image recording apparatus (the detail of the registration method for the bin will be described later).

Figure 3:
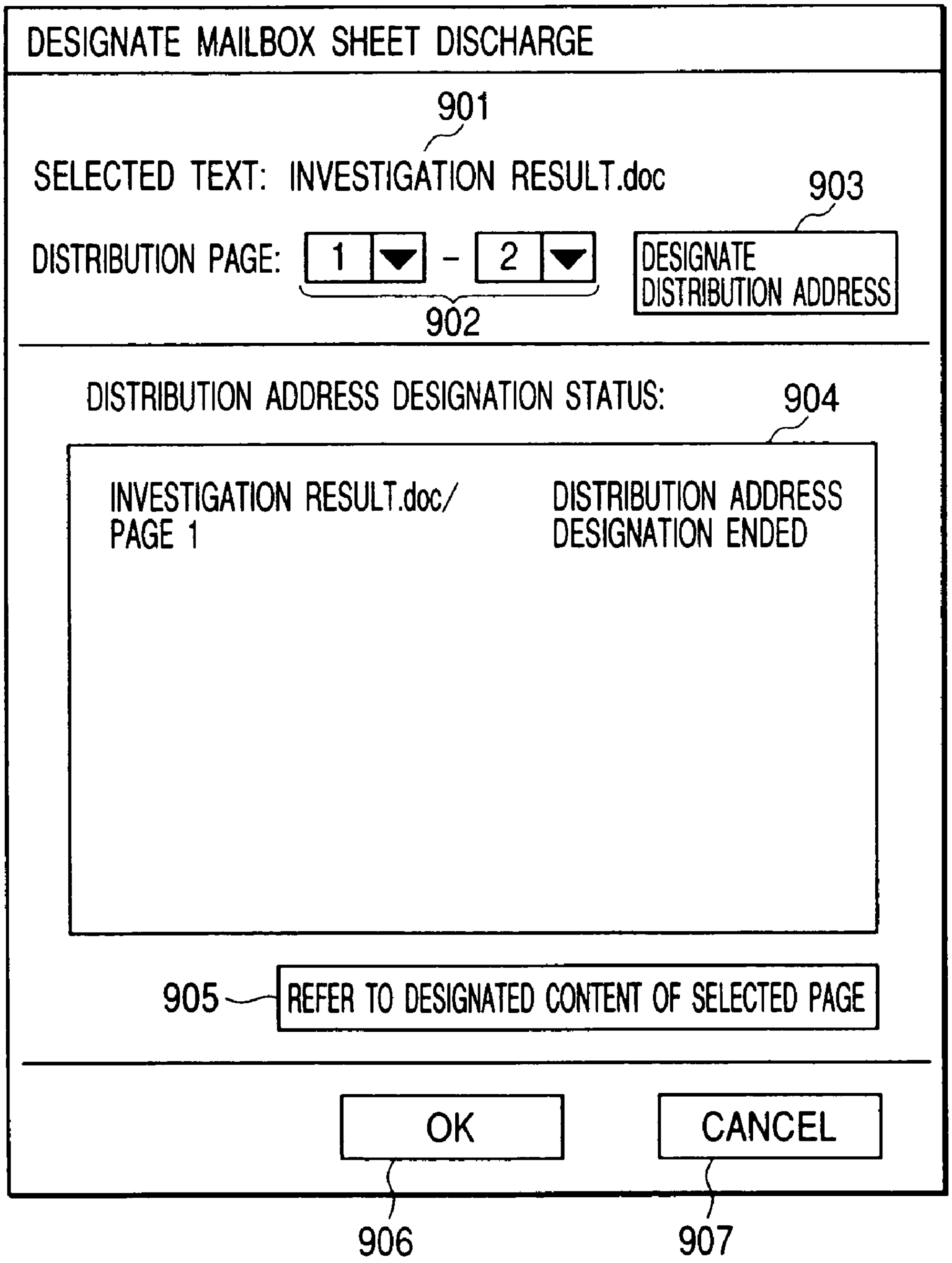
FIG. 3 is a diagram schematically showing an example of a distribution address designation screen by which distribution designation of mailbox sheet discharge is performed for the image recording apparatus shown in FIG. 1.

In such an environment setting situation, when the user "yuichi" distributes printed materials to each user belonging to the group "baseif" and the user "kakky" in the mailbox sheet discharge mode (i.e., printing data from the host computer 101A is distributed to the bins 5, 6 and 7 grouped and registered by the name of "baseif" and also discharged to the bin 1 registered by the name of "kakky"), the sheet discharge address (or destination) on a printer driver as shown in FIGS. 3 and 4 on the host computer by using the user name and the group name previously registered by the manager.

Since plural discrimination names including the user name and the group name are registered for each holding unit of the image recording apparatus, the user can designate the distribution address by using either the user name or the group name. When the printed material is distributed and discharged at the specific holding unit, such the specific holding can be conventionally designated only by using either one of the user name and the group name, in dependence on the discrimination names at the name registration time. However, in the image recording system according to the present invention, the distribution address can be designated even by using an individual name or a group name like a mailing list, as well as address designation by E-mail.

In FIG. 1, although the distribution address is designated by "baseif" and "kakky", it is of course possible to designate "utsu", "jmori", "toitoi" and "kakky" or another manner.

When the printing execution designation is performed by the user in the mailbox sheet discharge mode, the image recording apparatus performs a sheet discharge process of the printing job to the holding unit whose name is the same as the discrimination name designated as the sheet discharge address.

In FIG. 1, the printing job is discharged to "bin 5", "bin 6" and "bin 7" registered by the group name "baseif" and to "bin 2" registered by the user name "kakky".

Further, after the sheet discharge process ended, the image recording apparatus notifies by E-mail the users whose names have been registered as the user names at the respective holding units to which the printing job was discharged, that the printed material was distributed to the holding units in question from the user "yuichi" by referring to the registered E-mail addresses.

Thus, the user who received the E-mail from the image recording apparatus can easily know when the printed material of what content was distributed from whom to the holding unit registered by his/her name. Also, the user at the printing origin can surely notifies the users at the distribution addresses of his distribution.

It should be noted that plural holding units may be provided on the body of the image recording apparatus 102, or an option unit such as the sheet discharge option unit 108 shown in FIG. 1 having the plural holding units may be connected to the body of the image recording apparatus 102.

Hereinafter, name registration and printing designation in the mailbox sheet discharge on the host computer will be explained in detail with reference to FIGS. 2, 3 and 4.

FIG. 2 is a diagram schematically showing an example of a holding unit name registration screen of the image recording apparatus 102 shown in FIG. 1. This holding unit name registration screen corresponds to one example of a UI (user interface) by which a user registers the holding unit name for the image recording apparatus setting application on the host computer 101 to enable the printing in the mailbox sheet discharge mode.

In FIG. 2, the manager who performs the environment setting or the like for the image recording apparatus 102 registers to the holding units (i.e., the bins 1 to 7) the holding unit names used as the sheet discharge addresses in the printing of the mailbox sheet discharge.

Numeral 801 denotes a name-registered holding unit display area where the bin whose name is registered on the holding unit name registration screen is displayed. Numeral 802 denotes a user name input area where the user name to be set to the mailbox in correspondence with the holding unit displayed at the name-registered holding unit display area 801 is input by a not-shown keyboard or the like.

Numeral 803 denotes an E-mail address input area where the E-mail address of the user input in the user name input area 802 is input by a not-shown keyboard or the like of the host computer. Numeral 804 denotes a belonging group name input area where the names of the plural groups to which the user input in the user name input area 802 belongs are input by a not-shown keyboard or the like of the host computer.

Numeral 805 denotes an OK key. By pointing this key with a not-shown pointing device of the host computer, the registration of the holding unit name registration screen is validated, and this screen ends. Numeral 806 denotes a cancel key. By pointing this key with a not-shown pointing device of the host computer, the registration of the holding unit name registration screen is invalidated, and this screen ends.

The shown example corresponds to the UI screen on which the user name registration for "bin 1" is performed.

When "bin 1" is set to be the mailbox for the user "yuichi", the manager describes "yuichi" in the user name input area 802 in the state that the name-registered holding unit display area 801 displays "bin 1", and further describes the E-mail address "yuichi@xxx.kannnon.co.jp" of the user "yuichi" in the E-mail address input area 803.

When the user "yuichi" belongs to the groups "sch" and "kannnon", the respective group names are described in the belonging group name input area 804 as shown in FIG. 2. Thus, in the printing of the mailbox sheet discharge, even if "yuichi" is designated as the distribution address or "sch" or "kannnon" is designated as the distribution address, the printing job can be discharged to the holding unit "bin 1".

It should be noted that the input to the user name input area 802, the E-mail address input area 803 and the belonging group name input area 804 can be achieved by respectively displaying a group of user names, a group of E-mail addresses and a group of belonging groups stored in a not-shown other storage medium and selecting necessary items with a not-shown pointing device, a keyboard or the like.

Then, in addition to the setting for "bin 1", the manager performs the setting for each of other bins in the same manner on the screen shown in FIG. 2. Such the bin registration information which includes the user name, the E-mail address, the belonging group and the like and is set for each bin is transmitted from the host computer 101 of the manager to the image recording apparatus 102 through the network and then stored and held in a memory (e.g., a later-described EEPROM (electrically erasable programmable read-only memory) 410 in FIG. 18) in the image recording apparatus 102.

Further, it should be noted that the discrimination name (the user name, the E-mail address, and the belonging group) of each holding unit of the image recording apparatus 102 may be directly input (or registered) from a later-described panel unit 104 of the image recording apparatus 102 shown in FIG. 13.

FIG. 3 is a diagram schematically showing an example of the distribution address designation screen on which the distribution designation in the mailbox sheet discharge for the image recording apparatus 102 shown in FIG. 1 is performed. This screen is displayed on the display unit of the host computer 101 by the print driver on the host computer 101. The user who requests the printing can perform the setting to distribute his/her printing data to the desired bin through the screens shown in FIGS. 3, 4 and the like displayed on his/her computer.

In FIG. 3, numeral 901 denotes a selected text (or document) display area in which a file name of a selected text to be printed in the data stored in the setting user's computer is displayed. The setting for text selection concerning which data should be printed is performed on a not-shown screen before this screen is displayed. Here, a case where "investigation result.doc" is selected is shown. Numeral 902 denotes a distribution page selection area in which a distribution start page and a distribution end page can be selected (i.e., the setting from what page to what page of the text displayed in the area 901 should be distributed is performed in the area 902). Numeral 903 denotes a distribution address designation button. By pointing this button with a not-shown pointing device of the host computer 101, a distribution address designation screen shown in later-described FIG. 4 is displayed and the distribution of the page selected in the distribution page selection area 902 can be designated.

Numeral 904 denotes a distribution address designation status display area in which the designation status of a distribution address for each page is displayed. Numeral 905 denotes a designated content of selected page reference button. By pointing this button with a not-shown pointing device of the host computer 101, a designated content of selected page reference screen (not shown) is displayed and the designated content of the page selected in the distribution page selection area 902 can be referred to. For example, FIG. 3 shows that the bin to which the printing data of the page 1 of the text whose name is displayed in the display area 901 has been already determined.

Numeral 906 denotes an OK key. By pointing this key with a not-shown pointing device of the host computer 101, the designation of the mailbox sheet discharge designation screen is validated, and this screen ends. Numeral 907 denotes a cancel key. By pointing this key with a not-shown pointing device of the host computer 101, the designation of the mailbox sheet discharge designation screen is invalidated, and this screen ends.

In this example shown, the user who performs the printing in the mailbox sheet discharge designates the distribution page selection area 902 intended to be designated with the same distribution address for the printed text by using the start page and end page, and further designates the distribution address on the UI screen (the distribution address designation screen shown in later-described FIG. 4) displayed by using the distribution address designation button 903.

After the distribution address was designated, the designated pages of the text to be printed of which destination address was designated are displayed with a message "distribution address designation ended" in the list of the distribution address designation status display area 904. When the distribution address content designated is again referred to after the distribution address was designated, the designation page to be referred to is selected from the list, and thus the content can be confirmed by the designated content of selected page reference button 905.

FIG. 4 is a diagram schematically showing an example of the distribution address designation screen at the time when the user designates the mailbox sheet discharge to the printer driver on the host computer to perform the printing in the mailbox sheet discharge mode. By pointing the distribution address designation button 903 of FIG. 3, this screen is displayed on the display unit of the host computer 101 (101A to 101G) of FIG. 1 with use of the printer driver on the host computer 101. The information which is displayed on the screen of FIG. 4 displayed on the host computer 101 of the printing-requesting user and concerns the bin to be selected by this user is actually displayed on this screen by previously reading the bin registration information from the memory of the image recording apparatus 102, transmitting the read information through the network and generating the actual display data based on the transmitted bin registration information.

In FIG. 4, numeral 3001 denotes a distribution address selection area by group name in which the distribution address is designated by the belonging group name registered on the holding unit name registration screen shown in FIG. 2. Numeral 3002 denotes a distribution address add key by group name. By depressing this key, the distribution address selected in the distribution address selection area by group name 3001 is added to the designated distribution address and additionally displayed in a distribution address designation list display area 3005.

In such a bin registration state as shown in FIG. 1, candidates of the groups capable of being designated by the user displayed in the area 3001 is three, i.e., "sch", "baseif" and "kannnon". By operating the area 3001 with use of a pointer or the like, desired one of these three groups can be selected. Further, by using the key 3002, even the plural groups can be designated.

Here, when "sch" is designated and the printing job is entered in the image recording apparatus 102 by the printing-requesting user, the image recording apparatus 102 prints four sets of output sheaves based on the received one printing job and then distributes each set to each of the bins 1 to 4 belonging to the group "sch". Further, when "baseif" is designated and the printing job is entered in the image recording apparatus 102, the image recording apparatus 102 prints three sets of output sheaves based on the received one printing job and then distributes each set to each of the bins 5 to 7 belonging to the group "baseif". Further, when "kannnon" is designated and the printing job is entered in the image recording apparatus 102, the image recording apparatus 102 prints seven sets of output sheaves based on the received one printing job and then distributes each set to each of the bins 1 to 7 belonging to the group "kannnon". As described above, it is possible to designate at least one distribution address in the unit of group, through the area 3001 and the key 3002.

Numeral 3003 denotes a distribution address selection area by user name in which the distribution address is designated by the user name registered on the holding unit name registration screen shown in FIG. 2. Numeral 3004 denotes a distribution address add key by user name. By depressing this key, the distribution address selected in the distribution address selection area by user name 3003 is added to the designated distribution address and additionally displayed in the distribution address designation list display area 3005.

In such the bin registration state as shown in FIG. 1, candidates of the distribution addresses capable of being designated by the user displayed in the area 3003 is seven, i.e., "yuichi", "kakky", "toyama", "suzuke", "utsu", "jmori" and "toitoi". By operating the area 3003 with use of a pointer or the like, desired one of these seven candidates can be selected. Further, by using the key 3004, even the bins of the plural users can be designated.

As described above, it is possible to designate at least one distribution address in the unit of user through the area 3003 and the key 3004 (one bin being designated as one user).

Then, it is possible to collect the plural kinds of distribution address designation including the distribution address designation in the unit of group with use of the area 3001 and the key 3002 (the plural bins being designated as one group) and the distribution address designation in the unit of user with use of the area 3003 and the key 3004 (one bin being designated as one user), based on the setting by the user input through the screen shown in FIG. 4, and set one instruction obtained by collecting the plural kinds of distribution address designation in one printing job. The user confirms such a setting situation in the area 3005.

For example, in the area 3005, the group name "baseif" and the user name "kakky" have been entered. In this state, if the printing execution instruction is issued by the user, the host computer generates the instruction which includes the instruction to distribute the printing data to the bins belonging to the group "baseif" and the instruction to distribute the printing data to the bin corresponding to the user "kakky", sets together with the image data to be printed the generated distribution address designation data to the printing job, and then transits the obtained printing job to the image recording apparatus 102 through the network. The image recording apparatus 102 which received the printing job prints the total four sets of output sheaves (three sets+one set) from one printing job, and distributes one set of recording sheet sheaf to each of the bins 5 to 7 belonging to the group "baseif" and one set of recording sheet sheaf to the bin 2 corresponding to the user "kakky".

It is not necessary to designate both the distribution address by group name and the distribution address by user name as the sheet discharge address. Namely, the user can freely designate either one of the group name and the user name or both the group name and the user name.

Numeral 3006 denotes a number of distribution copies input area. By inputting the number in this area with a not-shown keyboard of the host computer 101, the input number of texts (or documents) can be distributed to the distribution addresses additionally displayed in the distribution address designation list display area 3005.

Numeral 3007 denotes an E-mail notification/non-notification check box. By pointing this check box with use of a not-shown pointing device of the host computer 101, an E-mail notification to the distribution address after the printing ended can be refused. As shown in the screen of FIG. 4, when the printing job is entered in the image recording apparatus 102 in the state that the check box 3007 is not pointed, the image recording apparatus 102 transmits distribution notification information to the computers 101E, 101F and 101G of the users "utsu", "jmori" and "toitoi" belonging to the group "baseif" and the computer 101B of the user "kakky" through the network as soon as the printing process ends, so as to notify the corresponding users of the distribution. Here, for example, the distribution notification information includes a message that the printing data was distributed to the users's bin, information for specifying whose data was distributed, a distribution time and the like as shown in FIG. 29.

Numeral 3008 denotes an OK key. By pointing this key with a not-shown pointing device of the host computer 101, the designation of the distribution address designation screen is validated, and this screen ends. Numeral 3009 denotes a cancel key. By pointing this key with a not-shown pointing device of the host computer 101, the designation of the distribution address designation screen is invalidated, and this screen ends.

As described above, the plural discrimination names registered in the image recording apparatus 102 are captured from this apparatus 102 and displayed in each of the distribution address selection area by group name 3001 and the distribution address selection area by user name 3003 by a printer driver unit 2102 shown in later-described FIG. 5, and the desired one of the displayed names is selected by a pointing device, a keyboard and the like not shown.

Further, it is assumed that, according to a request from the host computer, a CPU 409 (shown in later-described FIG. 18) in the image recording apparatus 102 notifies through the network the host computer of plural discrimination names registered in an EEPROM 410 (shown in FIG. 18) on the basis of a program stored in a ROM 404 (shown in FIG. 18) or other not-shown storage medium.

In FIG. 4, in order to designate the distribution address for the page "1" of the text "investigation result.doc", the user designates the name selected from the distribution address selection list in the distribution address selection area by group name 3001 by using the distribution address add key by group name 3002 (in case of distributing the data to a group), or designates the name selected from the distribution address selection list in the distribution address selection area by user name 3002 by using the distribution address add key by user name 3004 (in case of distributing the data to an individual user).

Here, the group "baseif" is designated in the distribution address selection area by group name 3001 and the user "kakky" is designated in the distribution address selection area by user name 3002, and the content of the designated distribution addresses is displayed in the distribution address designation list display area 3005.

When the number of copies to be distributed to the designated distribution address is designated, the number is described in the number of distribution copies input area 3006, and when the E-mail notification to the distribution address after the printing ended is refused, the E-mail notification/non-notification check box 3006 is checked.

Further, the identical discrimination name can be registered to the plural holding units.

As described above, by performing the holding unit name registration and the printing designation in the mailbox sheet discharge on the host computer 101, the sorting process in the printing job and the sheet discharge notification process shown in FIG. 1 can be achieved.

Hereinafter, the present embodiment will be explained in detail.

A process on the host computer 101 of the image recording system will first be described with reference to FIGS. 5, 6, 7, 8 and 9.

Figure 5:
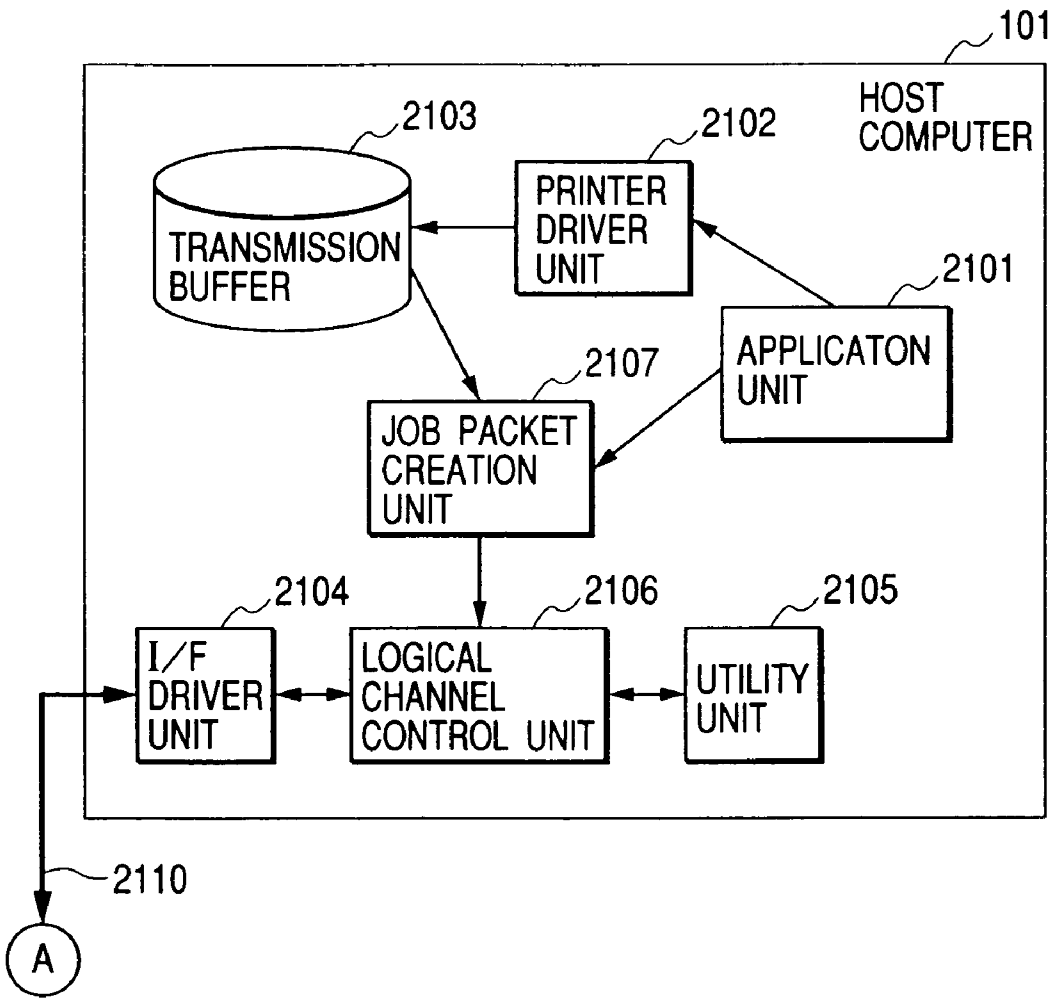
FIG. 5 is a block diagram for explaining the structure of a data processing apparatus according to the first embodiment of the present invention.

FIG. 5 is a block diagram showing a structure of the data processing apparatus according to the first embodiment of the present invention, and realizes the mechanisms of transmitting a printing job from the host computers 101A to 101D (hereinafter referred simply as the host computer 101) to the image recording apparatus 102, obtaining information of the image recording apparatus 102 and performing environmental setting in the image recording system shown in FIG. 1.

As shown in the drawing, the image recording system is composed of the host computer 101 for generating a job to be printed, the image recording apparatus 102 for actually printing on a sheet, a predetermined interface 2110 and an interface 2211 shown in later-described FIG. 10.

The interface 2110 and the interface 2211 shown in later-described FIG. 10 may be either a local interface defined by IEEE1284 or a network interface such as Ethernet, and in the present embodiment, a case of the local interface will be described as an example.

In FIG. 5, numeral 2101 denotes an application unit with which a user generates desired printing data by operating a graphic user interface. Numeral 2102 denotes a printer driver unit which converts image data prepared by the application unit 2101 to page descriptive language (hereinafter abbreviated as PDL) data that can be printed by the image recording apparatus 102.

Numeral 2103 denotes a transmission buffer which temporarily stores the PDL data converted by the printer driver unit 2102. Numeral 2107 denotes a job packet creation unit which creates a predetermined job packet from the PDL data stored in the transmission buffer 2103 and job attribute information held by the application unit 2101. Numeral 2105 denotes a utility unit which converts the requests of operations such as confirmation of the status of the image recording apparatus 102 and the printing status of the transmitted printing job, cancellation of the printing job and interruption to a management packet that the image recording apparatus 102 can interpret using the graphic user interface.

Numeral 2106 denotes a logical channel control unit which assigns the job packet and the management packet to different channels respectively and performs duplexing of a transport layer in an OSI (open systems interconnection) seven hierarchies. Numeral 2104 denotes an I/F driver unit which converts logical data to an electrical signal and exchanges signals with the interface.

As described above, the host computer 101 is composed of the application unit 2101, the printer driver unit 2102, the transmission buffer 2103, the job packet creation unit 2107, the utility unit 2105, the logical channel control unit 2106 and the I/F driver unit 2104 and the like.

Further, each unit in the host computer 101 may be composed of a dedicated hardware respectively or may be composed of a CPU, a ROM or other storage media storing a program to be executed by a CPU, a RAM, an EEPROM, a hard disk and the like.

Further, considering that data transmission to be performed from the logical channel control unit 2106 of the host computer 101 to a logical channel control unit 2202 (shown in later-described FIG. 10) of the image recording apparatus 102 is applied a duplexing of a transport layer level by the defined protocols by, namely, the TCP/IP in the case of a network and the IEEE1284/IEEE1284.4 in the case of a local, a detailed description is omitted.

A job packet to be transmitted from the job packet creation unit 2107 logically is received by a job preprocessor unit 2203 (shown in later-described FIG. 10) of the image recording apparatus 102. The route is called a job channel, and a management packet transmitted and received by the utility unit 2105 is transmitted and received by an information management unit 2210 (shown in later-described FIG. 10) of the image recording apparatus 102. This route is called a control channel.

Both the channels are defined to be capable of two-way communications, however, as far as the job channel is concerned, only one-way communication from the host computer to the image recording apparatus does not hamper the present embodiment.

The job channel and the control channel are duplexed at the transport layer level in the OSI seven hierarchies, and the flow process of the one does not affect the other.

Next, structures of a job packet and a management packet of the image recording system to which the data processing apparatus and the image recording apparatus of the present invention can be applied will now be described with reference to FIG. 6.

Figure 6:
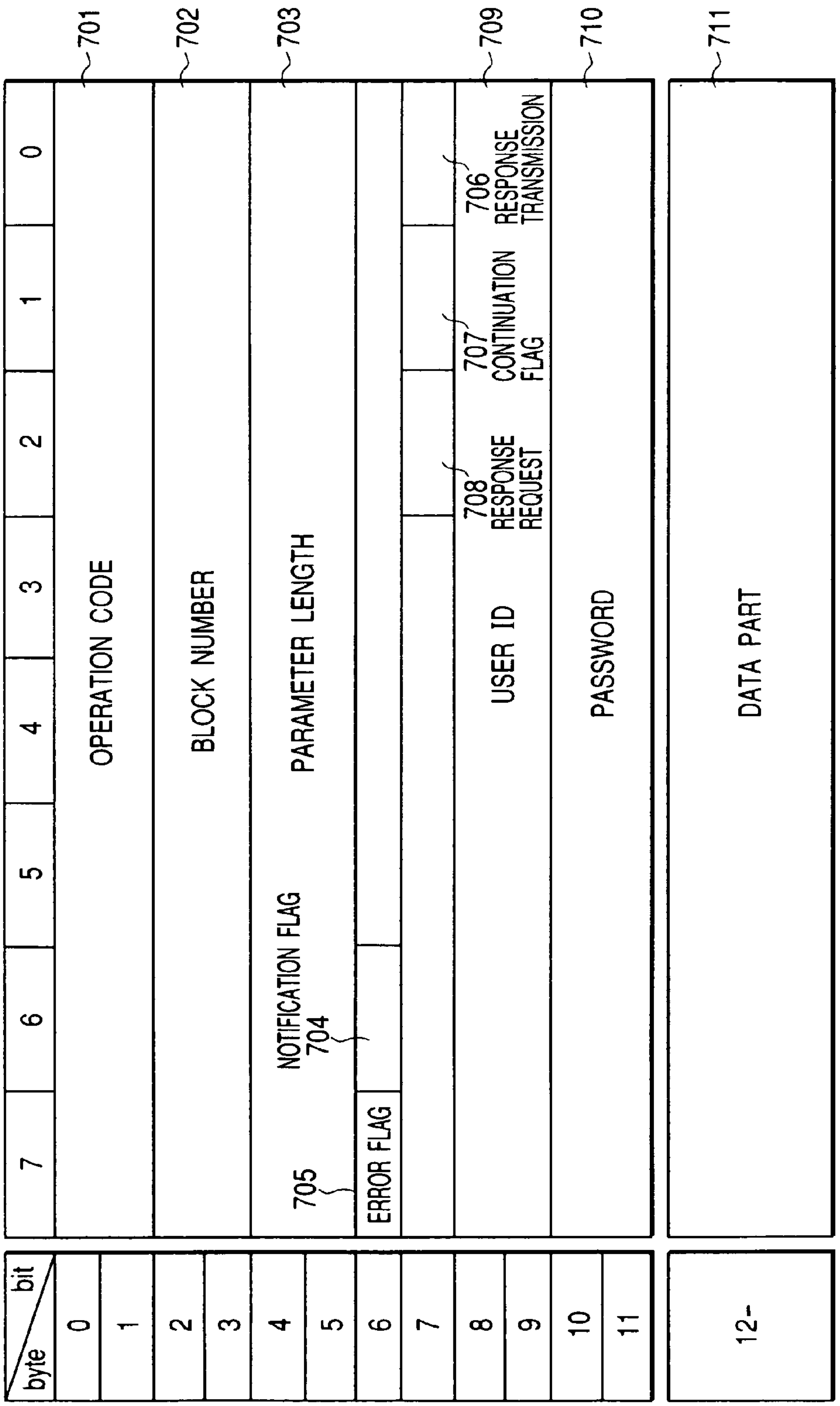
FIG. 6 is a diagram schematically showing the structures of a job packet and a management packet of the image recording system to which the data processing apparatus and the image recording apparatus of the present invention are applicable.

FIG. 6 schematically shows the structure of a job packet and a management packet of the data processing apparatus of the present invention.

A job packet and a management packet of the image recording system to which the data processing apparatus and the image recording apparatus can be applied are protocols of the application layer, and have a packet structure consisting of a header unit and a parameter unit.

Further, one printing job consists of a plurality of job packets, and a set of a series of job packets forming a printing job is called a job script.

In FIG. 6, the vertical axis shows a byte and the horizontal axis shows a bit of each byte.

Zero to first byte of a packet is a region showing an operation code 701, and is an ID with the length of two bytes showing the function of the packet. This operation code 701 can take the following values in a job packet. It should be noted that “0x” in the code shows the hexadecimal number representation.

“0x0201”: job start operation

“0x0202”: job attribute setting operation

“0x0204”: PDL data transmission operation

“0x0205”: job end operation

Next, second to third byte of the packet is a region showing the block number 702 which is the number used to find which response request of a transmitting side a response from a receiving side corresponds to if the transmitting side of a job packet requests a response.

For example, when job packets with the block number=1, 2, 3 are serially transmitted, if an error packet with the block number=2 is returned, the transmitting side can specify that an error has occurred in the second job packet sent.

Fourth to fifth byte of the packet is a region showing a parameter length 703, and a parameter length is a region showing the byte length of a data part and can indicate 0 to 64 Kbytes (KB).

Sixth to seventh byte of the packet is a region showing various kinds of flags of a job packet which respectively shows the following values.

First, sixth bit of the sixth byte of the packet is a region showing a notification flag 704 which indicates that the image recording apparatus notifies the host computer that there is some notification instead of a response to a request packet from the host computer when the value is “1”.

Next, seventh bit of the sixth byte of the packet is a region showing an error flag 705 which indicates that some error has occurred in the image recording apparatus if the value is “1”. This flag is added to a return packet to be transmitted from the image recording apparatus to the host computer.

Further, zero bit of the seventh byte of the packet is a region showing a response transmission 706 which indicates that a response is a response to a request packet from the host computer when the value is “1”.

Further, first bit of the seventh byte of the packet is a region showing a continuation flag 707 which indicates that, since all the data have not been accepted in a data part, the remaining data are transmitted in the next job packet if the value is “1”. The same operation code and block number as the previous packet must be set in the next job packet.

Further, second bit of the seventh byte of the packet is a region showing a response request 708 which sets “1” if a response packet is necessary from the host computer to the image recording apparatus. When “0” is set in the response request 708, no response is returned if the request packet is normally processed. However, if an error occurs in the image recording apparatus 102, the image recording apparatus 102 returns a response packet always having the error flag 705 set as “1” irrespective of a value (“0” or “1”) set in the response request 708 received by the image recording apparatus 102.

Further, eighth to ninth byte of the packet is a region showing a user ID 709 and tenth to eleventh byte of the packet is a region showing a password 710 which are used for authentication when security limitation is set for an operation that can be performed in the request packet. This does not affect the present embodiment.

Twelfth and following byte onward of the packet is a region showing a data part 711 in which additional data corresponding to the operation code 701 are stored.

In case of the job start operation, an execution mode of a job is described as additional data. Execution modes that can be designated are listed below.

“0x01”: usual execution of a job. The job is lastly added to a queue of the image recording apparatus as a usual job, and performs the printing process when a scheduled time comes.

“0x04”: interruption execution of a job. The job is handled as an interruption job, and the printing of the job is given priority to be executed by suspending the process of all the jobs.

In case of the job attribute setting operation, a job attribute ID desired to be set and a job attribute value are set. A job attribute ID shows a identifier corresponding to an attribute or an environment concerning the job and is assigned in advance an ID equivalent to an attribute of a job defined in the ISO-10175 (DPA). Typical job attributes are listed below.

Job attribute ID

“0x0101”: job name

“0x0103”: job owner name

“0x016a”: job size

“0x017a”: sheet discharge mode designation

Besides, job attributes such as the designation of finishing concerning sheet discharge and black and white or color, and corresponding ID can be assigned depending on the function of the image recording apparatus.

In case of the PDL data transmission operation, PDL data is input in the additional data part. Data of one job packet as large as 64 Kbytes, the maximum size that can be stored in the parameter length, can be stored, and data larger than this size are divided into a plurality of PDL data transmission operations and transmitted. In this case, “1” is flagged in the continuation flag.

In case of the job end operation, additional data does not exist.

Hereinafter, control process operations of the job packet creation unit 2107 in the host computer 101 shown in FIG. 5 will be described with reference to FIGS. 7 and 8.

Figure 7:
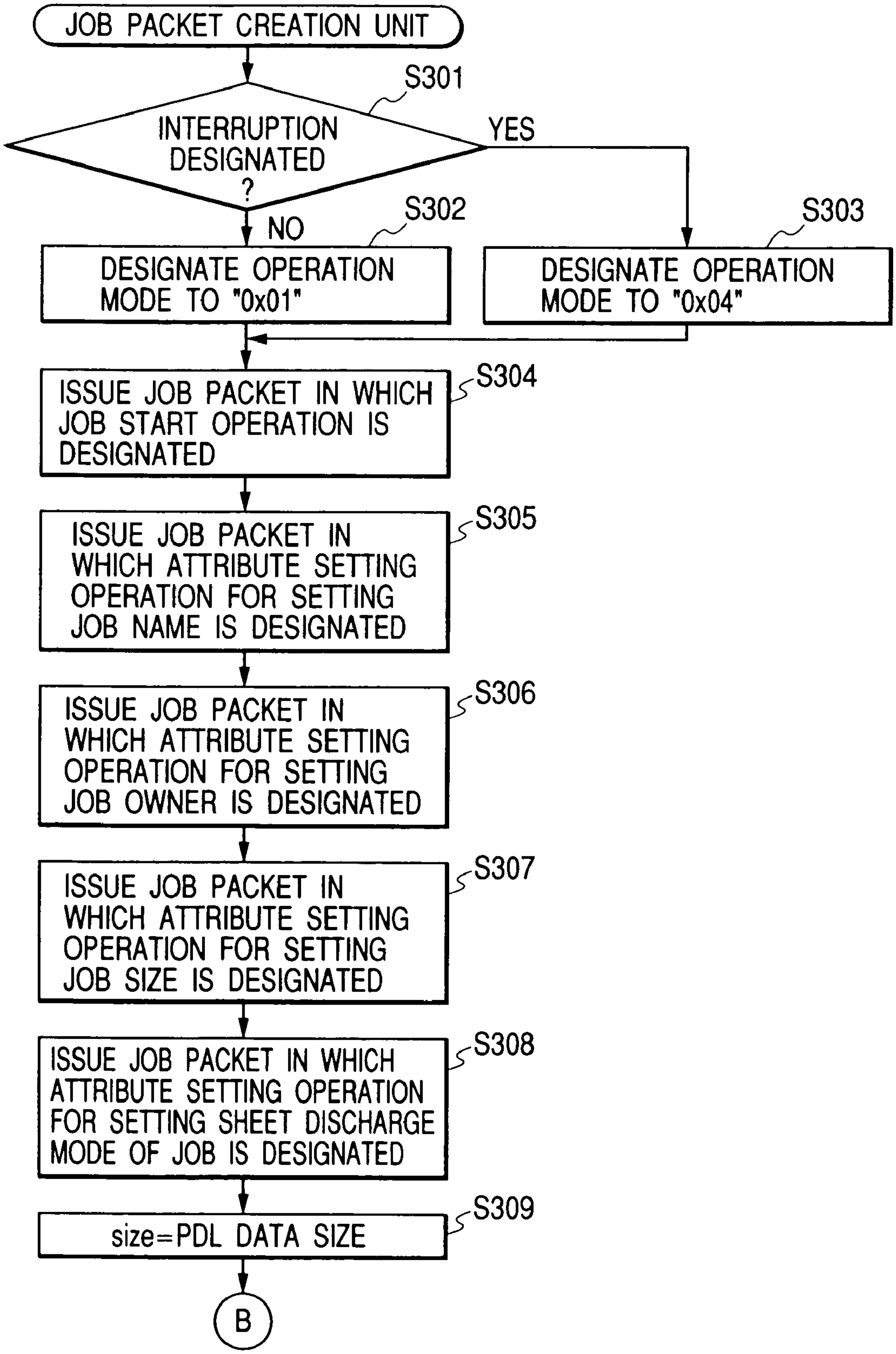
FIG. 7 is a flow chart showing a first control process procedure of the image recording system to which the data processing apparatus and the image recording apparatus of the present invention are applicable.
Figure 8:
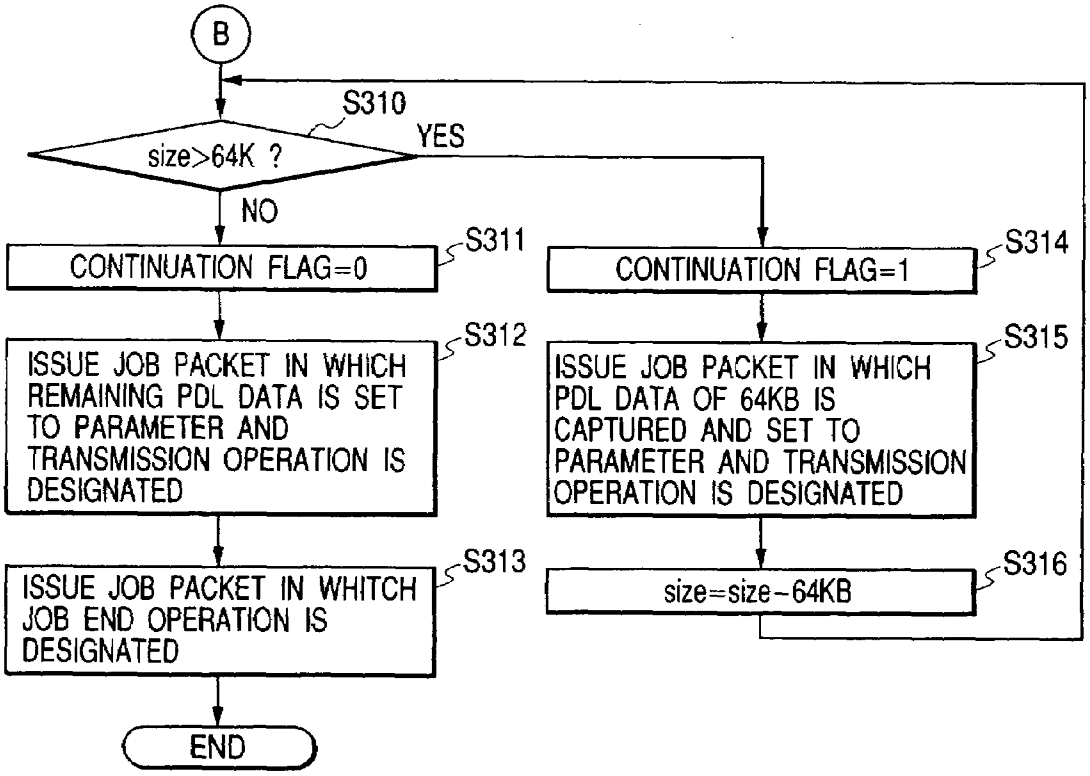
FIG. 8 is a flow chart showing the first control process procedure of the image recording system to which the data processing apparatus and the image recording apparatus of the present invention are applicable.

FIGS. 7 and 8 are flow charts showing a first control process procedure of an image recording system to which the data processing apparatus and the image recording apparatus of the present invention are applicable, and particularly correspond to job packet generation process procedure of the job packet creation unit 2107. It should be noted that symbols S301 to S316 show respective steps.

The job packet creation unit 2107 is activated by the printer driver unit 2102 when printing designation is selected by the application unit 2101 and starts the process after the printer driver unit 2102 ends the generation of printing data in the transmission buffer unit 2103.

First, in the step S301, whether the job is interruption designated or not is determined. The interruption designation is designated by a property provided by the user interface of the printer driver unit 2102.

In the step S301, if the job is determined to be interruption designated, the operation mode is set as the interruption execution of job “0x04” in the step S303, and on the other hand, if the job is determined not to be interruption designated, the operation mode is set as the usual execution of job “0x01” in the step S302.

Next, in the step S304, a job packet in which the job start operation code "0x0201" is designated in the region for storing the operation code 701 shown in FIG. 6 is issued to the logical channel control unit 2106.

At this time, an operation mode is set in the additional data region of the job packet, and whether the operation mode is a usual job or an interruption job is designated. Thereafter, all the operations are used solely for information setting of the job until the job end operation is issued.

Next, in the step S305, a job name is set. A job packet in which the job attribute setting operation code "0x0202" is designated in the region for storing the operation code 701 shown in FIG. 6 and the job attribute ID "0x0101" indicating a job name and a name to be a job attribute value are designated in the data part 711 is issued to the logical channel control unit 1106.

Next, in the step S306, a job owner is set. A job packet in which the job attribute setting operation code "0x0202" is designated in the region for storing the operation code 701 shown in FIG. 6 and the job attribute ID "0x0103" indicating a job owner and an owner name to be a job attribute value are designated in the data part 711 is issued to the logical channel control unit 2106.

Next, in the step S307, a job size is set. A job packet in which the job attribute setting operation code "0x202" is designated in the region for storing the operation code 701 shown in FIG. 6, the job attribute ID "0x016a" indicating a job size and a job data size to be a job attribute value are designated in the data part 711 is issued to the logical channel control unit 2106.

Next, in the step S308, a sheet discharge mode is set. A job packet in which the job attribute setting operation code "0x0202" is designated in the region for storing the operation code 701 shown in FIG. 6 and the job attribute ID "0x017a" indicating a sheet discharge mode and a sheet discharge mode being a job attribute value are designated (stored) in the data part 711 is issued to the logical channel control unit 2106. As the sheet discharge mode being the job attribute value, a fixed sheet discharge mode, a job separate sheet discharge mode, a mailbox sheet discharge mode, a sort sheet discharge mode and a stack sheet discharge mode are selectable.

Next, in the step S309, the size of PDL data to be transmitted is substituted in a variable "size".

Next, in the step S310, the size of the variable "size" is checked and whether the variable "size" is larger than 64 Kbytes or not is determined. Since the size of a parameter that can be designated in the job packet is limited to the maximum 64 Kbytes because the size of the parameter length of the packet header is represented in 16 bits, data larger than that will be divided into a plurality of job packets and issued.

If the size "size" of data size is determined to be larger than 64 Kbytes in the step S310, the continuation flag 707 of the packet header shown in FIG. 6 is set as "1" in the step S314, PDL data for 64 Kbytes are taken out from the transmission buffer 403 and a job packet in which the PDL data transmission operation code "0x0204" is designated in the region for storing the operation code 701 shown in FIG. 6 and the taken out PDL data is designated in the data part 711 is issued to the logical channel control unit 2106 in the step S315, 64 Kbytes transmitted in the step S315 is subtracted from the size "size" in the step S316, and the process returns to the step S310.

On the other hand, if the size "size" of data size is determined not to be larger than 64 Kbytes (64 Kbytes or less) in the step S310, the transmission of all the data is ended by one more PDL data transmission operation. In this case, the continuation flag 707 of the packet header shown in FIG. 7 is set "0" meaning that the PDL data transmission is final in the step S311, all the PDL data are taken out from the transmission buffer 2103 and a job packet in which the PDL data transmission operation code "0x0204" is designated in the region for storing the operation code 701 shown in FIG. 7 and the taken out PDL data is designated in the data part 711 is issued to the logical channel control unit 2106 in the step S312.

It should be noted that the setting content of the attribute setting operation designated in the step S312 includes, according to the function of the image recording apparatus, the number of copies, the discrimination name information according to the user's setting input through the screens shown in FIGS. 3 and 4 in case of the mailbox sheet discharge, the designation concerning the E-mail notification after the sheet discharge, designation concerning the sheet feed, designation of finishing concerning the sheet discharge, designation concerning monochrome/color, and the like.

Then, a job packet in which the job end operation code "0x0205" is designated in the region for storing the operation code 701 shown in FIG. 6 is issued to the logical channel control unit 2106 in the step S313, and the process ends.

Hereinafter, the process concerning the mailbox sheet discharge performed by the printer setting application on the host computer, e.g., the host computer 101A, for performing the control process of the holding unit name registration screen shown in FIG. 2 will be described with reference to FIG. 9 based on the flow chart.

Figure 9:
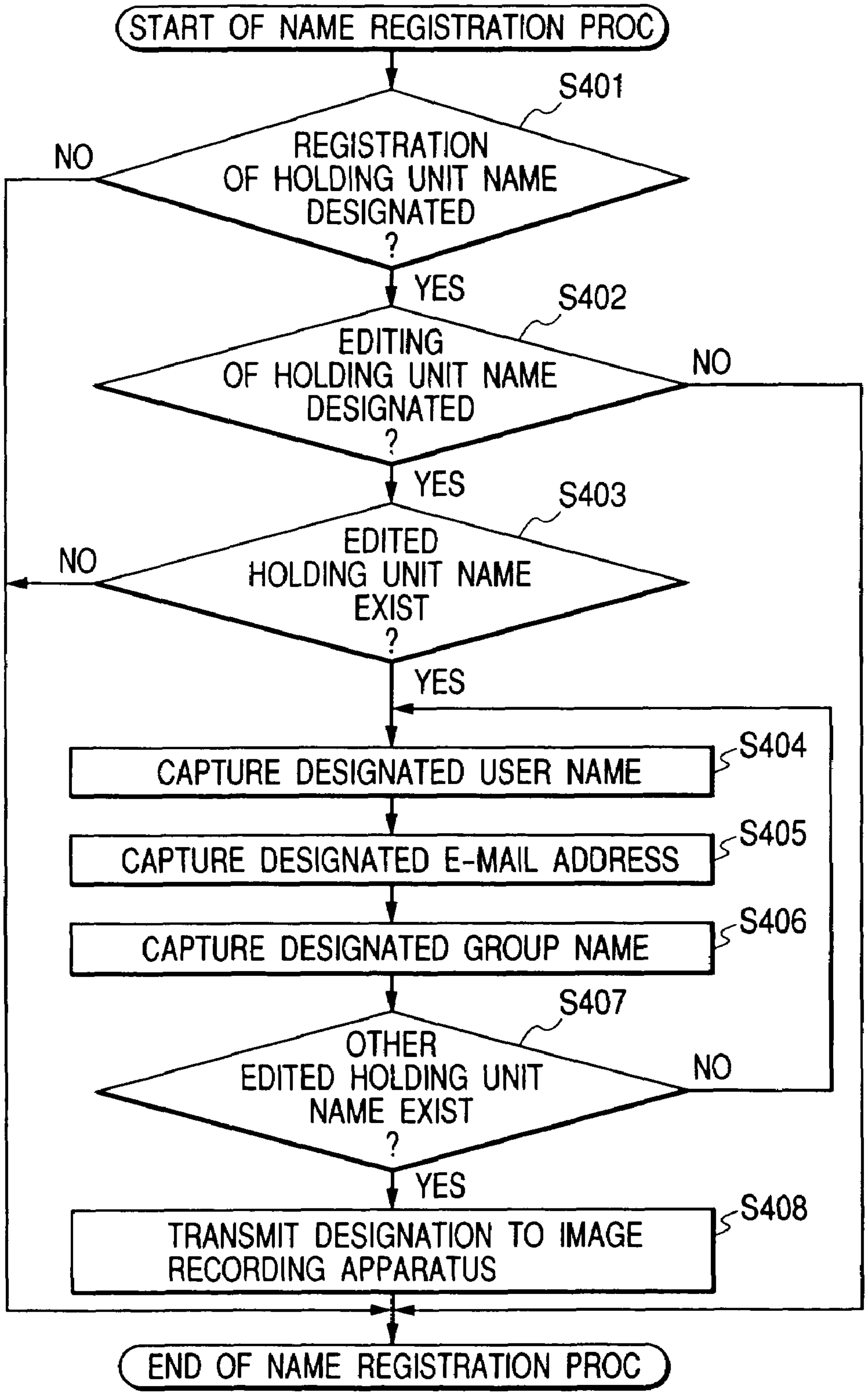
FIG. 9 is a flow chart showing a second control process procedure of the image recording system to which the data processing apparatus and the image recording apparatus of the present invention are applicable.

FIG. 9 is a flow chart showing a second control process procedure of the image recording system to which the data processing apparatus and the image recording apparatus of the present invention are applicable, and particularly corresponds to the registration process by the holding unit name registration screen shown in FIG. 2 of the application unit 2101 (the process for registering a holding unit name (a distribution address name) to be used at the time of mailbox sheet discharge designation on the host computer). It should be noted that symbols S401 to S408 show respective steps.

First, whether a holding unit name registration is designated or not by a user (e.g., the manager in this case) is determined in the step S401, and if the holding unit name registration is determined not to be designated, the process ends. Conversely, if the holding unit name registration is determined to be designated, whether editing of the holding unit name is designated in the step S402. If the editing of the holding unit name is not designated, the process ends, conversely if the editing is designated, whether there is the edited holding unit name is determined in the step S403.

If there is no edited holding unit name in the step S403, the process ends, conversely if there is the edited holding unit name, the user name designated for this holding unit is captured in the step S404, and the E-mail address designated for this user is captured in the step S405. Then, if the group names have been designated for this holding unit, the group names whose the number corresponds the designated number are captured in the step S406.

Then, in the step S407, whether there is other edited holding unit name. If there is other edited holding unit name, the process in the steps S404 to S407 is repeated, conversely if there is no any other edited holding unit name, in the step S408 the bin registration information including the holding unit name information captured in the steps S404 and S405 is transmitted to the image recording apparatus 102 through the network, and the process ends.

In responses to the transmission of the holding unit name designation information in the step S408, the CPU 409 (shown in later-described FIG. 18) in the image recording apparatus 102 receives the bin registration information including the holding unit name designation information from the host computer and performs registration control to cause the EEPROM 410 (shown in FIG. 18) to manage and hold the received information as the discrimination name of each holding unit, on the basis of a program stored in the ROM 404 (shown in later-described FIG. 18) or other not-shown storage medium.

The held data is used as the information to be added when the printing designated to be in the mailbox mode is performed. The information concerning the set name transmitted from the image recording apparatus 102 through the network is received as the bin registration information by the printer driver, and the received information is displayed on the selection screen of the printer driver UI.

Ordinarily, the abovementioned setting may be performed only once at the time when the environment setting of the image recording apparatus 102 is performed. If it is intended to change the operation in the mailbox sheet discharge mode, the system manager or the like appropriately changes the information concerning the holding unit name set as above, whereby it is possible to change the sort method.

Figure 10:
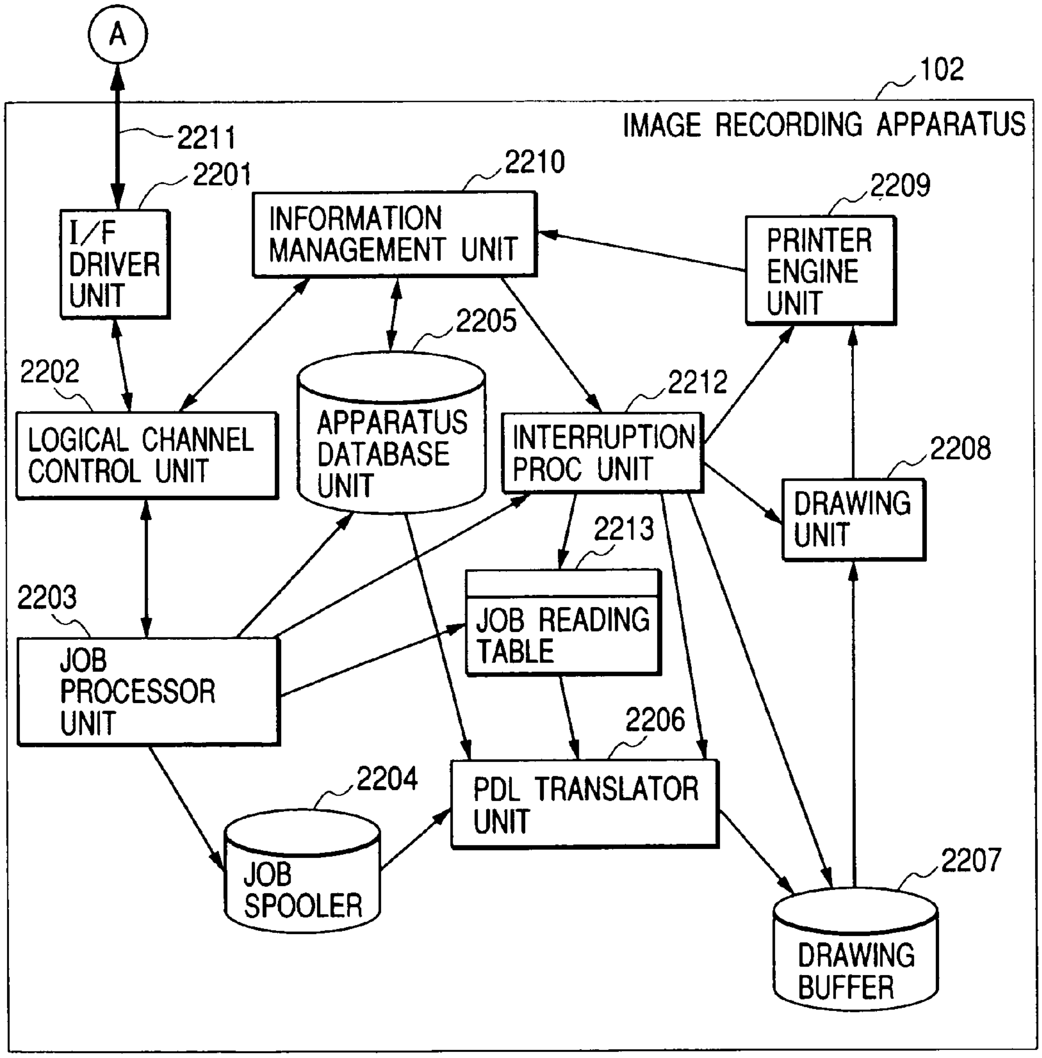
FIG. 10 is a block diagram for explaining the structure of the image recording apparatus according to the first embodiment of the present invention.

FIG. 10 is a block diagram showing the structure of the image recording apparatus according to the first embodiment of the present invention, and corresponding to the image recording apparatus 102 in the image recording system shown in FIG. 1.

In FIG. 10, numeral 2201 denotes an I/F (interface) driver unit which converts logical data to an electrical signal and exchanges the signal with the interface 2211. Numeral 2202 denotes a logical channel control unit which analyses the data received from the I/F driver unit 2201, sorts the job packet and the management packet to different channels respectively, and multiplexes the transport layer in the OSI seven hierarchies.

Numeral 2204 denotes a job spooler which is composed of a large scale memory device such as a hard disk (HDD), a flash memory or a DRAM, and temporarily retains PDL data of a printing job until the end of printing. Numeral 2205 denotes an apparatus data base unit which stores attribute information of a printing job.

Numeral 2203 denotes a job preprocessor unit which receives to analyze a job packet and divides it into the attribute information of the printing job that is stored in the apparatus data base unit 2205 and the PDL data that is stored in the job spooler 2204. Numeral 2213 denotes a job reading table which describes process order of a job. Numeral 2207 denotes a drawing buffer which stores intermediate data that can be drawing processed on a real time basis.

Numeral 2206 denotes a PDL translator unit which takes out the job in the order that is described in the job reading table 2213, analyzes the attribute information stored in the apparatus data base unit 2205 and the PDL data stored in the job spooler 2204, and generates the intermediate data that can be drawing processed on a real time basis to store it in the drawing buffer 2207.

Numeral 2209 denotes a printer engine unit which obtains the intermediate data from the drawing buffer 2207, performs rendering of the intermediate data on a real time basis together with the sheet carrying process performed by the printer engine 2209, and physically performs printing on a sheet by using a drawing unit 2208 of transmitting data as video data to the printer engine unit 2209 and a known electronic photographic technology on the basis of the video data transmitted from the drawing unit 2208.

Numeral 2210 denotes an information management unit which receives the management packet transmitted from the host computer 101, captures information from the apparatus data base unit 2205 in accordance with a request, performs a job cancellation request and a interruption request, and detects an end of a job and an abnormality of units to independently issue a notification event to the host computer 101.

Numeral 2212 denotes an interruption process unit which performs the actual interruption process when a job interruption designation is performed.

As shown in FIG. 10, the image recording apparatus 102 is composed of the I/F driver unit 2201, the logical channel control unit 2202, the job preprocessor unit 2203, the job spooler 2204, the apparatus data base unit 2205, the PDL translator unit 2206, the drawing buffer 2207, the drawing unit 2208, the printer engine 2209, the information management unit 2210, the interruption process unit 2212, and the job reading table 2213.

Each part of the abovementioned image recording apparatus 102 may be composed of a dedicated hardware respectively, or may be composed of a CPU, a ROM or other storage media storing a program executed by the CPU, a RAM, an EEPROM, a hard disk and the like.

Hereinafter, control operations of the job preprocessor unit 2203 shown in FIG. 10 will be described with reference to FIG. 11.

Figure 11:
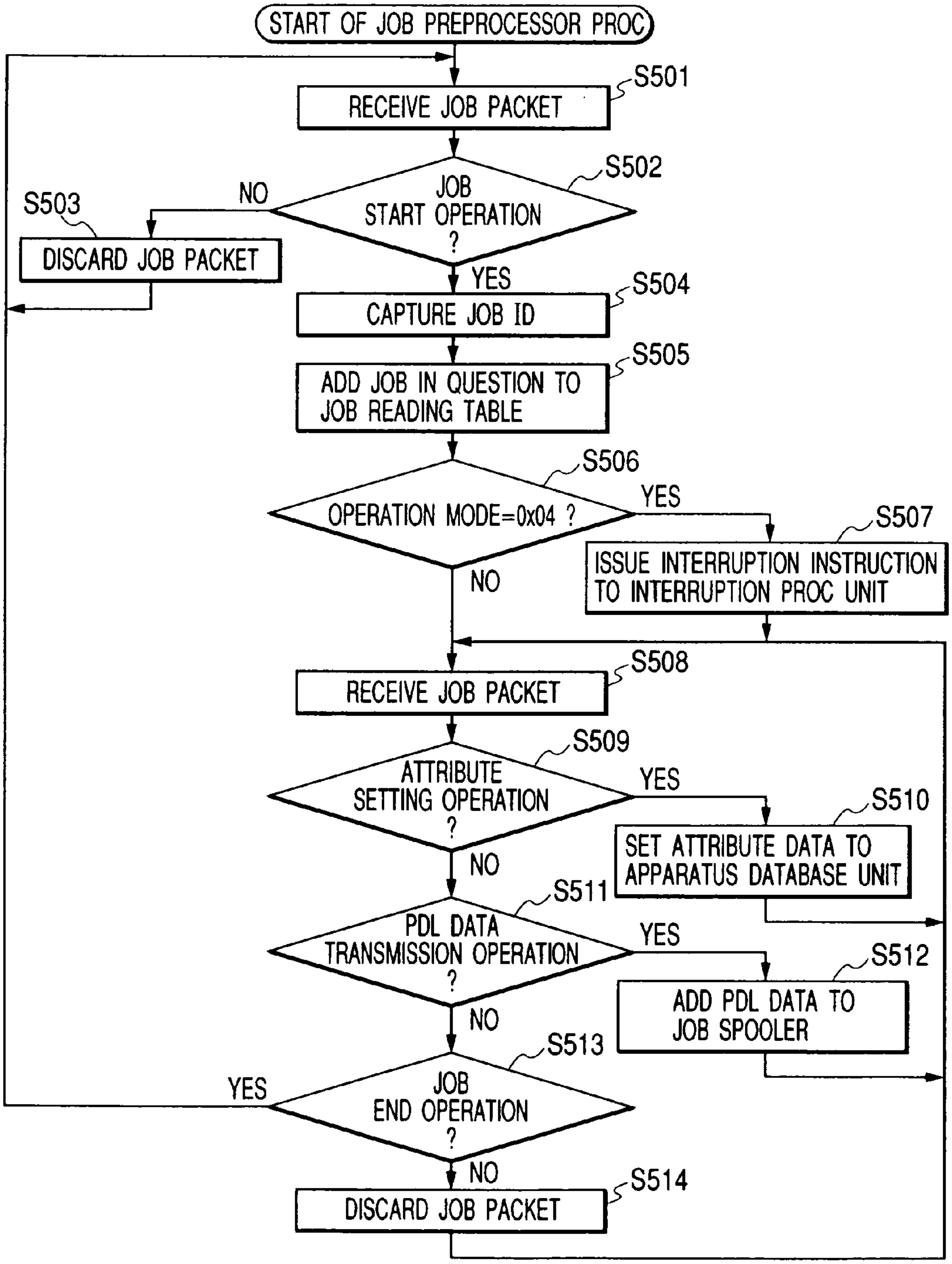
FIG. 11 is a flow chart showing a third control process procedure of the image recording system to which the data processing apparatus and the image recording apparatus of the present invention are applicable.

FIG. 11 is flow chart showing a third control process procedure of the image recording system to which the data processing apparatus and the image recording apparatus of the present invention are applicable, and particularly corresponds to the process procedure of the job preprocessor unit 2203. It should be noted that symbols S501 to S514 show respective steps.

The job preprocessor unit 2203 starts the process at the time of activating the image recording apparatus 102 and thereafter continues the process until breaking the power source of the image recording apparatus 102.

First, a job packet is received in the step S501. Upon receiving, whether the received job is a job start operation or not is determined in the step S502, and if it is determined that an operation other than the job start operation arrives, the reception is an incorrect operation, and the job packet is broken in the step S503 and the process returns to the step S501.

On the other hand, if the job received in the step S502 is determined to be the job start operation, a job ID for the job is captured in the step S504, and the job ID is assigned as a number of two bytes, and is utilized as a key for the reading and writing process of the job attribute information in the apparatus data base unit 2205.

Next, the job ID of the job is added to the job reading table in the step S505, and the added data of the job packet is retrieved and whether the operation mode is “0x04” or not is determined in the step S506, and if the operation mode is determined not to be “0x04”, the process proceeds to the step S508 directly.

On the other hand, if the operation mode of the added data of the job packet is determined to be “0x04” in the step S506, this shows the interruption print designation as described above in which case designation of interruption printing is issued to the interruption process unit 2212 in the step S507 and the process proceeds to the step S508.

Then, the next job packet is received in the step S508 and whether the received job packet is an attribute setting operation or not is determined in the step S509, and if the received job packet is determined to be an attribute setting operation, attribute data are set in the apparatus data base unit 2205 in the step S510. What becomes a key at this time is the job ID captured in the step S504 as well as the attribute ID and the attribute data described in the added data of the job packet.

When the attribute setting of the step S510 is ended, the process returns to the step S508 in order to receive the next job packet.

On the other hand, if the job packet received in the step S509 is determined not to be the attribute setting operation, whether the received job packet is the PDL data transmission operation or not is determined in the step S511, and if the received job packet is determined to be the PDL data transmission operation, the PDL data is added to the job spooler 2204 in the step S512. At this time, the job ID is given as a key and the job ID is arranged to be taken out as a key when it is taken out later. When the addition to the job spooler 2204 is ended, the process returns to the step S508 in order to receive the next job packet.

On the other hand, if the job packet received in the step S511 is determined not to be the PDL data transmission operation, whether the job packet is the job end operation or not is determined in the step S513, and if the job packet is determined to be the job end operation, the process leaves the series of loop and returns to the initial state of the step S501.

On the other hand, if the job packet is determined not to be the job end operation, that is, if the job packet does not correspond to either of the operations, since it is an incorrect job packet, the job packet is broken in the step S514, and the process returns to the step S508.

By the above operations, the job preprocessor unit 2203 can sort the data of the job packet to the apparatus data base unit 2205 and the job spooler 2204.

Next, the job reading table 2213 shown in FIG. 10 will be described with reference to FIGS. 12A, 12B and 12C.

FIGS. 12A, 12B and 12C are explanatory schematic diagrams representing the job reading table shown in FIG. 10.

Concretely, FIG. 12A shows a state in which jobs 1 to 4 are registered in the job reading table 2213. In this state, when the PDL translator unit 2206 executes translation, print jobs are taken out from the top of the reading table in order, and if the job preprocessor unit 2203 adds the job 5 to the job reading table in the step S505 of FIG. 11, the job 5 is added to the end of the reading table as shown in FIG. 12B.

Further, if it is recognized that the last page of the job 1 is discharged in the printer engine unit 2209, the job 1 is deleted from the job reading table as shown in FIG. 12C.

As described above, the job reading table 2213 controls the order of jobs that the PDL translator unit 2206 processes.

Hereinafter, operations from the process of the PDL translator unit 2206 onward will be described.

The PDL translator unit 2206 performs the translating process based on the PDL data stored in the job spooler 2204 and the job information stored in the apparatus data base unit 2205, converts them to intermediate data that the drawing unit 2208 can draw on a real time basis to transmit them to the drawing buffer 2207.

Next, the drawing buffer 2207 stores the intermediate data for a plurality of pages and gives them to the drawing unit 2208. Next, the drawing unit 2208 obtains the intermediate data from the drawing buffer 2207, performs the rendering of the intermediate data on a real time basis together with the sheet carrying process performed by the printer engine unit 2209, and transmits the data to the printer engine unit 2209 as video data.

Next, the printer engine unit 2209 physically prints on a sheet using the known electronic photographic technology based on the video data transmitted from the drawing unit 2208.

Further, the information management unit 2210 receives an information capture request from the utility unit 2105 in the form of a management packet, captures necessary information from the apparatus data base unit 2205, and convert the information into a management packet to respond to the host computer through the logical channel control unit 2202. Further, the information management unit 2210 detects the end of the job and independently converts the notice of end to a management packet to notify.

Figure 13:
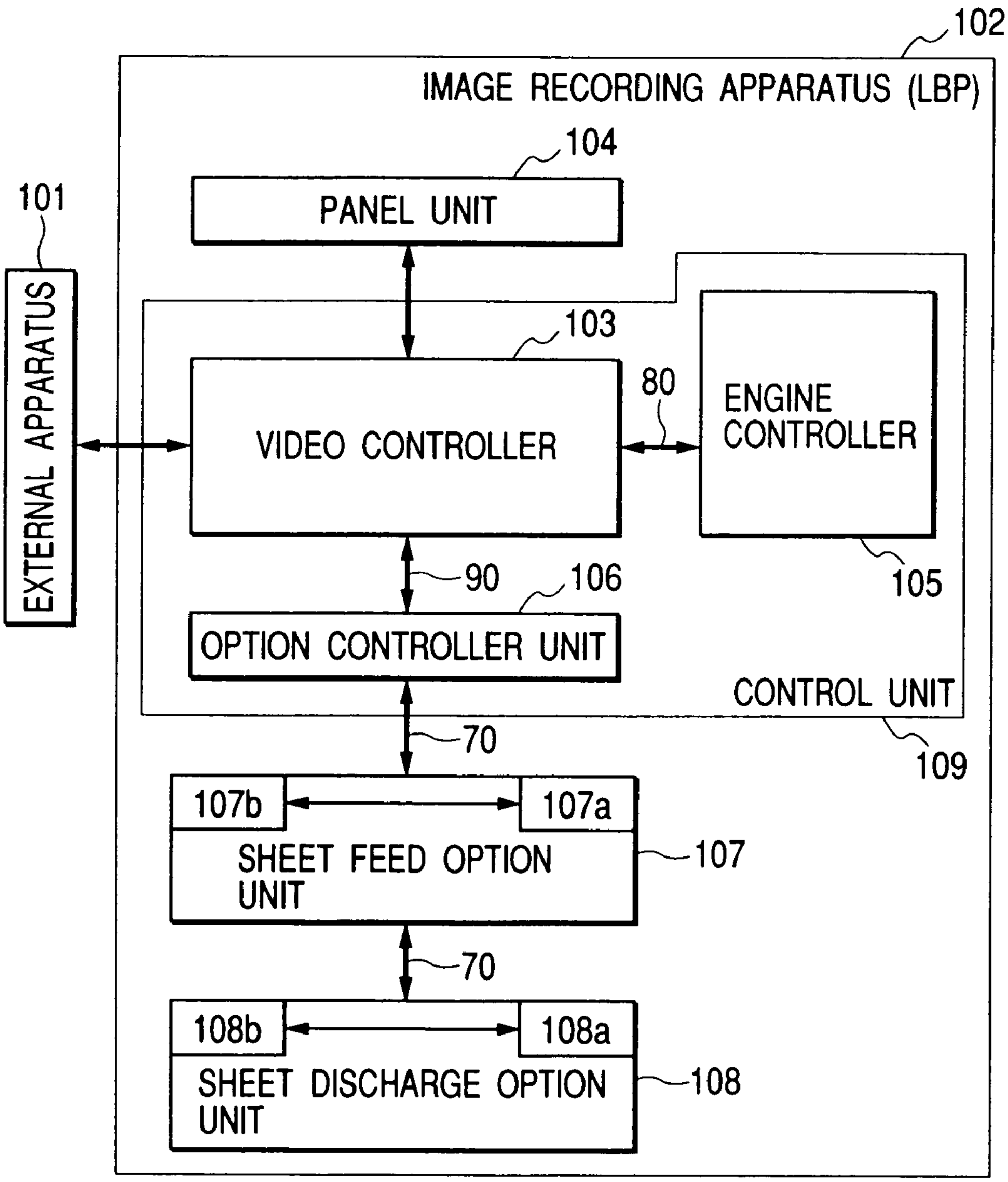
FIG. 13 is a block diagram showing the structure of a laser beam printer to which the image recording apparatus shown in FIG. 1 is applicable.

Further, a operation panel (a panel unit) 104 shown in later-described FIG. 13 is provided in the main body of the image recording apparatus 102. The operation panel 104 is composed of a display unit such as liquid crystal or LED and an operation button, and can perform the process for reflecting the setting from a user on the apparatus data base unit 2205 through the information management unit 2210 or for displaying the current state of the apparatuses.

Next, the structure of the image recording apparatus 102 shown in FIG. 1 will now be described with reference to FIGS. 13 to 25.

FIG. 13 a block diagram showing the structure of a laser beam printer to which the image recording apparatus 102 shown in FIG. 1 is applicable.

It is needless to say that the image recording apparatus to which the present embodiment is applied is not limited to a laser beam printer, and may be a printer of the print method such as the LED type, the inkjet type, the thermal transfer type or the sublimation type.

Further, although an example in which two option units are connected is described in the following description and drawings, more option units can be connected and functions of the option unit may be shared with the main body.

In FIG. 13, the laser beam printer (the printer) 102 can be connected to various kinds of option units, is connected to the external apparatus 101 such as a host computer by a universal interface (e.g., Centronics, RS232C, USB or the like) and a network (e.g., Ethernet or the like), and records images based on print information (control information of code data and the like based on a predetermined printer language, e.g., including PostScript, LIPS III, LIPS IV, image data and the like) transferred from the external apparatus 101 through the universal interface.

Numeral 103 denotes a video controller which is connected to the external apparatus 101 such as the host computer by the universal interface, receives code data (ESC code, various kinds of PDL data or the like) transmitted through the universal interface from the external apparatus 101, generates page information consisting of dot data and the like based on the code data, transmits image data (binary image data or multivalue image data) to an engine controller 105 to be described later through a video interface 80, and at the same time, transmits commands and the like for sheet feed designation and sheet discharge designation to an option controller unit 106 to be described later through a supervising interface 90. The engine controller 105 forms a latent image on a photosensitive drum by a well known electrophotographic process based on the image data to be transferred from the video controller 103, and prints the image on a sheet to be fed by transferring and fixing it.

Further, at this time, the video controller 103 issues an instruct and the like concerning the timing for feeding and discharging a sheet to the option controller unit 106.

Numeral 104 denotes a panel unit which is an interface with a user composed of a various kinds of switches (buttons) for operation, a LED display unit, an LCD display unit and the like, and a user can instruct the printer 102 to perform a predetermined operation by operating the panel unit 104. Further, the various kind of data and the like set by a user are stored in a non-volatile memory (not shown) such as an NVRAM and an EEPROM and managed.

The option controller unit 106 is a supervising controller provided with a CPU, a ROM, a RAM and the like (not shown) for controlling one or more option units by supervising them based on sheet feed and discharge designations and the like transferred from the video controller 103 and sheet feed and discharge designations from the engine controller 105. The option controller unit 106 collectively controls various kinds of option units by communicating with an option controller unit provided in various kinds of option units through an option unit interface 70.

Further, in the RAM of the option controller unit 106, there is a common memory (shown in later-described FIG. 19) to which the video controller 103 can access which is composed of an approximately 40 page carrying condition management area, a basic status area, a command status management area, a start-up process area and the like. The video controller 103 gives designation to each option unit through each area of the common memory.

Further, the carrying condition management area is composed of an area for the video controller 103 to notify each option unit of a printing method (a sheet feed port, a holding unit, a color, stapling, shifting, etc.) and an area for notifying the video controller 103 of each option state (how much sheet feed ended?, does sheet discharge end?, etc.)

Further, the basic status area is an area for notifying the video controller 103 of an abnormality of each option unit (jam, no sheet, no staple, etc.), the command status management area is an area for exchanging command status with the video controller 103, and the start-up process area is an area for the video controller 103 to designate the start-up process of each option unit. Further, information concerning an abnormality of each of these option units is transmitted from the image recording apparatus 102 side to the host computer 101 either automatically at the time of occurrence of the abnormality or in accordance with status request data from the host computer 101.

Numeral 107 denotes a sheet feed option unit, for example, a sheet deck option unit, having a sheet deck controller (a large scale sheet feed cassette controller) 107*a* inside which controls sheet feed based on control information transmitted from the option controller unit 106. Further, the abovementioned sheet deck controller 107*a* is provided with a CPU, a ROM and a RAM (not shown), and the CPU controls the sheet feed option unit 107 based on a program stored in the ROM. Further, extension information of the sheet feed option unit 107, for example, information on a sheet size that can be stored in a sheet deck, is stored in the ROM. Further, the information of these option units is transmitted from the image recording apparatus 102 side to the host computer 101 in accordance with status request data from the host computer 101.

Numeral 108 denotes a sheet discharge option unit, e.g., a sorter option unit having thesort function, having a sorter controller (a large scale sheet discharge stacker controller) 108*a* inside which performs a sort operation and a sheet discharge operation based on control information transmitted from the option controller unit 106. Further, the abovementioned sorter controller 108*a* is provided with a CPU, a ROM and a RAM (not shown), and the CPU controls the sheet discharge option unit 108 based on a program stored in the ROM. Further, extension information of the sheet discharge option unit 108, for example, information on the number of sheet discharge bins, presence/absence of the sort function, presence/absence of the staple function, presence/absence of the shift function for shifting a discharged sheet to a predetermined direction, presence/absence of the reversing function for reversing the orientation of a discharged sheet and the like is stored in the ROM. Further, information on these option units is transmitted from the image recording apparatus 102 side to the host computer 101 in accordance with a status request data from the host computer 101.

Further, operation units (controllers) 107*b* and 108*b* provided with a display unit and various kinds of keys are disposed in the sheet feed option unit 107 and the sheet discharge option unit 108 respectively which enable the display of messages, operation method and the like to a user at the time of using each option and the operation of the units by a user.

Further, numeral 109 denotes a control unit and is composed of the engine controller 105 for controlling the printing process of the printer 102, the video controller 103 for controlling the whole printer 102, analyzing data from the external apparatus 101 such as the host computer and converting the data to image data, and the option controller unit 106 for collectively controlling the various kinds of option units.

Further, the option controller unit 106 manages each option unit by the common option unit interface 70 and communicates with the video controller 103 through the supervising interface 90. The present embodiment is characterized in that each sheet feed and discharge option unit is controlled by the video controller 103 through the option controller unit 106.

Figure 14:
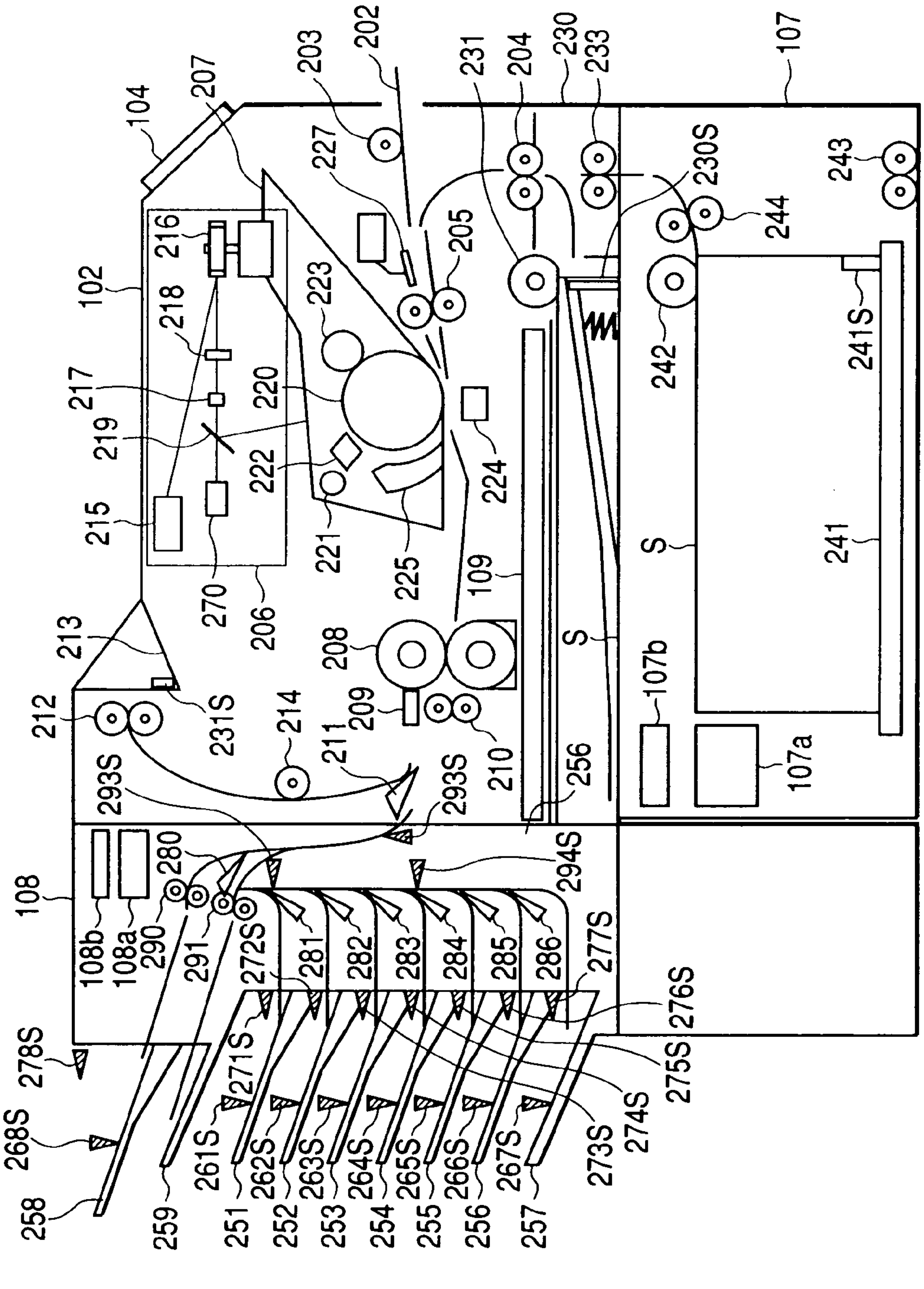
FIG. 14 is a cross sectional diagram showing the structure of a printer shown in FIG. 13.

FIG. 14 is a cross sectional diagram showing the structure of the printer 102 shown in FIG. 13, and the same parts are given the same symbols.

In FIG. 14, numeral 230 denotes a sheet cassette which retains recording sheets S and has a mechanism for electrically detecting the size of the recording sheets S by a partition plate (not shown). Numeral 231 denotes a cassette sheet feed clutch which is a cam for separating only the top one recording sheet of the recording sheets S disposed on the sheet cassette 230 and for carrying the separated recording sheet S to a sheet feed roller 204 by driving means (not shown), rotates intermittently each time a sheet is fed, and feeds one recording sheet corresponding to one rotation. Symbol 230S denotes a recording sheet detection sensor which detects the volume of the recording sheets S retained in the sheet cassette 230.

Numeral 227 denotes a register shutter which stops sheet feed by pressing a sheet. The sheet feed roller 204 carries the top end part of the recording sheet S to the register shutter 227. Numeral 202 denotes a manual paper feed tray which mounts the recording sheet S. Numeral 203 denotes a manual paper feed clutch which carries the recording sheets S mounted on the manual paper feed tray 202 to the register shutter 227. Numeral 233 denotes an option sheet feed roller (a sheet feed relay carrying roller) which supplies the recording sheet S fed from the sheet feed option unit 107 into the printer 102 main body.

Further, a pair of register rollers 205 for synchronously carrying the recording sheet S are provided in the downstream of the manual paper feed roller 203, the cassette sheet feed clutch 231 and the option sheet feed roller 233, and a image recording unit 207 for forming a toner image on the recording sheet S using the well known electrophotographic process by a laser beam emitted from a laser scanner unit 206 is provided in the downstream of the register rollers.

In the laser scanner unit 206, numeral 215 denotes a laser unit which emits a laser beam based on an image signal (a VDO signal) forwarded from the video controller 103. The laser beam emitted form the laser unit 215 is scanned by a polygon mirror 216 and forms a latent image on a photosensitive drum 220 through a group of imaging lenses 218 and a turnaround mirror 219. Numeral 217 denotes a beam detector which detects the laser beam emitted from the laser unit 215 and outputs a main scanning synchronous signal. Numeral 270 denotes a light quantity sensor which detects the light quantity of the laser beam emitted from the laser unit 215.

Further, in the image recording unit 207, numeral 222 denotes a primary charging unit which equally charges the surface of the photosensitive drum 220. Numeral 223 denotes a developing unit which toner develops a latent image that is formed on the photosensitive drum 220 by being charged by the primary charging unit 222 and exposed to a laser beam by the laser scanner unit 206. Numeral 224 denotes a transferring charging unit which transfers the toner image on the photosensitive drum 220 developed by the developing unit 223 on the recording sheet S fed by the register roller 205. Numeral 225 denotes a cleaner which removes a residual toner on the photosensitive drum 220. Numeral 221 is a preflashing lamp which removes optical electricity of the photosensitive drum 220.

Numeral 208 denotes a fixing unit which thermally fixes the toner image formed on the recording sheet S by the image recording unit 207. Numeral 210 denotes a carrying roller which discharges and carries the recording sheet S. Numeral 209 denotes a sheet discharge sensor which detects the sheet discharge status of the recording sheet S. Numeral 211 is a flapper which switches the carrying direction of the recording sheet S on which recording is ended to the sheet discharge tray 213 side or the sheet discharge option unit 108 side. Numerals 214 and 212 denote discharge rollers which discharge the recording sheet S carried by the switching of the flapper 211 to a stacking tray 213. Symbol 213S denotes a sheet discharge stacking quantity detection sensor which detects the stacking quantity of the recording sheets S stacked on the stacking tray 213.

Further, the engine controller 105 in the control unit 109 performs the control of the electro-photographic process by the laser scanner unit 206, the image recording unit 207 and the fixing unit 208, and the carrying control of a recording sheet in the printer 102 main body.

Further, the video controller 103 is connected to the external apparatus 101 such as a personal computer through a universal interface (e.g., Centronics, RS232C, etc.), develops image information transmitted through the universal interface into bit data, and transmits the bit data to the engine controller 105 through the video interface 80 as a VDO signal.

Next, various kinds of option units detachably connected to the printer 102 main body will now be described.

The option controller unit 106 shown in FIG. 13 is provided in the printer main body shown in FIG. 14, and is configured such that it can communicate with various kinds of option units with the same protocol through the option unit interface 70 being a common path. Further, the option controller unit 106 is connected to the video controller 103 through the supervising interface 90.

In the sheet feed option unit 107 such as a paper deck option unit, numeral 241 denotes a paper deck which stacks a large capacity of recording sheets S on a vertically moving deck. Numeral 242 denotes a paper deck sheet feed roller which feeds the recording sheets S stacked on the paper deck 241.

Numeral 244 denotes a carrying roller which carries the recording sheet S fed from the paper deck sheet feed roller 242 to the direction of the option sheet feed roller 233. Numeral 243 denotes a sheet fees relay carrying roller which relays and carries a recording sheet fed from another sheet feed type option unit (an option unit capable of feeding recording sheets of different size or the same size) that can be connected with plural detachably mountable to the lower part of the paper deck option unit. Further, symbol 241S is a recording sheet storing quantity detection sensor which detects the stacked quantity of the recording sheets S stacked on the paper deck 241.

The sheet feed option unit 107 such as a paper deck option unit is controlled by the paper deck controller 107*a*.

In the sheet discharge option unit 108 such as a sorter option unit, numerals 251 to 257 are a first to seventh sheet discharge bins for performing face down sheet discharge, and sort recorded recording sheets S to load. Further, numeral 258 denotes an eighth sheet discharge bin for passing straightly sheets carried from the sorter option unit to perform face up sheet discharge. Numeral 280 denotes a flapper which switches carrying of the recording sheet S sorted by the flapper 211 of the printer 102 main body and sent to the sorter option unit 108 so as to switch the face of a sheet based on designation from the video controller 103. Further, symbols 261S to 268S denote sheet discharge empty detection sensor which detects presence/absence of stacked sheets of the recording sheets discharged to the first sheet discharge bin 251 to the eighth sheet discharge bin 258.

Futther, sheet discharge stacked quantity detection sensor 271S to 278S detect the stacked quantity of the recording sheets stacked on the first sheet discharge bin 251 to the eighth sheet discharge bin 258 (stacked quantity zero (empty) to full stacking), and the sorter controller 108*a* notifies the video controller 103 of the full stacking through the option controller unit 106 at the time when (it is detected that) the height of the recording sheets stacked on the first sheet discharge bin 251 to the eighth sheet discharge bin 258 reaches, e.g., 18 mm (equivalent to approximately 120 sheets).

Further, the abovementioned first sheet discharge bin 251 to the eighth sheet discharge bin 258 are capable of stacking approximately 120 sheets for each bin, that is approximately 960 sheets for eight bins, among which the first sheet discharge bin 251 to the seventh sheet discharge bin 257 are capable of performing the sort sheet discharge.

If the face up is designated by the video controller 103 through the supervising interface 90, the face up flapper 280 is turned on to sort the recording sheets S, and the sorted recording sheet S is directly sent to a holding unit by a roller 290. Further, if the face down is designated by the video controller 103 through the supervising interface 90, the face up flapper 280 is turned off to sort the recording sheets S, and the sorted recording sheet S is carried by a roller 291 until the rear end of the recording sheet S once passes over the face up flapper 280, and then, is forwarded to a vertical path from the rear end of recording sheets by the reverse rotation of the roller 291, and the bin flappers 281 to 286 are driven in a predetermined timing by a designated sheet discharge bin to sort the recording sheets to each face down holding unit to end the sheet discharge in the face down status. If the sheet discharge bin is the seventh sheet discharge bin 257, the face down sheet discharge is ended by performing a sheet discharge without driving the bin flappers.

Moreover, if stapling using a stapler (not shown) is designated by the video controller 103 through the supervising interface 90, the recording sheets S are stocked in a staple tray (not shown), the recording sheets S are aligned, and the stapler executes the stapling to discharge the sheets to either of the first sheet discharge bin 251 to the eighth sheet discharge bin 258. Further, if shifting is designated by the video controller 103 through the supervising interface 90, in the same manner as stapling the sheets are stocked in the staple tray (not shown), the recording sheets S are aligned and shifted as they are in the tray, that is, a stacking area (a tray) of the recording sheet S to be discharged is shifted, to be discharged to either the first sheet discharge bin 251 to the eighth sheet discharge bin 258. Further, a staple residual quantity detection sensor is provided which detects the residual quantity of staples stored in the stapler.

Further, the sorter option unit 108 is controlled by the sorter controller 108*a*.

Further, the option controller unit 106, the paper deck controller 107*a* and the sorter controller 108*a* are mutually connected by connectors and performs serial communication with the option unit interface 70. These are mutually connected in series by the same connector, therefore, the paper deck option unit 107 and the sorter option unit 108 can be connected with the connection order exchanged.

Further, the pair of register rollers 205, the sheet feed roller 204 and the carrying roller 244 for carrying the recording sheets S are respectively provided in the downstream of the manual paper feed roller 203, the cassette sheet feed clutch 231 and the paper deck sheet feed roller 242, and the image recording unit 207 for forming a toner image on the recording sheet S by a laser light emitted from the laser scanner unit 206 is provided in the downstream of the pair of register rollers 205. Moreover, the fixing unit 208 for thermally fixing the toner image formed on the recording sheet S is provided in the downstream of the image forming unit 207, and the sheet discharge sensor 209 for detecting the carrying status of the sheet discharge unit, the carrying roller 210 for carrying a recording sheet, the flapper 211 for switching the carrying direction of the recording sheet S on which the recording is ended and the like are provided in the downstream of the fixing unit 208.

Figure 15:
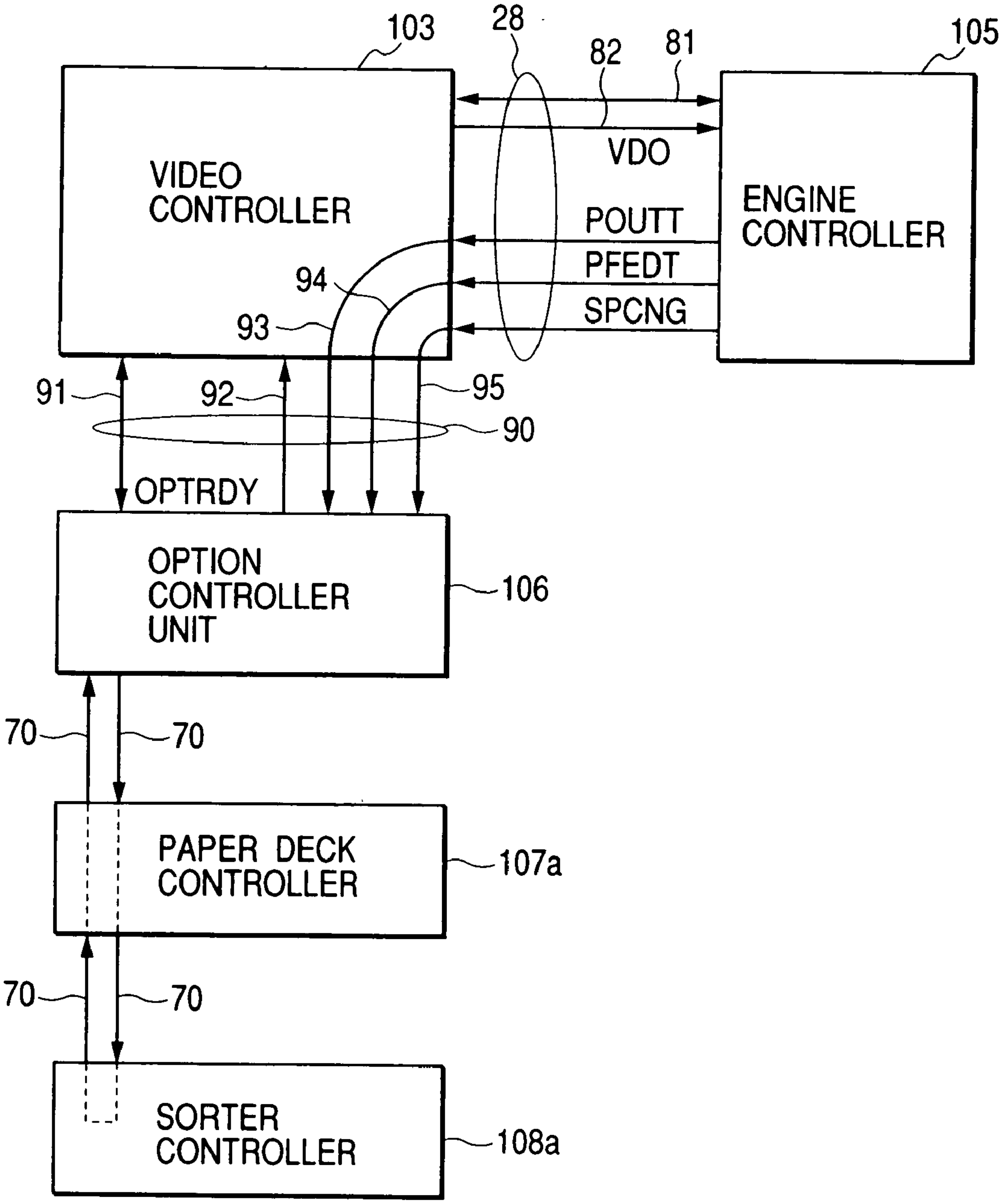
FIG. 15 is a block diagram showing the structure of the printer shown in FIG. 13.

FIG. 15 is a block diagram showing the structure of the printer 102 shown in FIG. 13, and the same parts as those in FIG. 15 are given the same symbols.

In FIG. 15, numeral 91 denotes a serial communication interface. Through this interface 91, commands such as sheet feed designation to the paper deck option unit 107 and sheet discharge bin designation to the sorter option unit 108 are transmitted to the option controller unit 106 from the video controller 103, and further the presence/absence status of sheets in the paper deck option unit 107, the stacking status of each sheet discharge bin of the sorter option unit 108, and the presence/absence status of staples and the like are transmitted. Incidentally, the option controller unit 106 and the video controller 103 may be directly connected by a CPU bus.

Numeral 92 denotes an OPTRDY signal which functions as a signal for showing an option designated by the video controller 103, for example, whether the stapler is in condition for use or not, and is transmitted from the option controller unit 106 to the video controller 103. Numeral 93 is a POUTT signal which functions as a timing signal used when the printer 102 main body discharges recording sheets. Numeral 94 is a PFEDT signal which functions as a signal for showing a timing used when the printer 102 main body receives recording sheets from the option unit. Numeral 95 denotes a SPCNG signal which functions as a signal to slow down recording sheets high-speed carried in the option unit to match it with carrying speed of the printer 102 main body.

Numeral 81 denotes a communication interface, through which commands such as sheet feed designation to the sheet feed cassette of the printer 102 main body, sheet discharge designation to the sheet discharge tray 231 of the printer 102 main body and printing are transmitted from the video controller 103 to the engine controller 105, and statuses such as the presence/absence of sheet status, sheet jam and the like in the cassette 230 of the printer 102 main body are sent from the engine controller 105 to the video controller 103. Numeral 82 denotes a VDO signal which shows bit data to be transmitted from the video controller 103.

Besides, although not shown, controls for each process by the engine controller 105 are executed based on signals exchanged with the video controller 103. As such signals, there are /CPRDY, /PPRDY, /RDY, /PRNT, /VSREQ, /VSYNC, /BD, /SCLK, /CMD, /CBSY, /STS, /SBSY, /CCRT (Condition Change ReporT), details of which are shown in FIG. 16.

FIG. 16 is a diagram schematically showing signals exchanged between the video controller (VC) 103 and the engine controller (EC) 105.

Further, among the abovementioned signals, to take a method for using the /CCRT signal as an example, the process is as shown in following procedure 1 and procedure 2.

(Procedure 1)

The video controller 103 usually checks the /RDY signal and the /CCRT signal, and reads status information if there is any change in these signals. In the instance, if the /CCRT signal is "FALSE" and the /RDY signal is "FALSE", the video controller 103 checks the statuses of the content such as misprinting, waiting, sleep, operator call and the like, and depending on the results, refers to the lower status corresponding to each bit and confirms the details.

(Procedure 2)

On the other hand, if the /CCRT signal is "TRUE", the video controller 103 first reads the statuses of the content such as sheet size change, change of presence/absence of sheets in the sheet feed unit, sheet feed unit function change, warning content change and the like, then recognizes the type of the changed status and reads the statuses in the group one after another to recognize the details. Further, concerning the resetting procedure of the /CCRT signal, the engine controller 105 always checks the status change of the end of the sheet, that is, alteration of the sheet size, change of presence/absence of sheets, alteration of the sheet feed unit function and change of the warning state, and if there is any change, sets its upper state change status at "1" and at the same time, makes the /CCRT signal of a hard signal "TRUE". Thereafter, the engine controller 105 receives a status request command from the video controller 103, and makes the /CCRT signal "FALSE" with the fact that the state change status is read in the video controller 103.

Further, the supervising interface 90 is composed of the serial communication interface 91 and five hard signals such as the OPTRDY signal 92, the POUTT signal 93, the PFEDT signal 94 and the SPCNG signal 95.

Further, three signals of the POUTT signal 93, the PFEDT signal 94 and the SPCNG signal 95 are output from the engine controller 105, and is input in the option controller unit 106 through the video interface 80 and through the video controller 103. Details of the abovementioned each signal are as shown in FIG. 17.

FIG. 17 is a diagram schematically showing signals exchanged between a video controller (VC) 103, an engine controller (EC) 105 and an option controller (OC) unit 106.

Figure 18:
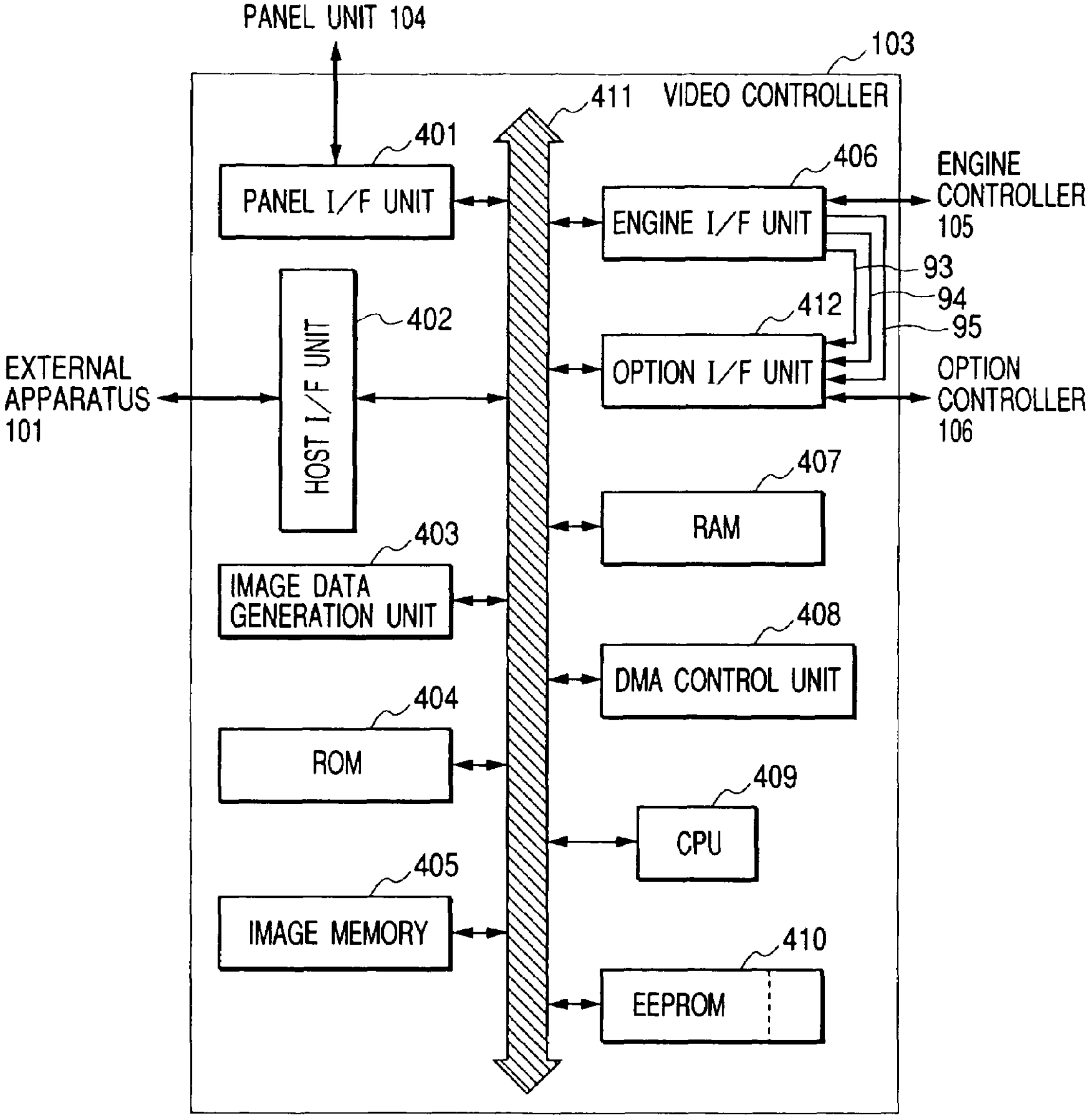
FIG. 18 is a block diagram showing the structure of the video controller shown in FIG. 13.

FIG. 18 is a block diagram showing the structure of the video controller shown in FIG. 13, and the same parts as those in FIG. 13 are given the same symbols.

In FIG. 18, numeral 401 denotes a panel interface (I/F) unit which receives various settings and designations of an operator from the panel unit 104 by data communication with the panel unit 104. Numeral 402 denotes a host interface (I/F) unit which is an input/output unit of signals exchanged with the external apparatus 101 such as a host computer. Numeral 406 denotes an engine interface (I/F) unit which is an input/output unit of signals exchanged with the engine controller 105, and forwards data signals form an output buffer register (not shown) and at the same time performs communication control with the engine controller 105.

Numeral 403 denotes an image data generation unit which generates bit map data for actual printing based on control code data sent by the external apparatus 101. Numeral 405 denotes an image memory which stores image data.

Numeral 409 denotes a CPU which manages the overall control of the video controller 103. Numeral 404 denotes a ROM which stores control codes of the CPU 409. Numeral 407 denotes a RAM which functions as temporary storage means used by the CPU 409. Numeral 410 denotes an EEPROM which is composed of a nonvolatile memory medium.

Numeral 408 denotes a DMA control unit which transfers the bid map data in the image memory 405 to the engine I/F unit 406 by designation from the CPU 409. Numeral 412 denotes an option interface (I/F) unit which communicates with the option controller unit 106 in accordance with designation from the CPU 409. Further, the option I/F unit transmits the POUTT signal 93, the PFEDT signal 94 and the SPCNG signal 95 through to the supervising interface 90 from the engine I/F unit 406.

Numeral 411 denotes a system bus which has an address bus and a data bus. The panel interface unit 401, the host I/F unit 402, the image data generation unit 403, the ROM 404, the image memory 405, the engine I/F unit 406, the RAM 407, the DMA control unit 408, the CPU 409, the EEPROM 410, and the option I/F unit 412 are connected to the system bus 411 respectively, and can access all the function units on the system bus 411.

Further, control codes for controlling the CPU 409 are composed of an OS for performing time-sharing control for each load module called a task by a system clock (not shown), and a plurality of load modules (tasks) operating for each function.

By the abovementioned structure, the video controller 103 controls the handling of storage media for feeding or discharging sheets to the printer 102 having a plurality of sheet feed and discharge ports that can record images in a recording medium based on printing information input by the external apparatus 101.

Hereinafter, a method for the video controller 103 to collectively control each option unit through the option controller unit 106 will now be described with reference to FIGS. 19, 20A and 20B.

Figure 19:
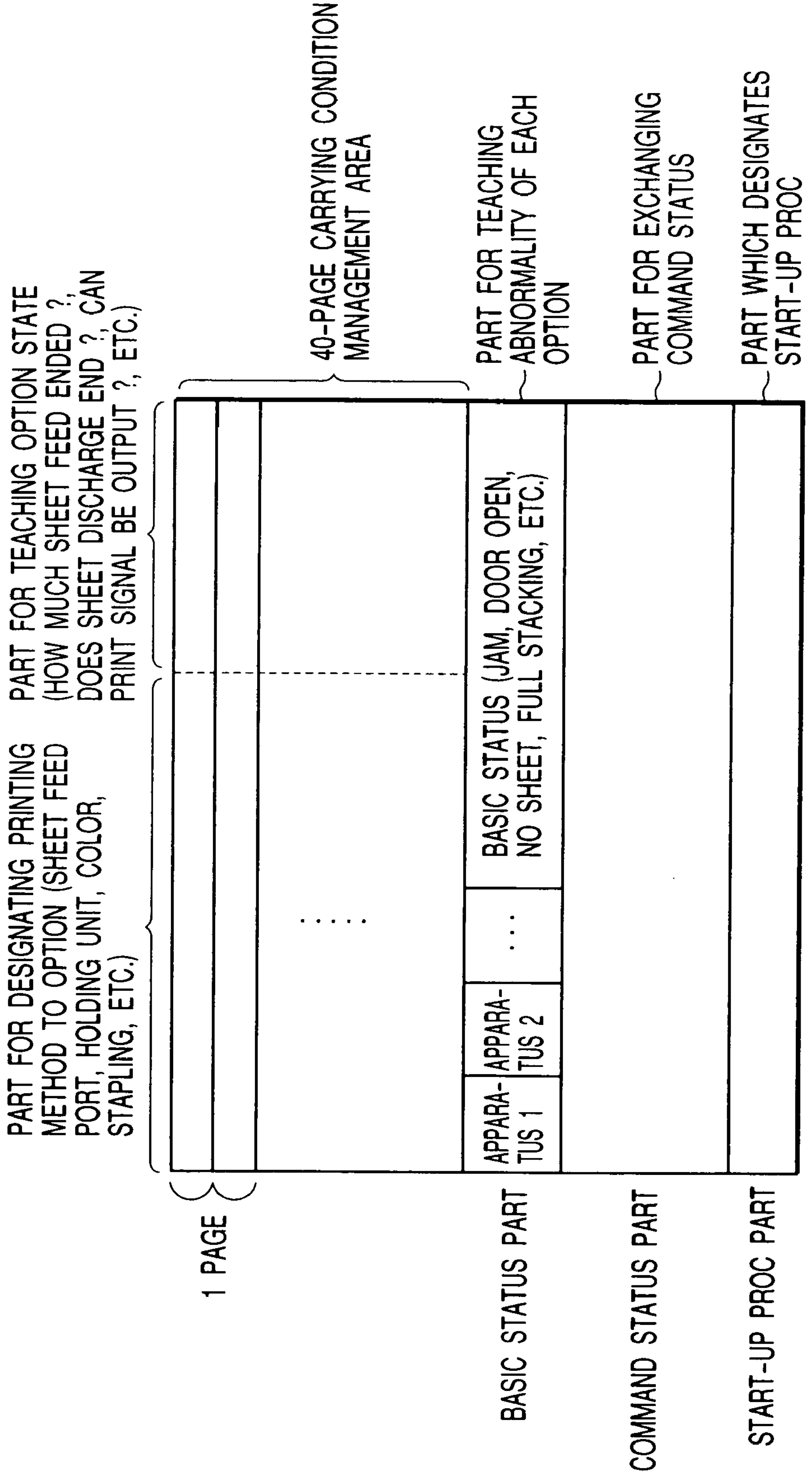
FIG. 19 is a schematic diagram of a common memory shared with the video controller secured in a RAM provided in the option controller shown in FIG. 13.

FIG. 19 is a schematic illustration of a common memory shared with the video controller 103 secured in the RAM provided in the option controller unit 106 shown in FIG. 13.

The common memory shown in FIG. 19 consists of an carrying status management area for performing page designation and finding the carrying status of a sheet, a basic status unit for finding an abnormality state of each option, a command status unit for exchanging command statuses, and a start-up process unit for designating the option unit start-up process.

The start-up process unit consists of a start-up designating portion for performing designation from the video controller 103, and a notification portion for notifying that, as a result of performing the designation, each option has ended the process.

The video controller 103 performs the start-up process of each option unit by performing designation to the start-up process unit. When a power source is input, the video controller 103 notifies the start-up designation unit of an initial designation of the common memory, designation for obtaining structure information of each option unit necessary in the option controller unit 106, end of obtaining information and the like, and observes the end notification portion to find if each process is ended, and if all the process is ended, the start-up process ends.

The carrying status managing area consists of a part where printing method such as a sheet feed port, a holding unit, color/black and white, stapling position and execution is designated, and a part which teaches option state such as how much sheet feed ended, whether a print signal can be output or not, whether sheet discharge ends or not. The video controller 103 designates the abovementioned printing method and executes printing while grasping the state of each option.

The abovementioned designation can designate 40 pages as the maximum, performs designation in order for each page, regards an area for which sheet discharge is ended as an empty area and initializes the area so that it can be designated again, and uses the initialized area as a ring buffer.

The basic status unit is an area for notifying an abnormal state of each unit, and the states such as no sheet, sheet size inconsistency, door open, sheet jam, breakdown, full stacking, no staple and the like are obtained from this area. Depending on the content of the basic status, more detailed information is obtained by the command status unit.

The command status unit is an area for obtaining detailed information of each option and controlling operations of each option, designates a command in this area as necessary, and obtains information. For example, obtainable information includes the name of a unit, sheet size for sheet feed implementation, a residual quantity of sheets for sheet feed, a position and a type of sheet jam, an access point, a stacked quantity of sheets for sheet discharge, details of breakdown and the like which issue commands corresponding to each state and receive statuses as shown in later-described FIGS. 20A and 20B. Further, controls of options such as transition to the power saving mode, emergency stop at the time of sheet jam, removal of sheet discharge bins, execution of reset and the like are also performed using the command status unit.

Figure 20A:
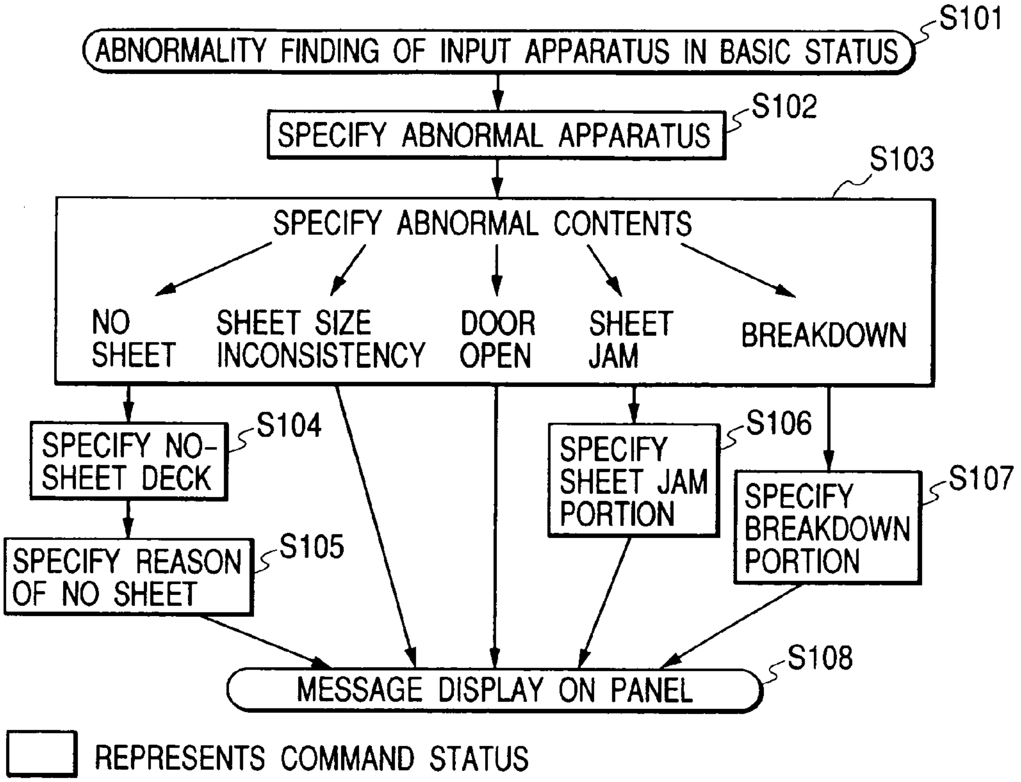
FIGS. 20A and 20B are flow charts showing a fourth control process procedure of the image recording system to which the data processing apparatus and the image recording apparatus of the present invention are applicable.
Figure 20B:
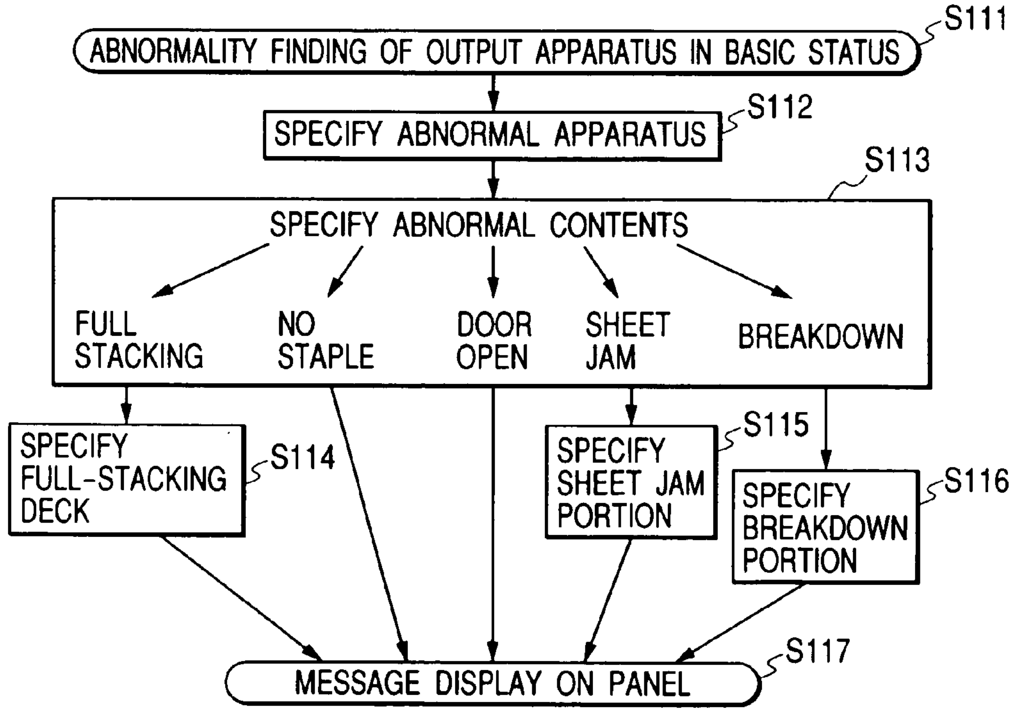

FIGS. 20A and 20B are flow charts showing a fourth control process procedure of the image recording system to which the data processing apparatus and the image recording apparatus of the present invention are applicable which corresponds to the procedure in which the video controller 103 shown in FIG. 13 obtains detailed information of each of the input and output options by issuing a command status based on the basic status, and the CPU 409 in the video controller 103 shown in FIG. 18 executes the procedure based on a program stored in the ROM 404. Further, FIG. 20A corresponds to a case where an abnormality of the input unit is found and FIG. 20B corresponds to a case where an abnormality of the output unit is found. It should be noted that symbols S101 to S108 and S111 to S117 show respective steps.

Upon finding an abnormality of the input unit by the basic status unit of the common memory shown in FIG. 19 (S101), the video controller 103 first designates a command in the command status unit and specifies an abnormal unit (if a plurality of input option units are connected, specifies which input unit is abnormal) (S102) as shown in FIG. 20A.

The video controller 103 further designates a command in the command status unit and specifies an abnormal content (no sheet, sheet size inconsistency, door open, sheet jam, breakdown, etc.) (S103).

Next, the video controller 103 designates a command corresponding to the specified abnormal content and, for example, specifies a no-sheet deck (S104) and specifies a reason of no sheet (S105) in case of no sheet, specifies a sheet jam portion (S106) in case of sheet jam, and specifies a breakdown portion (S107) in case of breakdown.

The video controller 103 then displays a message indicating the abnormal content obtained by the abovementioned command on the panel unit 104, the operation unit 107*b*, the display unit of the external apparatus 101 and the like.

Further, as shown in FIG. 20B, upon finding an abnormality of the output unit by the basis status unit of the common memory shown in FIG. 19 (S111), the video controller 103 designates a command in the command status unit and specifies an abnormal unit (if a plurality of output option units are connected, specifies which output unit is abnormal) (S112).

The video controller 103 further designates a command in the command status unit and specifies an abnormal content (full stacking, no staple, door open, sheet jam, breakdown and the like) (S113).

Next, the video controller 103 designates a command corresponding to the specified abnormal content and, for example, specifies a full-stacking deck (S114) in case of full stacking and specifies a sheet jam portion (S115) in case of sheet jam, and specifies a breakdown portion (S116) in case of breakdown.

The video controller 103 then displays a message indicating the abnormal content obtained by the abovementioned command on the panel unit 104, the operating unit 107*b*, the display unit of the external apparatus 101 and the like.

In this way, the video controller 103 obtains the abovementioned information, executes printing if there is not abnormality, issues a command status specifying the abnormal portion if the occurrence of abnormality is detected from the basic status, further specifies an abnormal content for that unit, and performs collection of detailed information and control corresponding to the abnormality.

Figure 21:
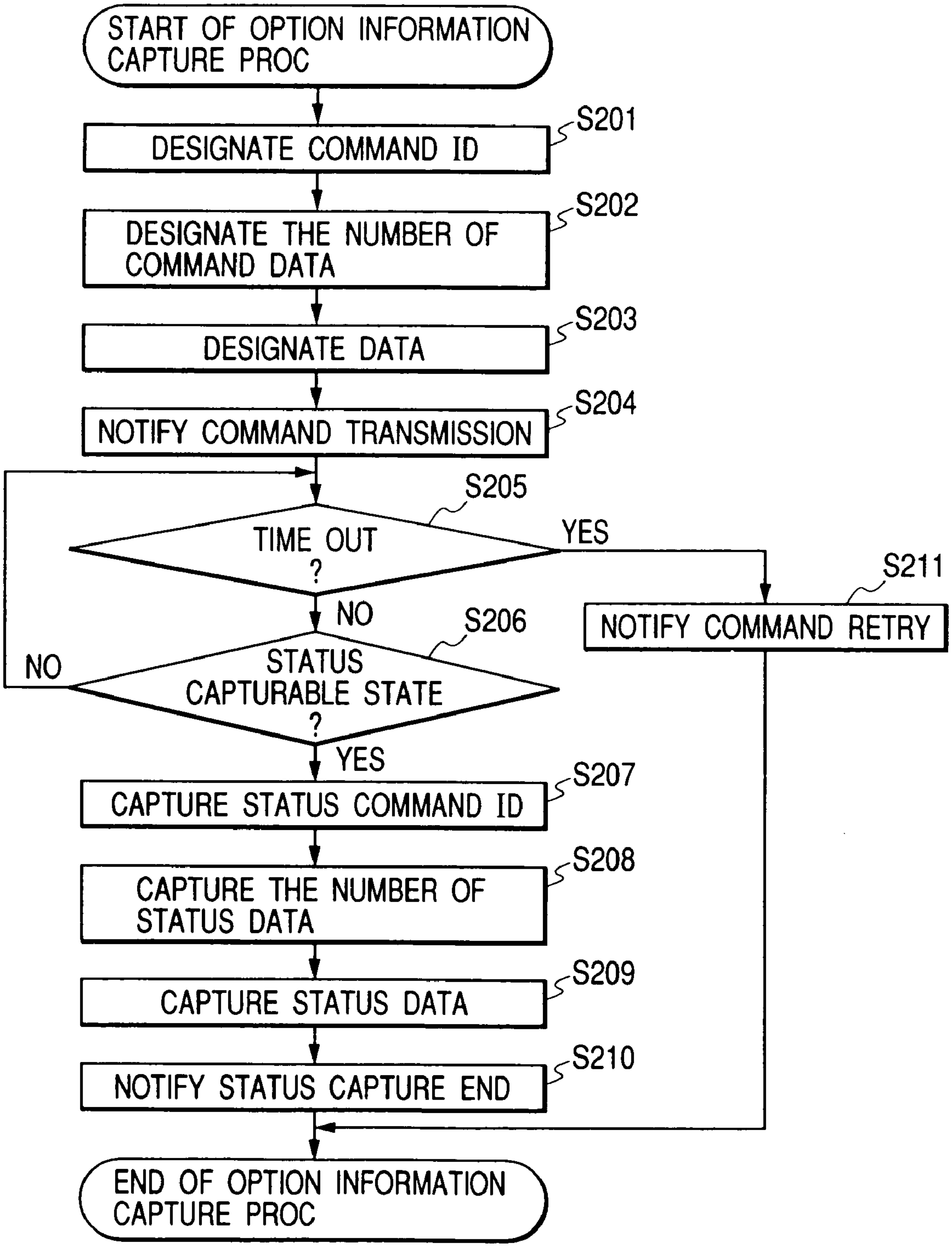
FIG. 21 is a flow chart showing a fifth control process procedure of the image recording system to which the data processing apparatus and the image recording apparatus of the present invention are applicable.

FIG. 21 is a flow chart showing fifth control process procedure of the image recording system to which the data processing apparatus and the image recording apparatus of the present invention are applicable which corresponds to the procedure in which the video controller 103 shown in FIG. 13 accesses the common memory of the option controller unit 106 and exchanges command statuses and information with each option, and the CPU 409 in the video controller 103 shown in FIG. 18 executes the procedure based on the program stored in the ROM 404. It should be noted that symbols S201 to S211 show respective steps.

When option information is captured, the video controller 103 makes designation to the command status management area in the memory held by the option controller unit 106, and receives the information. The video controller 103 designates an ID identifying the type of necessary information in a predetermined address in the command designation area (S201), designates the number of data to be designated to the option controller unit 106 in a predetermined address by the execution command (S202), and designates data representing the designated content in a predetermined address (S203).

Next, the video controller 103 notifies that the command is sent, and triggers for the option controller unit 106 to obtain information by communicating with each option unit (S204).

The option controller unit 106 performs serial communication with a necessary option unit based on the trigger by the step S204 and the designated content, and obtains the designated information. On the other hand, the video controller 103 keeps the timer activated until the option controller unit 106 obtains the information completely and observes if the video controller 103 is in the status information capturable state (S205, S206).

If the process does not proceed to the status information capturable state in the step S206 although a fixed time has passed in the step S205, since the status information cannot be captured, the video controller 103 notifies command retry to execute command again (S211), and the process ends.

On the other hand, before a fixed time passes in the step S205, if the process proceeds to the status information capturable state in the step S206, the video controller 103 obtains the ID of a status, and confirms if the status information is that corresponding to the designated command (S207).

The video controller 103 then obtains the number of status data (S208), obtains status data for the number of status data (S209), notifies the option controller unit 106 that the status capture is ended (S210), and the process ends.

Data flow from the external apparatus 101 shown in FIG. 13 to the option controller unit 106 and the engine controller 105 will now be described with reference to FIGS. 22 to 25.

Figure 22:
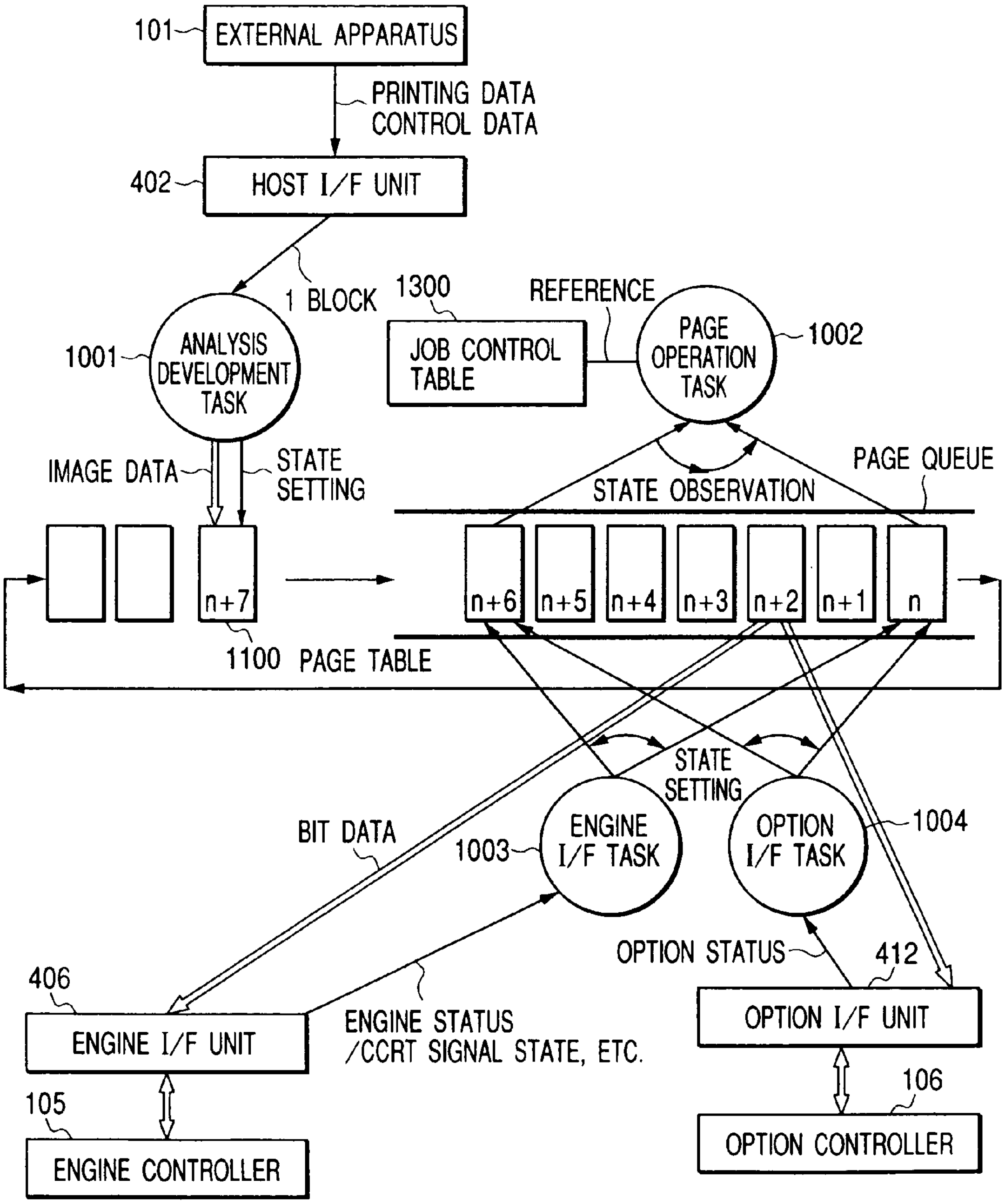
FIG. 22 is a diagram schematically showing a data flow from an external apparatus to the option controller and the engine controller shown in FIG. 13.

FIG. 22 is a diagram schematically showing a data flow from the external apparatus 101 to the option controller unit 106 and the engine controller 105 shown in FIG. 13.

Further, control codes for controlling the CPU 409 of the video controller 103 shown in FIG. 18 are composed of an OS for performing time-sharing control for each load module called a task by a system clock (not shown), and a plurality of load modules (tasks) operating for each function.

A translator processing system (an analysis development task 1001), a scheduling system (a page operation task 1002), an engine I/F system (an engine I/F task 1003) and an option I/F system (an option I/F task 1004) shown in FIG. 22 are tasks with the CPU 409 as an entity as described above, and operates logically in parallel.

Figure 23:
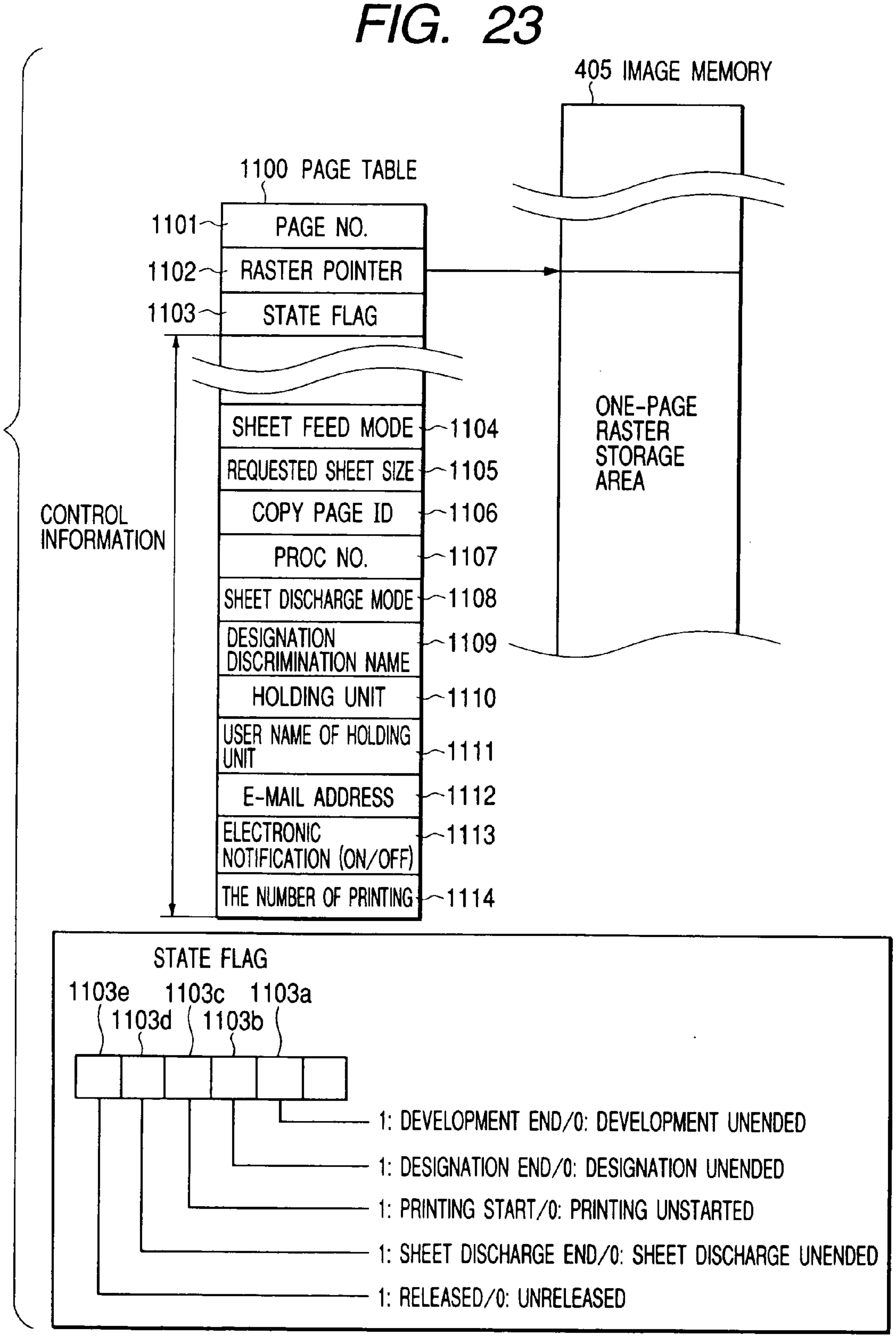
FIG. 23 is a diagram schematically showing the structure of a page table stored in a RAM shown in FIG. 18.

FIG. 23 is a diagram schematically showing the structure of the page table stored in the RAM 407 shown in FIG. 18.

In FIG. 23, numeral 1100 denotes a page table which stores page information. The page table 1100 is a table for logically recognizing each page in the CPU 409, and is composed of "a page number" 1101, "a raster pointer" 1102, "a state flag" 1103, . . . , "a sheet feed mode" 1104, "a requested sheet size" 1105, "a copy page ID" 1106, "a process number" 1107, "a sheet discharge mode" 1108, "a designated discrimination name" 1109, "a holding unit" 1110, "the user name of a holding unit" 1111, "an E-mail address" 1112, "an electronic notification (ON/OFF)" 1113, "the number of copies" 1114 and the like, and an entity is exists in a control information storage area (not shown) of the RAM 407 shown in FIG. 18 as a continuous area and its capture and release are controlled by a page management function unit (not shown) or the CPU 409.

"The raster pointer" 1102 in the page table 1100 is a top pointer in a one-page area in the image memory 405 shown in FIG. 18, and the CPU 409 divides the area (not shown) in the image memory 405 for each page and links it to the raster pointer 1102 at the time of initialization upon inputting a power source.

Figure 25:
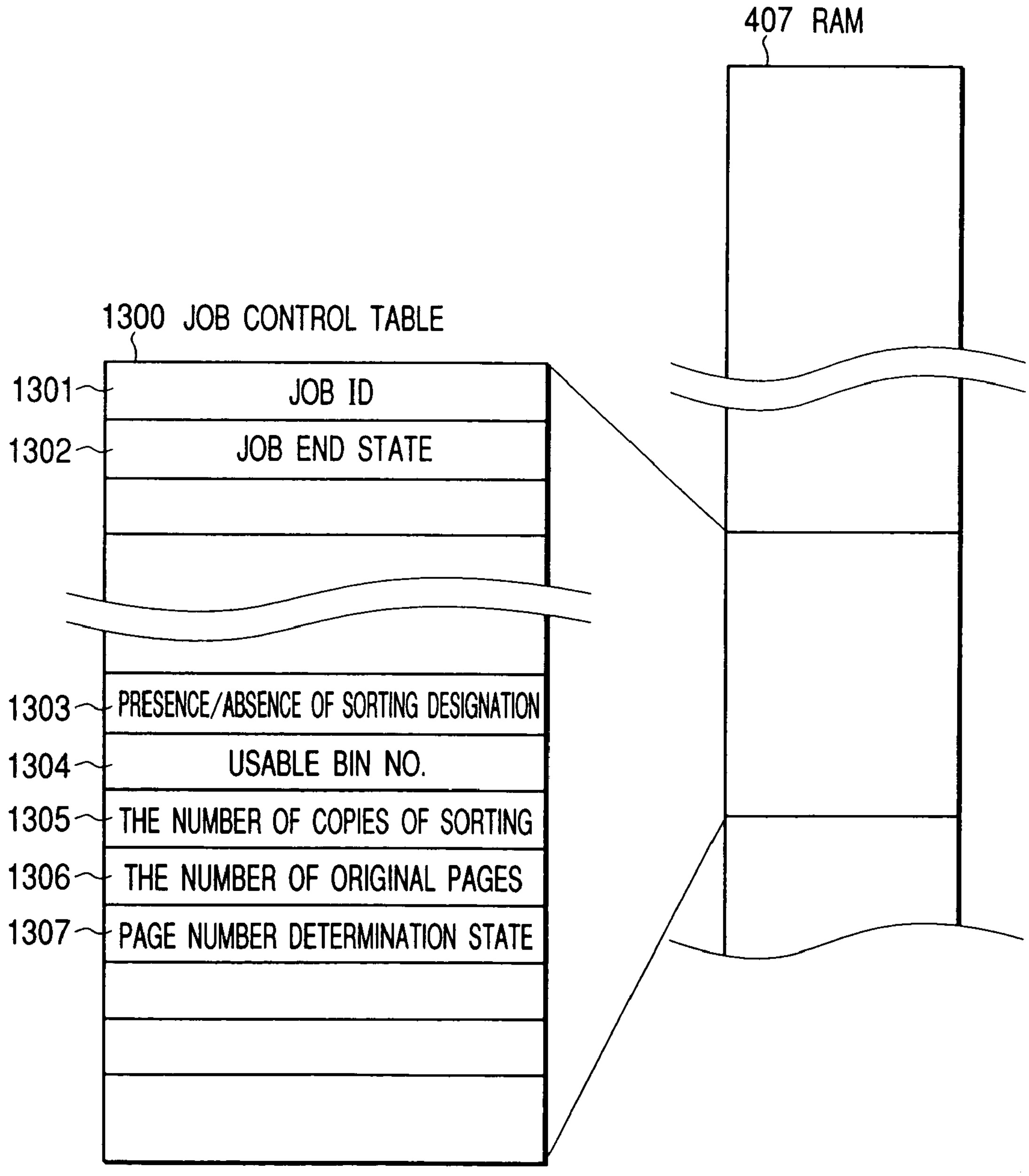
FIG. 25 is a diagram schematically showing the structure of a job control table stored in the RAM shown in FIG. 18.

Further, "the state flag" 1103 is an area for storing a flag indicating the state of a page and, as shown in FIG. 25, includes "a development end flag" 1103*a* indicating development ended/unended of a page, "a page designation end flag" 1103*b* indicating designation ended/unended of a page, "a printing start flag" 1103*c* indicating printing started/unstarted of a page, "a sheet discharge end flag" 1103*d* indicating sheet discharge ended/unended of a page, "a release flag" 1103*e* indicating released/unreleased of a page information development area and the like, and can determine what state page information prepared by the state flag is in.

Moreover, "the sheet feed mode" 1104 is for instructing a determination method of sheet feed means, and includes "an automatic sheet feed" (not shown), "a cassette 1 (cassette 230) sheet feed," "a paper deck (cassette 107) sheet feed," "an MP tray (manual paper feed tray 202**) sheet feed" and the like, "the automatic sheet feed" is a mode in which a sheet is retrieved and determined in accordance with a predetermined priority from sheet feeding means having a consistent sheet size on which sheets are mounted.

Further, "the requested sheet size" 1105 stores a numerical representation value of a sheet size which sheet feed is requested to the engine controller 105.

Further, "the sheet discharge mode" 1108 indicates the determination method of the sheet discharge means, and "mailbox sheet discharge" is designated in "the sheet discharge mode" 1108.

Figure 26:
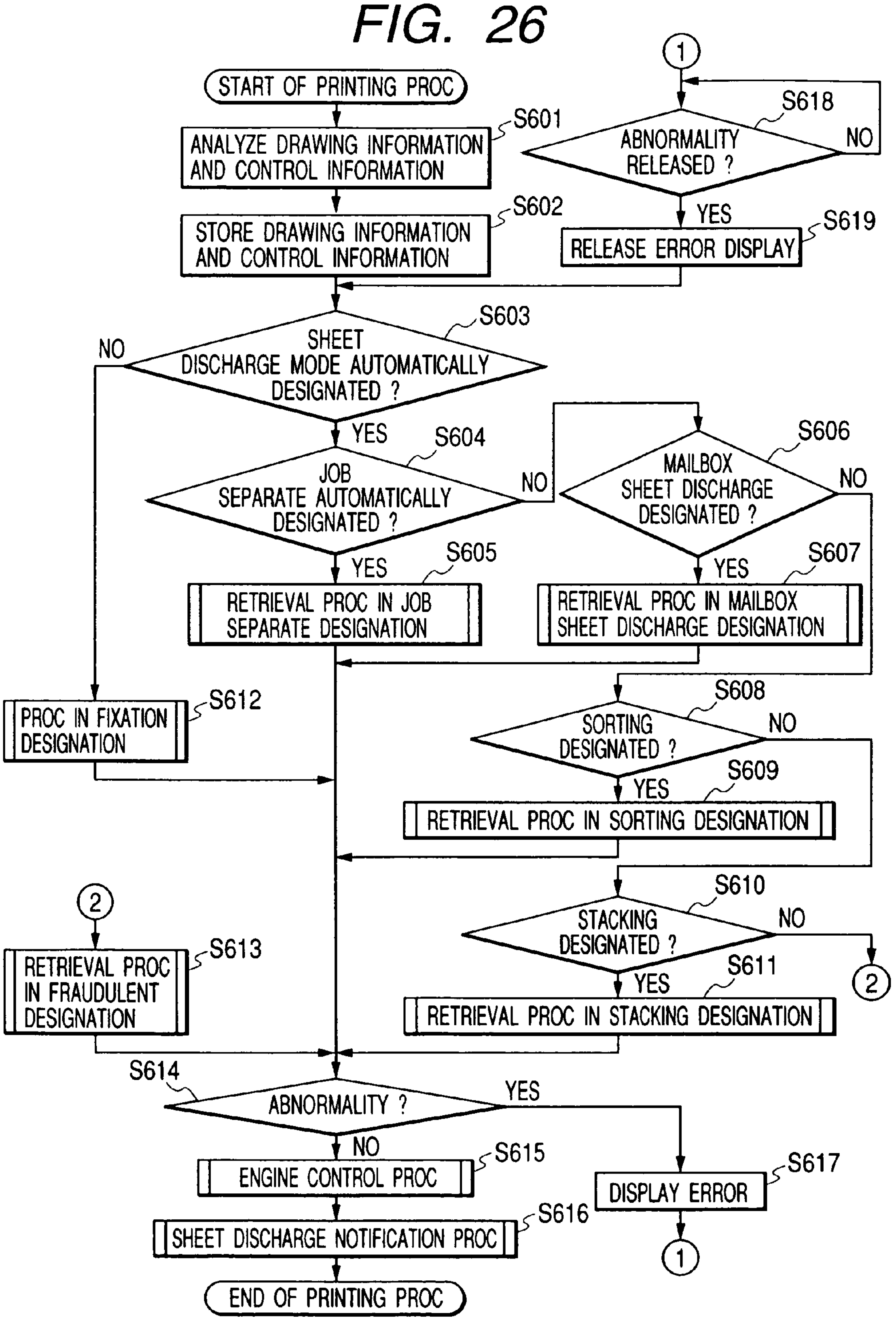
FIG. 26 is a flow chart showing a sixth control process procedure of the image recording system to which the data processing apparatus and the image recording apparatus of the present invention are applicable.
Figure 27:
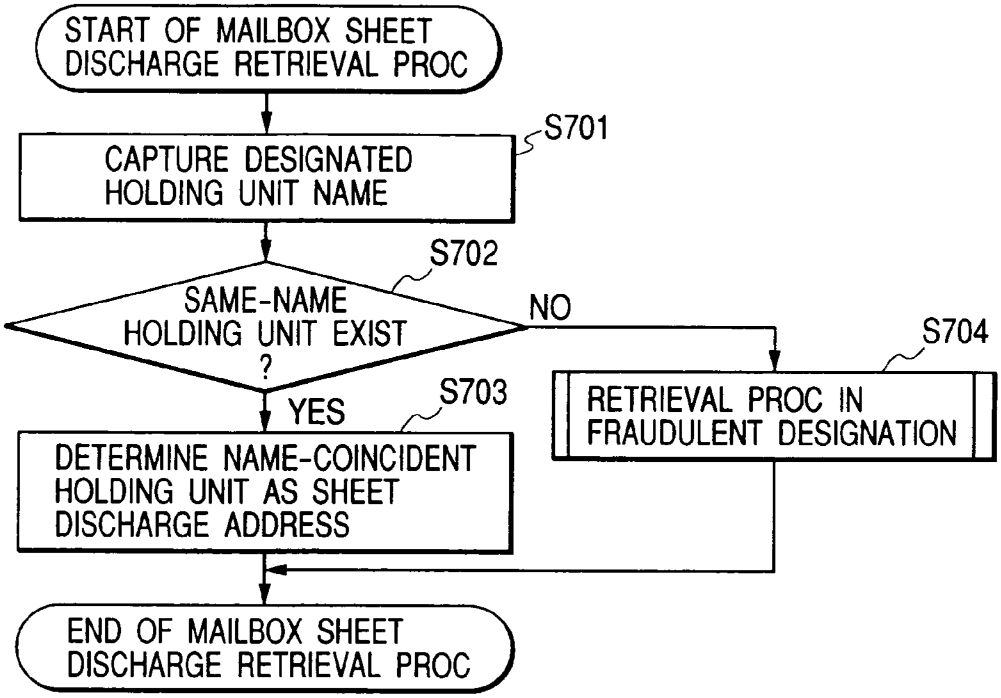
FIG. 27 is a flow chart showing a seventh control process procedure of the image recording system to which the data processing apparatus and the image recording apparatus of the present invention are applicable.

When "mailbox sheet discharge" is being designated in "the sheet discharge mode" 1108, the name (including the group name set through the area 3001 on the screen of FIG. 4, and the user name set through the area 3003) designated as the distribution address from the user based on the holding unit name information registered at each holding unit is stored in "the discrimination name" 1109, and the actual holding unit determined by a holding unit retrieval process shown in later-described FIGS. 26 and 27 is stored in "the holding unit" 1110.

For example, it explains by using the example of FIG. 4. In "the discrimination name" 1109, the information representing the group "baseif" and the information representing the user "kakky" are set. In "the holding unit" 1110, the information representing the bins 5 to 7 corresponding to the bins belonging to the group "baseif" and the information representing the bin 2 corresponding to the user "kakky" are set as the sheet discharge target bins.

Further, when "the discrimination name" 1109 is designated by the group name, the user name and the E-mail address registered in "the holding unit" 1110 determined are retrieved from the information representing the holding unit name registered at each holding unit, and the user name and the E-mail address retrieved are stored in "the user name of the holding unit" 1111 and "the E-mail address" 1112 respectively (i.e., in the example of FIG. 4, the information representing the user name and the E-mail address of the user corresponding to this user name is set for four users).

Further, when it is designated at the printing data designation time to perform the E-mail notification after the sheet discharge, "ON" is stored in "the electronic (E-mail) notification (ON/OFF)" 1113. Accordingly, in the case where "the electronic (E-mail) notification (ON/OFF)" 1113 is "ON", the distribution notification by the E-mail is performed based on the information stored in "the E-mail address" 1112.

Further, the number indicating the number of copies is stored in "the number of copies" 1114.

Figure 24:
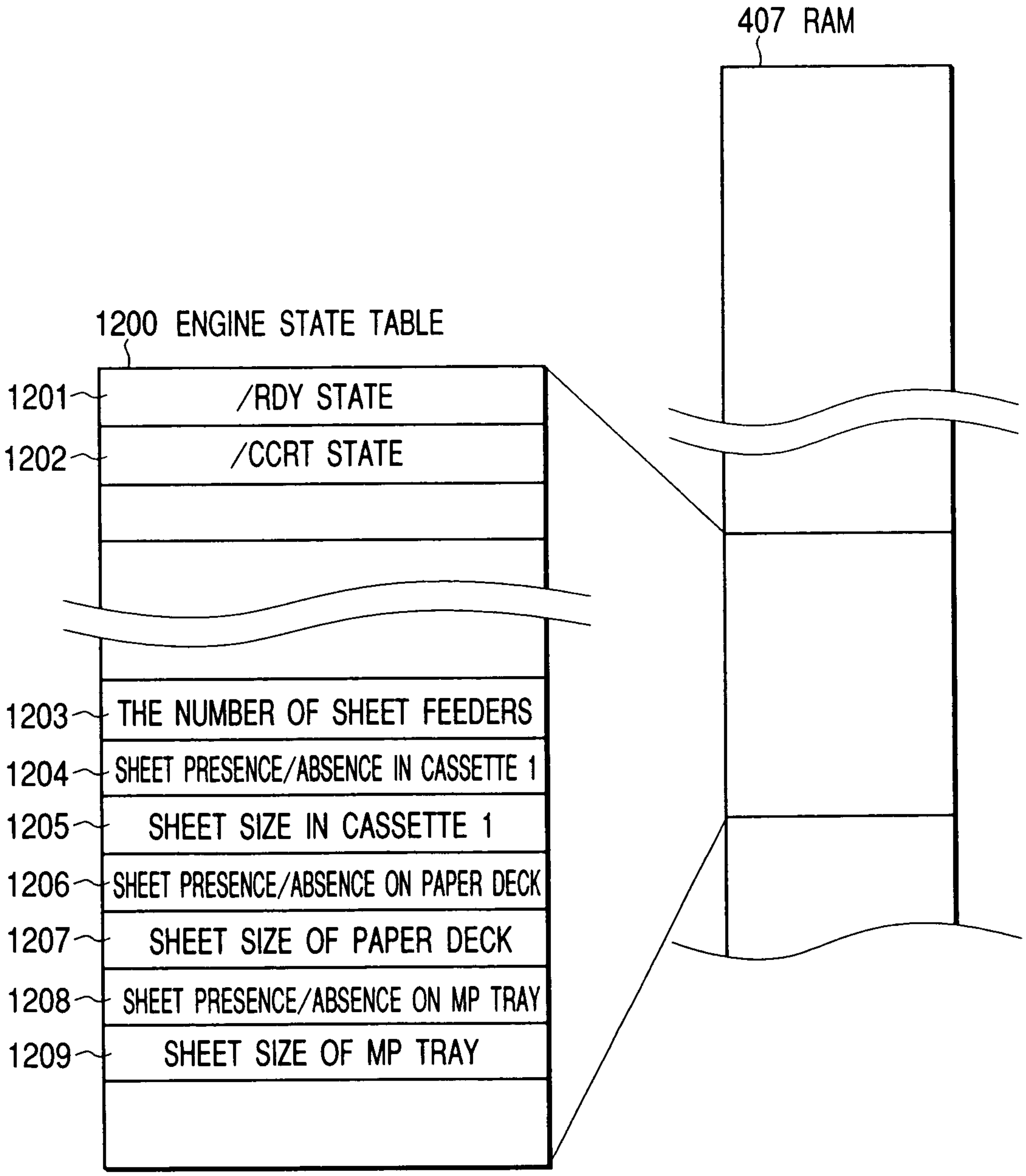
FIG. 24 is a diagram schematically showing the structure of an engine state table stored in the RAM shown in FIG. 18.

FIG. 24 is a diagram schematically showing the structure of the engine state table stored in the RAM 407 shown in FIG. 18.

In FIG. 24, numeral 1200 denotes an engine state table which is a table indicating the states of the engine controller 105 and the option units (106, 107, 108) held in the video controller 103, is composed of a "/RDY state" 1201, a "/CCRT state" 1202, . . . , "the number of sheet feeders" 1203, "a sheet presence/absence in cassette 1" 1204, "a sheet size in cassette 1" 1205, "a sheet presence/absence in paper deck" 1206, "a sheet size in paper deck" 1207, "a sheet presence/absence in MP tray" 1208, "a sheet size in MP tray" 1209 and the like, is not identical with the states of the actual engine controller 105 and the option units (106, 107, 108) but is updated reflecting the states of the engine controller 105 and the option units (106, 107, 108) by a predetermined communication in an arbitrary timing.

For example, "the /RDY state" 1201 is a flag reflecting the state of the /RDY signal shown in FIG. 16 which is made "TRUE" while the engine I/F task detects "FALSE" of the /RDY signal.

Further, "the /CCRT state" 1202 is a flag reflecting the state of the /CCRT signal shown in FIG. 16, on which the state of the actual /CCRT signal is reflected by the engine I/F task. The /CCRT signal is made "FALSE" as previously described by the engine I/F task detecting "TRUE" of the /CCRT signal and capturing the state of the engine controller 105 by a predetermined serial communication.

Further, "the number of sheet feeders" 1203 is the number of sheet feeders that can be selected reflecting the insertion of an option cassette unit and the like.

Further, "the sheet presence/absence in cassette 1" 1204 is presence/absence of sheets in the cassette 230, and "the sheet size in cassette 1" 1205 is a sheet size set by a dial (not shown) of the cassette 230 which is recognized as the sheet size of the cassette 230 on the premise that an operator mounts sheets having a size identical with a dial value.

Further, "the sheet presence/absence in paper deck" 1206 is presence/absence of sheets in the sheet feed option unit 107. "The sheet size in paper deck" 1207 is a sheet size set by a partition plate (not shown) of the sheet feed option unit 107 which is recognized as the sheet size of the sheet feed option unit 107 on the premise that an operator mounts sheets having the identical size with a partition plate.

"The sheet presence/absence in MP tray" 1208 is presence/absence of sheets in the manual paper feed tray 202, "The sheet size in MP tray" 1209 is a sheet size detected by a sensor (not shown) of the manual paper feed tray 202.

Further, both of the table, the page table shown in FIG. 23 and the engine state table shown in FIG. 24 (not shown in FIG. 22), are referred to and updated from the analysis development task, the page operation task, the engine I/F task, and the option I/F task.

FIG. 25 is a diagram schematically showing the structure of the job control table stored in the RAM 407 shown in FIG. 18.

In FIG. 25, numeral 1300 denotes a job control table which is a table for controlling a job in the CPU 409. The job control table 1300 is composed of "a job ID" 1301, "a job end state" 1302, . . . , "a presence/absence of sorting designation" 1303, "a usable bin number" 1304, "the number of copies of sorting" 1305, "the number of original pages" 1306, "a page number determination state" 1307 and the like, and an entity exists in a control information storage area (not shown) of the RAM 407 shown in FIG. 17 as a continuous area and its capture and release are managed by the CPU 409.

Hereinafter, a data flow of FIG. 22 will be described.

As shown in FIG. 22, printing data (control codes, PDL, etc.) input from the external apparatus 101 is stored for a predetermined blocks in the host I/F unit 402.

"The analysis development task" 1001 captures the page table 1100 shown in FIG. 23 upon detecting data in the host I/F unit 402, Then, "the analysis development task" 1001 analyzes the data for the abovementioned one block, and develops image using the image data generation unit 403 shown in FIG. 18 concerning image forming information (a figure drawing command of PDL, character codes, etc.) or by the CPU 409 itself to store the developed image in an area pointed by "the raster pointer" 1102 of the page table 1100 shown in FIG. 23.

Further, control information for a printer (the number of copies (the number of printing), selection of sheet feed (a sheet feed mode), etc.) is stored in the page table 1100 shown in FIG. 23. After ending the analysis and the development of data for one page, "the development end flag" in "the state flag" is made "TRUE" and is enqueued the a page queue (for example, provided in the image memory 405 and the EEPROM 410) of the FIFO structure.

"The page operation task" 1002 refers to the job control table 120 shown in FIG. 25, simultaneously observes "the state flag" 1103 in all the page tables 1100 in the abovementioned page queue, and changes the carrying procedure in accordance with the state to realize printing.

In the printing, printing designation such as sheet feed means, sheet discharge means, a printing mode and the like by the option I/F unit 412 and, at the same time, the setting of sheet feed means and the like is actually performed to the engine controller 105 by the engine I/F unit 406. The page table 1100 in which "the sheet discharge end flag" 1103*c* is made TRUE is dequeued from the page queue and returned to the page management function unit (not shown).

"The engine I/F task" 1003 and "the option I/F task" 1004 communicate with the engine controller 105 and the option controller unit 106 through the engine I/F unit 406 and the option I/F unit 412 respectively in a predetermined cycle and, when a factor due to which the state of a page changes occurs, update the abovementioned "state flag" 1103.

Further, "the engine I/F task" 1003 and "the option I/F task" 1004 observe a change of the /RDY signal, and set the printer status as an error occurring with respect to the change of "TRUE" to "FALSE" and, at the same time, observe the release of the error. Further, "the engine I/F task" 1003 and "the option I/F task" 1004 observe the change of state such as the /RDY signal and the /CCRT signal, executes the abovementioned (Procedure 1) and (Procedure 2), and updates "the engine state table" 1200 shown in FIG. 24.

An operation mode designation (the number of copies, selection of sheet feed, etc.) from the panel unit 104 are first stored in the panel I/F unit 401. A printer control task (not shown) goes round and observes the panel I/F unit 401 in an appropriate interval, and when data exists, stores the data in the EEPROM 410 and, at the same time, stores it in the control information storage area (not shown) of the RAM 407 as control information. By storing the data in the EEPROM 410, the printer can be operated by the mode desired by a user even after the power source of the printer is turned off.

Hereinafter, a process procedure until the printing data of the image recording apparatus 102 is received and printing is ended will be described with reference to FIG. 26.

FIG. 26 is a flow chart showing a sixth control process procedure of the image recording system to which the data processing apparatus and the image recording apparatus of the present invention are applicable which correspond to the process until the image recording apparatus 102 receives printing data from the external apparatus 101 such as a host computer and ends printing, and the CPU 409 shown in FIG. 18 executes the procedure based on a program stored in the ROM 404 or other storage media (not shown). It should be noted that symbols S601 to S618 show respective steps. Further, it is assumed that the steps S601 and S602 are executed by "the analysis development task" 1001, the steps S603 to S613, S618 and S619 are executed by "the page operation task" 1002, and the steps S614 to S617 are executed by "the engine I/F task" 1003.

First, in the step S601, "the analysis development task" 1001 analyzes the printing job (printing data, control data) sent from the external apparatus 101 such as the host computer or the like, and in the step S602, the control information and the drawing information are developed and stored in the memory. Namely, "the analysis development task" 1001 analyzes the received printing job, prepares the pages tables 1100 of the total page number (i.e., the sum of the numbers of printing of the respective holding unit names designated) to be printed in this printing job on the basis of the printing data control information (attribute information), and stores the prepared page tables 1100 in the RAM 407. Also, "the analysis development task" 1001 develops the drawing information (PDL data), and the stored the developed drawing information in the image memory 405.

Here, only the attribute designated as the printing data control information (attribute information) is stored in the page table 1100. Namely, the value representing the sheet discharge mode is stored in "the sheet discharge mode" 1108 of the page table 1100, and a character string representing the holding unit name is stored in "the discrimination name" 1109 of the page table 1100.

It should be noted that the retrieval process of the step S603 onwards is performed for each page table prepared as described above.

Next, in the step S603, whether the sheet discharge mode is the automatic designation or not is determined by "the page operation task" 1002, from the control information (attribute information) stored in the memory (RAM 407). If the sheet discharge mode is not the automatic designation, in the step S612, a holding unit fixedly designated based on the control information as the process at a fixed time is selected, and the process proceeds to the step S614.

On the other hand, if the sheet discharge mode is determined to the automatic designation from the control information in the step S603, whether a job separate is designated or not is determined in the step S604. If it is determined that the job separate is designated, the retrieval process at the time of designating the job separate is performed and the process proceeds to the step S614.

On the other hand, if it is determined that the job separate is not designated in the step S604, whether the mailbox sheet discharge is designated or not is determined in the step S606. If it is determined that the mailbox sheet discharge is designated, the retrieval process (shown in later-described FIG. 27) at the time of designating the mailbox sheet discharge is performed in the step S607, and the process proceeds to the step S614.

On the other hand, if it is determined that the mailbox sheet discharge is not designated in the step S606, whether the sort is designated or not is determined in the step S608. If it is determined that the sort is designated, the retrieval process at the time of designating the sort is performed and the process proceeds to the step S614.

On the other hand, if it is determined that the sort is not designated in the step S608, whether the stack is designated or not is determined in the step 610. If it is determined that the stack is designated, the retrieval process at the time of designating the stack is performed in the step S611, and the process proceeds to the step S614.

On the other hand, if it is determined that the stack is not designated in the step S610, the retrieval process at the time of fraudulent (or incorrect) designation is performed in the step S613, and the process proceeds to the step S614.

A stacking state and the like stored in the EEPROM 410 and each sensor (not shown) are checked by "the engine I/F task" 1003 in the step S614. If it is determined that there is no abnormality (no full stacking, no paper jam, or the like), the engine control process (printing process) is executed in the step S615, and the sheet discharge notification process (shown in later-described FIG. 28) is performed in the step S616.

On the other hand, if it is determined that there is an abnormality (e.g., an abnormality such as full stacking or the like) in the step S614, an error display corresponding to the content of the abnormality is made on the panel unit 104 of the image recording apparatus 102 in the step S616. At the same time, the content of the abnormality and the event of an error display are notified to the host computer 101. After waiting for the abnormality to be released by an operation of the user, if it is determined that the abnormality is released in the step S618, the error display on the panel unit 104 is released in the step S619. At the same time, the event of the error display release is notified to the host computer 101, and the process is repeated from the process of the step S603 to enter the recovery process.

When the process of the abovementioned steps S603 to S619 is repeated and the sheet discharge in the printing job completely ends, a printing job end notification event is transmitted to the host computer at each distribution address. Then, on the UI of the host computer, the sheet discharge notification process for notifying the user which holding unit the sheets were discharged to is performed.

FIG. 27 is a flow chart showing a seventh control process procedure of the image recording system to which the data processing apparatus and the image recording apparatus of the present invention are applicable, which corresponds to the mailbox sheet discharge retrieval process (the holding unit retrieval process at the time of the mailbox sheet discharge mode) shown in the step S607 of FIG. 26. Further, the process is executed by the CPU 409 shown in FIG. 18 based on the program stored in the ROM 404 or other storage media (not shown). It should be noted that symbols S701 to S705 show respective steps.

When the retrieval process of the mailbox sheet discharge mode is started, one holding unit name designated by printing data (printing job) is first captured in the step S701. Namely, the holding unit name ("the discrimination name" 1109) is captured from the page table 1100.

In the step S702, it is determined whether a same name holding unit exists or not by comparing the holding unit name (discrimination name) captured in the step S701 and the holding unit name (stored in the EEPROM 410) registered in each holding unit for the mailbox sheet discharge mode.

If it is determined that the same name holding unit exists in the step S702, the holding unit registered in that name is determined (designated) as the holding unit of the designated printing data in the step S703 with respect to the page of the page table which is currently referred to, and the process ends. Then, the procedure returns to the processes shown in FIG. 26, the printing process is actually executed in the step S615, and the sheet discharge operation is performed to the bin at the sheet discharge address determined in the step S703.

On the other hand, if it is determined that no same name holding unit exists in the step S702, the holding unit for escape is determined to be the holding unit of the designated printing data as the retrieval process at the time of fraudulent (or incorrect) designation, and the retrieval process in the mailbox sheet discharge ends in the step S704.

Hereinafter, the printing process, as the process in the step S615, of the image data transmitted from the host computer will be concretely explained with reference to the abovementioned example.

In the example shown in FIG. 4, the user setting has been established such that the recording sheet on which the image data of the first page of the text "investigation result.doc" was printed is distributed to the bins 5 to 7 belonging to the group "baseif" and the bin 2 corresponding to the user "kakky". Accordingly, on the basis of such the user setting, the host computer collects the sheet discharge address designation by group name and the sheet discharge address designation by user name into one instruction, correlates this instruction with the image data, sets the obtained data to one printing job, and then transmits the obtained printing job to the image recording apparatus 102. On the basis of the received printing job, the image recording apparatus 102 sets the data representing "baseif" and the data representing "kakky" to "the discrimination name" 1109 of the page table 1100 of FIG. 23 stored in the RAM 407. Then, in order to discharge the recording sheet on which the image data of the first page was printed to the bins, i.e., the bins 2, 5, 6 and 7 based on the set information, the printing operation of the image data of the first page received from the host computer and stored in the memory is repeated to the recording sheet four times, and the obtained printed materials are distributed to the respective bins.

As described above, in the present embodiment, in the case where the printing of the same page is performed and the plural copies are produced, the same page is not transmitted from the host computer plural times (e.g., the image of the first page is not transmitted from the host computer four times), but the image data received from the host computer is once stored in the memory, and then the printing of the same page is performed and the plural copies are produced by using the stored image data plural times. Further, the user on the host computer side sets the judgment whether performing the printing of the same page and producing the plural copies or not, and such the judgment is determined based on the analyzed result of the sheet discharge address designation information received in correspondence with the image data. In the above example, since the data representing the group "baseif" is included in the information, the printing process to the same page is performed at least three times to distribute the printed materials to the bins 5, 6 and 7 belonging to the group "baseif". In addition, since the sheet discharge address designation of the user "kakky" is also included, the printing process to the same page is performed four times.

Similarly, in a case where a series of image data in which each set consists of plural pages is printed plural times to produce plural copies, in response to reception of the sheet discharge designation command by group name in correspondence with the series of image data, the series of image data from the plural pages of one set is printed the number of times corresponding to the number of bins belonging to that group, and the obtained printed materials are distributed to the corresponding bins respectively.

Figure 28:
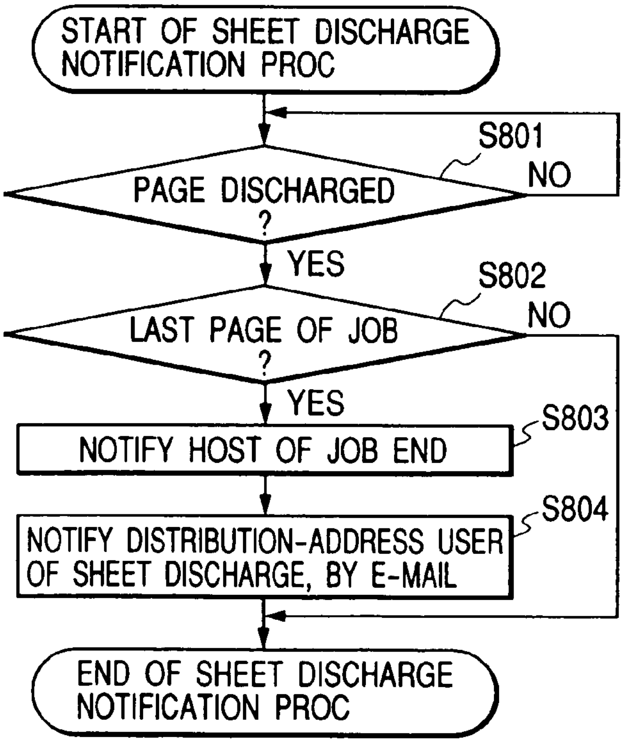
FIG. 28 is a flow chart showing an eighth control process procedure of the image recording system to which the data processing apparatus and the image recording apparatus of the present invention are applicable.

FIG. 28 is a flow chart showing an eighth control process procedure of the image recording system to which the data processing apparatus and the image recording apparatus of the present invention are applicable, which corresponds to the sheet discharge notification process (a notification process to the host computer at the sheet discharge end time or the job end time) shown in the step S616 of FIG. 26. Further, the process is executed by the CPU 409 shown in FIG. 18 based on the program stored in the ROM 404 or other storage media (not shown). It should be noted that symbols S801 to S804 show respective steps.

When the printing process is started, whether the page in question is discharged or not is determined in the step S801. If this page is not discharged yet, it waits a certain time and the judgment in the step S801 is again performed.

Conversely, if it is determined (discriminated) in the step S801 that this page is discharged, whether this page is the last page in the job or not is determined in the step S802. If it is determined that this page is not the last page yet, the sheet discharge process ends directly.

Conversely, if it is determined in the step S802 that this page is the last page, it notifies the host computer of the user at the distribution address that the job ended in the step S803.

Further, in the present invention, in the step S804, if the instruction "do not notify the E-mail after the printing" (see the E-mail notification/non-notification check box 3007 shown in FIG. 4) is not issued when the printing data is designated by the user of the printing origin (i.e., the client of the printing job), the E-mail whose content is shown in later-described FIG. 29 is transmitted to the users at all the distribution addresses after the printing ended, and then the sheet discharge notification process ends.

The determination whether the distribution notification should be performed or not is performed by checking the E-mail executable/unexecutable information designated by the checked state of the E-mail notification/non-notification check box 3007 of FIG. 4 set to "the E-mail notification" 1113 in the page table 1100 of FIG. 23. Further, the determination to which user the distribution notification should be performed is performed by checking the address information set to "the E-mail address" 1112 in the page table 1100 of FIG. 23.

The example shown in FIG. 4 will be concretely explained continuously. Since the information representing the E-mail addresses of the computers 101E, 101F and 101G of the users "utsu", "jmori" and "toitoi" belonging to the group "baseif" and the information representing the E-mail address of the computer 101B of the user "kakky" are set in "the E-mail address" 1112 in the page table 1100 of FIG. 23, the E-mails to be transmitted are created for the four users on the basis of the set information, and then the E-mails are actually transmitted to the respective user through the network.

Hereinafter, the content of the E-mail which is transmitted to the user at the distribution address after the printing in the mailbox sheet discharge ended will be explained with reference to FIG. 29.

FIG. 29 is a diagram schematically showing an example of the content of the E-mail transmitted to the user at the distribution address after the printing in the mailbox sheet discharge ended.

As described above, in the case where the sheet discharge in the mailbox sheet discharge ends, the image recording apparatus performs the distribution notification to the user at the distribution address by the E-mail in accordance with the E-mail address registered as well as the user name to each holding unit at the name registration time by the host computer.

This distribution notification notifies, e.g., the content shown in FIG. 29. Thus, the user who received the E-mail can easily know when the text of what content was distributed from whom how many.

In the example shown in FIG. 29, the user "utsu" who received the E-mail can confirm that the text "investigation result.doc" of the number of copy "1" and the number of sheet "1" was distributed from the user "yuichi" at "13:31" of "Oct. 10, 1999" to his mailbox (the holding unit registered by the name of this user "utsu" (the bin 5 in the example of FIG. 1)).

In the abovementioned example, such the notification sent to the computer of the user "utsu" is also sent to the personal computers of other distribution-target users "jmori", "toitoi" and "kakky" through the network respectively.

Hereinafter, an information update process procedure of each sheet discharge bin of the image recording apparatus of the present invention will be explained with reference to FIG. 30.

Figure 30:
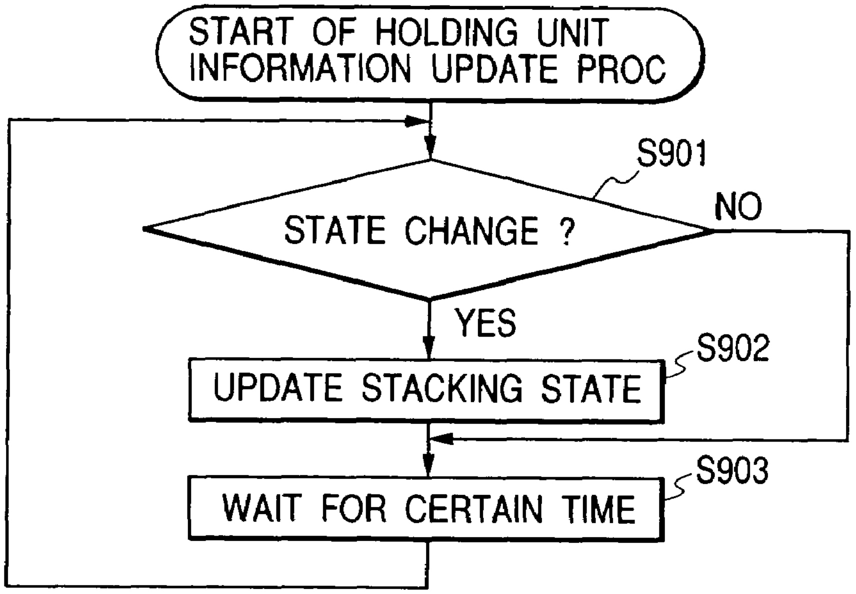
FIG. 30 is a flow chart showing a ninth control process procedure of the image recording system to which the data processing apparatus and the image recording apparatus of the present invention are applicable.

FIG. 30 is a flow chart showing a ninth control process procedure of the image recording system to which the data processing apparatus and the image recording apparatus of the present invention are applicable which corresponds to the information update process of each sheet discharge bin. In FIG. 30, the CPU 409 shown in FIG. 18 executes this control process based on a program stored in the ROM 404 or other storage media (not shown). It should be noted that symbols S901 to S903 show respective steps.

The state of the holding unit is updated (stored in the EEPROM 410 of FIG. 18) by obtaining status information whose state changes in a certain cycle interval (obtaining status information by accessing the common memory (FIG. 19) of the option controller unit 106 to exchange command statuses with the option).

First, in the step S901, whether there is any change in the stacking quantity (state) of each holding unit or not is determined by referring to the common memory of FIG. 19. If it is determined that there is a change, the stacking state of the discharge bin (the stacking state of the sheet discharge bin whose state was changed) stored in the EEPROM 410 of FIG. 18 is updated in the step S902, and the process proceeds to the step S903.

Conversely, if it is determined that there is no change in the stacking quantity (state) of each holding unit in the step S901, the process proceeds to the step S903 directly.

Next, in the step S903, the process waits for a certain time, and repeats the process of the step S901.

By the above processes, it is possible to surely update the information of the sheet discharge bin in the certain cycle interval.

Hereinafter, a process procedure for updating information and display indicating a printer state on the host computer 101 will be explained with reference to FIG. 31.

Figure 31:
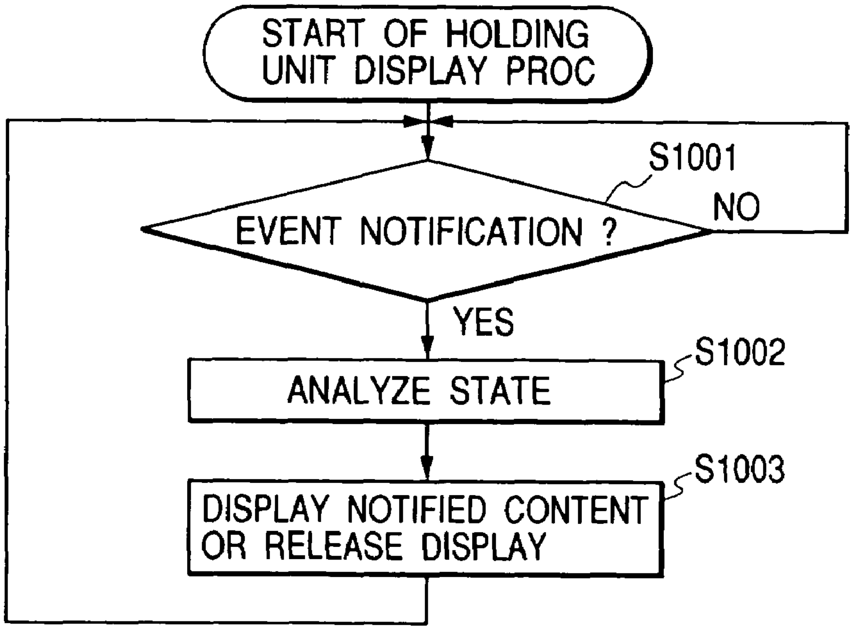
FIG. 31 is a flow chart showing a tenth control process procedure of the image recording system to which the data processing apparatus and the image recording apparatus of the present invention are applicable.
Figure 33:
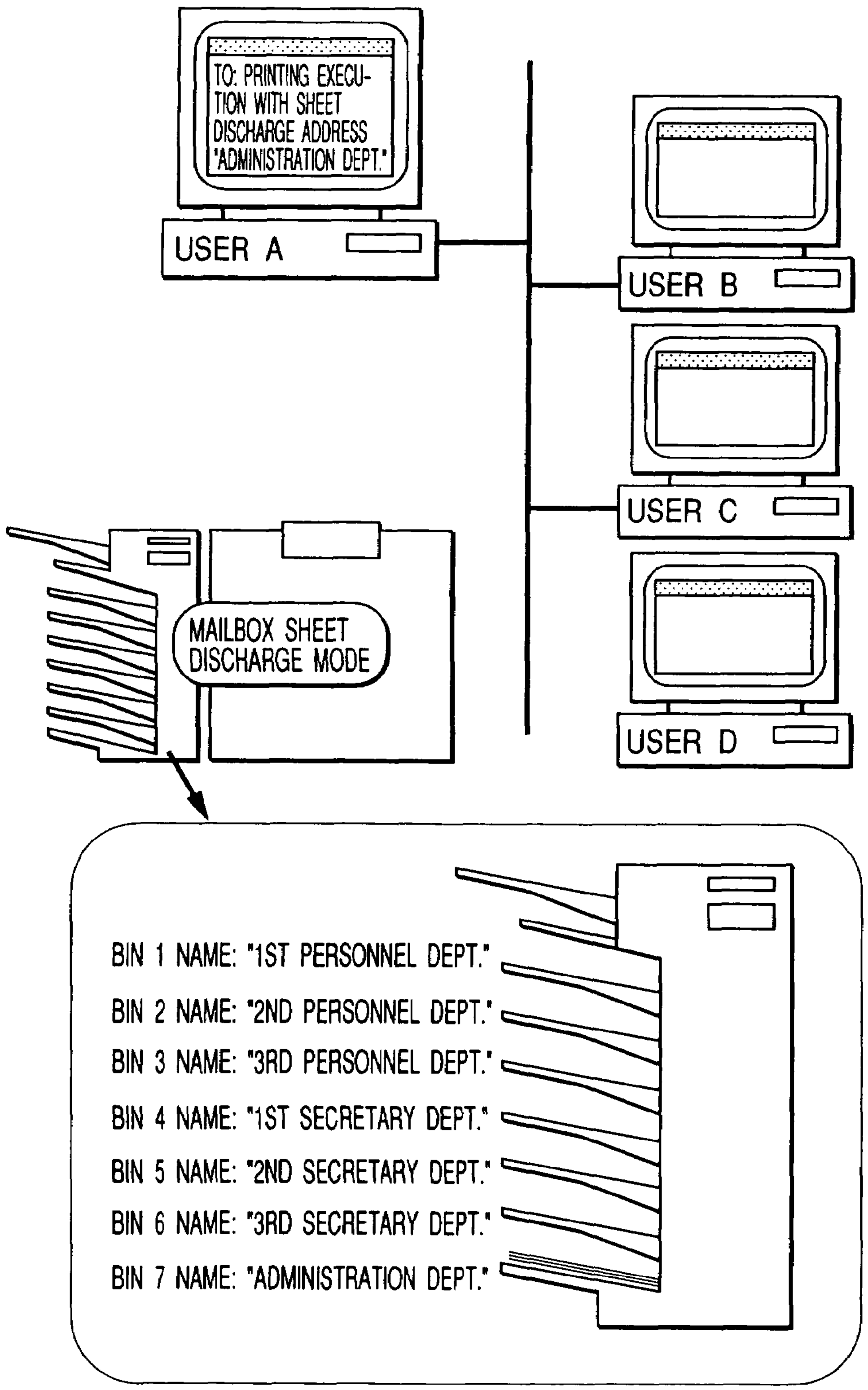
FIG. 33 is a diagram schematically showing a sorting operation of a printing job in the mailbox sheet discharge.
Figure 34:
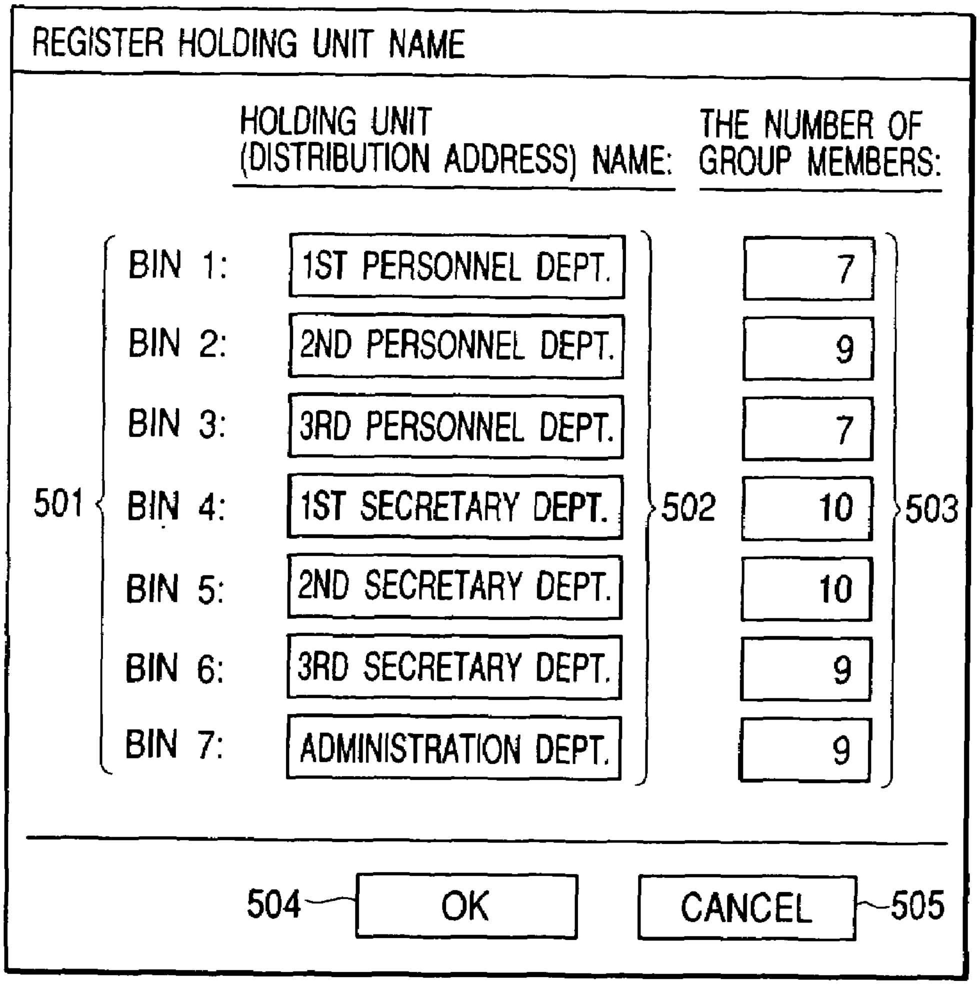
FIG. 34 is a diagram schematically showing an example of the holding unit name registration screen of the image recording apparatus.

FIG. 31 is a flow chart showing a ninth control process procedure of the image recording system to which the data processing apparatus and the image recording apparatus of the present invention are applicable, which corresponds to the process for updating information and display indicating the printer state on the host computer. In FIG. 30, the CPU (not shown) of the host computer 101 performs this process based on a program stored in the ROM or other storage media (or the printer driver unit 2102, the application unit 2101, the utility unit 2105 or the like performs this process). Incidentally, printer utilities running on the host computer or the printer driver determine whether the state change occurs in the printer or not on the basis of an event notification. It should be noted that symbols S1001 to S1003 show respective steps.

First, in the step S1001, the CPU waits until the event notification (the sheet discharge notification in the step S616 of FIG. 26 (the job end notification in the step S803 of FIG. 28), the error display notification in the step S617, the error display release notification in the step S619, etc.). If it is determined that the printer state is changed and the event notification is issued, the CPU receives the notified event and analyzes the content (a notification concerning name confusion of the holding unit, a job end notification, an error display notification, an error display release notification, etc.) in the step S1002.

Next, in the step S1003, the CPU displays the notification content on the display unit (CRT, LCD, etc.) or releases the display on the basis of the content of the analysis results, and notifies the user of the change in the printer state.

Second Embodiment

In the abovementioned first embodiment, it was explained that the image recording apparatus transmits the E-mail for distribution notification to the user at the distribution address after the printing in the mailbox sheet discharge mode ended. However, a printer utility or a printer driver on the host computer of the user at the printing designation origin may automatically transmit the E-mail to the user at the distribution address by using an E-mail account of the user at the printing origin when the sheet discharge end notification is received from the image recording apparatus.

In this case, the image recording apparatus 102 notifies the host computer of the E-mail addresses registered for all the holding units to which the sheet discharge was performed, instead of the sheet discharge notification by the E-mail in the step S804 of FIG. 28. Thus, in the step S1003 of FIG. 31, the host computer displays the notification content on the display unit (CRT, LCD, etc.) or releases the display on the basis of the content of the analysis results, and notifies the user of the change in the printer state. When the notification content is the notification which is subsequent to the job end notification and directed to the E-mail addresses registered for all the holding units to which the sheet discharge was performed, the E-mail as shown in FIG. 29 is transmitted to all the notified E-mail addresses.

As explained above, according to the present invention, it is possible to register the plural discrimination names to each of the plural holding units of the image recording apparatus, and it is also possible to register the same discrimination name to the plural holding units. Thus, the user can register the name of the user and the names of the plural groups to which this user belongs for one holding unit in the holding unit name registration, whereby the user can distribute the printing job to the plural name-registered holding units by designating one discrimination name being the sheet discharge address in the printing execution.

Further, even when it is intended to distribute the printing job to the holding unit which has been registered by the name of the specific user, it is possible to designate such the user name in the same environment. Thus, as if addresses are designated in the E-mail environment, it is possible to sort the printing jobs by designating the plural users by the name of the mailing list in which these users have been registered, or designating the ordinary user name.

Further, in the holding unit name registration, it is possible to register the name of the user and the name of the groups to which this user belongs for one holding unit, and besides the E-mail address of this user simultaneously. When the printing ended, it notifies by the E-mail the user to which the printing job was distributed that the distribution ended, whereby it is possible to notify the user of the information concerning the printing job. Also, the user on the side to which the printing job was distributed can easily know from the E-mail notification the information representing whether the printing job was distributed to this user, when the printing job of what content was distributed from whom how many, and the like. Thus, it is possible to surely perform the sheet discharge notification of the printing job in the mailbox sheet discharge.

Hereinafter, the configuration of a data process program which can be read by the image recording system to which the data processing apparatus and the image recording apparatus according to the present invention are applicable will be explained with reference to a memory map shown in FIG. 32.

FIG. 32 is a diagram schematically showing the memory map of the storage medium which stores various kinds of data process programs readable by the image recording system to which the data processing apparatus and the image recording apparatus according to the present invention are applicable.

Further, although not specifically shown, information for managing the program groups stored in the storage medium, e.g., version information, an author and the like may be stored, and information dependent on an OS and the like on the program reading side, e.g., icons and the like for discriminately displaying a program may be stored.

Further, data dependent on various kinds of programs may be managed in the directory. Further, if a program and data to be installed have been compressed, a program for decompressing them and the like may be stored.

The functions shown in FIGS. 7, 8, 9, 11, 20A, 20B, 21, 26, 27, 28, 30 and 31 in the present embodiment may be implemented by the host computer using a program to be externally installed. Further, in this case, the present invention is applied even in the case where information groups including programs are supplied to an output unit by storage media such as a CD-ROM, a flash memory, an FD and the like or from external storage media through a network.

As described above, it is needless to say that the objects of the present invention can be attained as well by supplying storage media recording program codes of software for realizing the functions of the abovementioned embodiments to a system or an apparatus, and by the system or a computer (a CPU or an MPU) of the apparatus reading out to execute program codes stored in storage media.

In this case, the program codes themselves read out from the storage media realize a novel function of the present invention, and the storage media storing the program codes constitutes the present invention.

As the storage media for supplying program codes, e.g., a floppy disk, a hard disk, an optical disk, a magnetooptical disk, a CD-ROM, a CD-R, a DVD-ROM, a magnetic tape, a nonvolatile memory card, a ROM, an EEPROM, a silicon disk and the like may be used.

Further, it is needless to say that the functions of the abovementioned embodiments are realized not only by executing a program code read out by a computer, but also by process that is actually performed in part or entirely an OS (operating system) and the like operating on the computer based on the instruction of the program code.

Further, it is needless to say that the functions of the abovementioned embodiments are realized by process that is actually performed in part or entirely by a CPU and the like provided in a function extension board or a function extension unit based on a instruction of a program code after the program code is read out from storage media and written in a memory provided in a function extension board inserted in a computer or a function extension unit connected to a computer.

Further, the present invention may be applied to a system composed of plural units, or may be applied to an apparatus consisting of one unit. Further, the present invention is naturally adaptable in a case where the present invention is attained by supplying a program to the system or the apparatus. In this case, the system or the apparatus can enjoy the effects of the present invention by reading out the storage media in which the program represented by software for attaining the present invention is stored to the system or the apparatus.

Further, by downloading a program represented by software for attaining the present invention from a database on a network by a communication program and reading it out, the system or the apparatus can enjoy effects of the present invention.

As explained above, according to the present embodiment, it is possible to perform on the computer of the manager or the like the registration for the bin on the side of the remote image recording apparatus 102, it is possible to register the plural discrimination names which includes the name of the user and the names of the plural groups to which this user belongs for each of the plural bins of the image recording apparatus, and it is possible to accept the designation of the name of the user and the names of the plural groups to which this user belongs. Then, the designated content is transmitted to the image recording apparatus through the network, and previously stored in the memory of the image recording apparatus 102 as the management information. In the printing, in order to be able to set on the computer of the client user the plural kind of sheet discharge address designation including the sheet discharge address designation by group name and the sheet discharge address designation by user name on one UI (see FIG. 4), the command representing the request of the management information is transmitted from the computer to the image recording apparatus, and as the response result of such the request, the bin registration information is transmitted from the image recording apparatus to the computer. Thus, the host computer captures the bin registration information including the plural discrimination names registered to each holding unit of the image recording apparatus from this image recording apparatus, and displays the UI based on the captured bin registration information. Then, the printing job including the sheet discharge address designation is created based on the user's set content on the UI, the created printing job is correlated with the image data to be distributed, and the obtained data is actually transmitted to the image recording apparatus 102 through the network. The image recording apparatus 102 analyzes the content of the printing job, performs the printing to the same page plural times corresponding to the number of copies, and distributes the printing data to the user's desired bins. Thus, the user can register the name of the user and the names of the plural groups to which this user belongs for one holding unit in the holding unit name registration, whereby the user can distribute the printing job to the plural name-registered holding units by designating one discrimination name being the sheet discharge address in the printing execution. Further, even when it is intended to distribute the printing job to the holding unit which has been registered by the name of the specific user, it is possible to designate such the user name in the same environment. Thus, as if addresses are designated in the E-mail environment, it is possible to sort the printing jobs by designating the plural users by the name of the mailing list in which these users have been registered, or by designating the ordinary user name, whereby it is possible to provide the flexible mailbox sheet discharge designation environment for flexibly dealing with various requests from each user and inhibiting a user's load.

While the invention has been described with reference to the structures disclosed herein, it is not confined to the details set forth and this application is intended to cover such modifications or changes as may come within the purpose of the improvements or the scope of the following claims.

What is claimed is:

1. An image recording apparatus which can connect with a sheet processing apparatus having plural storage units capable of storing sheets, comprising:

reception means for receiving data including image data from a remote data processing apparatus;

image recording means for recording an image based on the received image data, on a sheet; and control means for performing control, according to first data instructing to distribute the sheets to the storage unit belonging to which of plural groups of the grouped storage units is included in the data received from said remote data processing apparatus, to distribute the sheets on which the image data from said remote data processing apparatus has been recorded to the storage unit belonging to the group according to the first data, wherein said control means causes said image recording apparatus to execute more than once the recording of the same page of image data of a second-type job and causes said image recording apparatus to distribute a record result obtained by the recording to plural storage units of said sheet processing apparatus, in a case where said second-type job is accepted by said image recording apparatus from a first-type job in which the first data is not set and said second-type job in which the first data is set, wherein the first data is group-name information commonly utilized by the plural storage units, wherein said control means causes said image recording apparatus to execute the recording of the same page of the image data of the second-type job by the number of times corresponding to the number of members specified by the group-name information included in the second-type job, and causes to distribute the same recording result obtained by the recording to the plural storage units allocated to the plural members specified by the group-name information included in the second-type job, and wherein an arbitrary character string based on an operator's manual input using a user interface unit can previously be registered as the group-name information.

2. An apparatus according to claim 1, wherein, when second data discriminatingly instructing for each storage unit to distribute the sheets to which of the plural storage units is included in the data received from said remote data processing apparatus together with the first data, said control means performs control to distribute the sheets on which the image data from said remote data processing apparatus has been recorded to the storage units belonging to the group according to the first data and the storage unit according to the second data.

3. An apparatus according to claim 1, wherein, according to the first data is included in the data received from said remote data processing apparatus, the image recording of the image data of a same page is performed plural times without receiving the image data of the same page from said remote data processing apparatus plural times.

4. An apparatus according to claim 2, further comprising notification means for notifying each user belonging to the group according to the first data and a user according to the second data that the sheets were distributed.

5. An image recording apparatus according to claim 1, said image recording apparatus further comprising:

registration means for registering in a memory plural discrimination names to each of a plurality of holding units, the plural discrimination names including a user name and names of plural groups to which a user corresponding to the user name belongs and being transmitted from each of a plurality of superior apparatuses or directly designated from an operation unit;

discrimination name notification means for notifying a superior apparatus of the plural discrimination names registered by said registration means, in accordance with a request from said superior apparatus; and sheet discharge control means for discharging the printing job to which the discrimination name has been designated to the holding unit to which the discrimination name is the same as the discrimination name designated as a sheet discharge address to the printing job has been designated, wherein said image recording apparatus enables to accept a printing job in which the designation of the sheet discharge address based on the user name and the designation of the sheet discharge address based on the group name are selectively set with respect to each job, and wherein said controller means is further adapted to cause said image recording apparatus to execute, in a case where, from a third-type print job that the designation of the sheet discharge address based on the group name is not set and a fourth-type print job that the designation of the sheet discharge address based on the group name is at least set, said fourth-type print job is accepted by said image recording apparatus, the print process of the same page in said fourth-type print job plural times.

6. An apparatus according to claim 5, further comprising sheet discharge end notification means for notifying said superior apparatus of the end of an image recording process of the printing job, after the image recording process of the printing job was ended by said sheet discharge control means; and holding unit monitoring means for always monitoring a state of each of the holding units, updating the state, and if necessary notifying said superior apparatus of a change of the holding unit state.

7. An apparatus according to claim 5, wherein said registration means stores a discrimination name registration content including an E-mail address notified from said superior apparatus in the memory, and E-mail transmission means is provided to transmit an E-mail notifying the sheet discharge end in accordance with E-mail addresses registered to the respective holding units to which the printing job was discharged, after an image recording process of the printing job was ended by said sheet discharge control means.

8. An apparatus according to claim 7, wherein said E-mail transmission means controls whether or not an E-mail notification should be performed, on the basis of an instruction whether or not the E-mail notification designated to the printing job should be performed.

9. An apparatus according to claim 6, wherein said registration means stores a discrimination name registration content including an E-mail address in the memory, and said sheet discharge end notification means notifies said superior apparatus of the E-mail addresses registered to all the holding units to which the printing job was discharged, after the image recording process of the printing job was ended by said sheet discharge control means.

10. An apparatus according to claim 7, wherein the E-mail includes information such as a name of the user designating the printing job, a content of the printing job, the number of printing in the printing job, the number of output copies in the printing job, a date when the printing job was output, and information concerning the image recording apparatus from which the printing job was output, and said E-mail transmission means transmits the E-mail to the E-mail address of the user corresponding to the user name registered to the holding unit to which the printing job was discharged or the E-mail address of the user who belongs to the group corresponding to the group name registered to the holding unit to which the printing job was discharged.

11. An apparatus according to claim 5, wherein the discrimination name is information representing an owner who exclusively uses the holding unit, and is obtained by directly inputting or selecting a name according to a user's usage by the user on said superior apparatus or said operation unit.

12. An apparatus according to claim 5, wherein plural holding units are provided on the body of said image recording apparatus, or an option apparatus having plural holding units is connectable.

13. A control method for an image recording apparatus which can connect with a sheet processing apparatus having plural storage units capable of storing sheets, said method comprising:

a reception step of receiving data including image data from a remote data processing apparatus;

an image recording step of recording an image based on the received image data, on a sheet;

a control step of performing control, according to first data instructing to distribute the sheets to the storage unit belonging to which of plural groups of the grouped storage units is included in the data received from the remote data processing apparatus, to distribute the sheets on which the image data from the remote data processing apparatus has been recorded to the storage unit belonging to the group according to the first data;

a step of causing the image recording apparatus to execute more than once the recording of the same page of image data of a second-type job and causing said image recording apparatus to distribute a record result obtained by the recording to plural storage units of said sheet processing apparatus, in a case where said second-type job is accepted by said image recording apparatus from a first-type job in which the first data is not set and said second-type job in which the first data is set, wherein the first data is group-name information commonly utilized by the plural storage units, wherein said control step causes said image recording apparatus to execute the recording of the same page of the image data of the second-type job by the number of times corresponding to the number of members specified by the group-name information included in the second-type job, and causes to distribute the same recording result obtained by the recording to the plural storage units allocated to the plural members specified by the group-name information included in the second-type job, and wherein an arbitrary character string based on an operator's manual input using a user interface unit can previously be registered as the group-name information.

14. A control method for an image recording apparatus according to claim 13, said method further comprising:

a registration step of registering in a memory plural discrimination names to each of a plurality of holding units, the plural discrimination names including a user name and names of plural groups to which a user corresponding to the user name belongs and being transmitted from each of a plurality of superior apparatuses or directly designated from an operation unit;

a discrimination name notification step of notifying a superior apparatus of the registered plural discrimination names, in accordance with a request from the superior apparatus;

a sheet discharge step of discharging the printing job to which the discrimination name has been designated to the holding unit to which the discrimination name is the same as the discrimination name designated as a sheet discharge address to the printing job has been designated;

a step of enabling to accept the printing job in which the designation of the sheet discharge address based on the user name and the designation of the sheet discharge address based on the group name are selectively set with respect to each job; and an additional control step of causing the image recording apparatus to execute, in a case where, from a third-type print job that the designation of the sheet discharge address based on the group name is not set and a fourth-type print job that the designation of the sheet discharge address based on the group name is at least set, said fourth-type print job is accepted by the image recording apparatus, the print process of the same page in said fourth-type print job plural times.

15. A computer-readable storage medium which stores a program to cause an image recording apparatus which can connect with a sheet processing apparatus having plural storage units capable of storing sheets, to execute:

a reception step of receiving data including image data from a remote data processing apparatus;

an image recording step of recording an image based on the received image data, on a sheet; and a control step of performing control, according to first data instructing to distribute the sheets to the storage unit belonging to which of plural groups of the grouped storage units is included in the data received from the remote data processing apparatus, to distribute the sheets on which the image data from the remote data processing apparatus has been recorded to the storage unit belonging to the group according to the first data;

a step of causing the image recording apparatus to execute more than once the recording of the same page of image data of a second-type job and causing the image recording apparatus to distribute a record result obtained by the recording to plural storage units of said sheet processing apparatus, in a case where said second-type job is accepted by said image recording apparatus from a first-type job in which the first data is not set and said second-type job in which the first data is set, wherein the first data is group-name information commonly utilized by the plural storage units, wherein said control step causes said image recording apparatus to execute the recording of the same page of the image data of the second-type job by the number of times corresponding to the number of members specified by the group-name information included in the second-type job, and causes to distribute the same recording result obtained by the recording to the plural storage units allocated to the plural members specified by the group-name information included in the second-type job, and wherein an arbitrary character string based on an operator's manual input using a user interface unit can previously be registered as the group-name information.

16. A storage medium according to claim 15, further comprising:

a registration step of registering in a memory plural discrimination names to each of a plurality of holding units, the plural discrimination names including a user name and names of plural groups to which a user corresponding to the user name belongs and being transmitted from each of a plurality of superior apparatuses or directly designated from an operation unit;

a discrimination name notification step of notifying the superior apparatus of the registered plural discrimination names, in accordance with a request from the superior apparatus;

a sheet discharge step of discharging the printing job to which the discrimination name has been designated to the holding unit to which the discrimination name is the same as the discrimination name designated as a sheet discharge address to the printing job has been designated;

a step of enabling to accept the printing job in which the designation of the sheet discharge address based on the user name and the designation of the sheet discharge address based on the group name are selectively set with respect to each job; and an additional control step of causing the image recording apparatus to execute, in a case where, from a third-type print job that the designation of the sheet discharge address based on the group name is not set and a fourth-type print job that the designation of the sheet discharge address based on the group name is at least set, said fourth-type print job is accepted by the image recording apparatus, the print process of the same page in said fourth-type print job plural times.

17. An image recording system which can connect with a sheet processing apparatus having plural storage units capable of storing sheets, comprising:

reception means for receiving data including image data from a remote data processing apparatus;

image recording means for recording an image based on the received image data, on a sheet; and control means for performing control, according to first data instructing to distribute the sheets to the storage unit belonging to which of plural groups of the grouped storage units is included in the data received from said remote data processing apparatus, to distribute the sheets on which the image data from said remote data processing apparatus has been recorded to the storage unit belonging to the group according to the first data, wherein said control means causes said image recording system to execute more than once the recording of the same page of image data of a second-type job and causes said image recording system to distribute a record result obtained by the recording to plural storage units of said sheet processing apparatus, in a case where said second-type job is accepted by said image recording system from a first-type job in which the first data is not set and said second-type job in which the first data is set, wherein the first data is group-name information commonly utilized by the plural storage units, wherein said control means causes said image recording system to execute the recording of the same page of the image data of the second-type job by the number of times corresponding to the number of members specified by the group-name information included in the second-type job, and causes to distribute the same recording result obtained by the recording to the plural storage units allocated to the plural members specified by the group-name information included in the second-type job, and wherein an arbitrary character string based on an operator's manual input using a user interface unit can previously be registered as the group-name information.

* * * * *

UNITED STATES PATENT AND TRADEMARK OFFICE

CERTIFICATE OF CORRECTION

PATENT NO. : 7,253,920 B2
APPLICATION NO. : 09/739373
DATED : August 7, 2007
INVENTOR(S) : Hosoda It is certified that error appears in the above-identified patent and that said Letters Patent is hereby corrected as shown below:

SHEET 8:
FIG. 8, S313, “IN WHITCH” should read -- IN WHICH --.

COLUMN 1:
Line 39, “such the” should read -- such --; and
Line 45, “designated” should read -- designate --.

COLUMN 2:
Line 65, “bin 3", and” should read -- bin 3, ..., and --.

COLUMN 3:
Line 17, “(not-shown)” should read -- (not shown) --;
Line 38, “the post” should read -- post --; and
Line 56, “it is possible to designate” should be deleted.

COLUMN 4:
Line 31, “such the” should read -- such --.

COLUMN 5:
Line 7, “solved” should read -- can solve --.

COLUMN 6:
Line 54, “ended;” should read -- has ended; --.

COLUMN 8:
Line 4, “such the” should read -- such --;
Line 24, “ended,” should read -- has ended, --; and
Line 35, “notifies” should read -- notify --.

COLUMN 9:
Line 39, “Such the” should read -- Such --.

COLUMN 11:
Line 15, “candidates” should read -- the number of candidates --;
Line 18, “desired” should read -- preferred --;
Line 38, “group,” should read -- the group, --;
Line 51, “candidates” should read -- the number of candidates --; and
Line 55, “desired” should read -- preferred --.

UNITED STATES PATENT AND TRADEMARK OFFICE

CERTIFICATE OF CORRECTION

PATENT NO. : 7,253,920 B2
APPLICATION NO. : 09/739373
DATED : August 7, 2007
INVENTOR(S) : Hosoda It is certified that error appears in the above-identified patent and that said Letters Patent is hereby corrected as shown below:

COLUMN 12:
Line 14, "transits" should read -- transmits --;
Line 37, "ended" should read -- has ended --;
Line 66, "desired" should read -- preferred --; and
Line 67, "not shown." should read -- (not shown). --.

COLUMN 13:
Line 13, "(in case" should read -- (in the case --;
Line 17, "(in case" should read -- (in the case --; and
Line 47, "referred" should read -- referred to --.

COLUMN 14:
Line 18, "seven" should read -- of seven --;
Line 49, "communications," should read -- communications; --; and
Line 54, "seven" should read -- of seven --.

COLUMN 16:
Line 7, "In case" should read -- In the case --;
Line 18, "In case," should read -- In the case --;
Line 20, "a identifier" should read -- an identifier --;
Line 34, "In case" should read -- In the case --; and
Line 41, "In case" should read -- In the case --.

COLUMN 18:
Line 3, "is set "0 " " should read -- is set as "0" --;
Line 59, "the number corresponds" should read -- number corresponds to --;
Line 62, "whether there is other" should read -- it is determined whether there is another --;
Line 63, "other" should read -- another --;
Line 64, "repeated, conversely" should read -- repeated. Conversely, --; and
Line 65, "any" should be deleted.

COLUMN 19:
Line 3, "In responses to" should read -- In response to --.

COLUMN 20:
Line 31, "flow chart" should read -- a flow chart --.

UNITED STATES PATENT AND TRADEMARK OFFICE

CERTIFICATE OF CORRECTION

PATENT NO. : 7,253,920 B2
APPLICATION NO. : 09/739373
DATED : August 7, 2007
INVENTOR(S) : Hosoda It is certified that error appears in the above-identified patent and that said Letters Patent is hereby corrected as shown below:

COLUMN 22:
Line 12, "convert" should read -- converts --;
Line 18, "a operation" should read -- an operation --; and
Line 29, "FIG. 13 a" should read -- Fig. 13 is a --.

COLUMN 23:
Line 5, "of a various" should read -- of various --;
Line 9, "kind of" should read -- kinds of --;
Line 35, "etc.)" should read -- etc.). --; and
Line 64, "thesort" should read -- the sort --.

COLUMN 25:
Line 1, "and a" should read -- and an --;
Line 9, "emitted form" should read -- emitted from --; and
Line 48, "electro-photographic" should read -- electrophotographic --.

COLUMN 26:
Line 10, "fees" should read -- feed --;
Line 22, "are a first" should read -- are first --; and
Line 58, "face down" should read -- face down holding unit --.

COLUMN 27:
Line 18, "either" should be deleted; and
Line 26, "performs" should read -- perform --.

COLUMN 28:
Line 25, "ReporT)," should read -- Report), --.

COLUMN 29:
Line 3, "and is unput" should read -- and each is input --;
Line 21, "form an" should read -- from an --; and
Line 37, "bid map" should read -- bit map --.

COLUMN 31:
Line 23, "in case" should read -- in the case --;
Line 24, "in case" should read -- in the case --;
Line 25, "in case" should read -- in the case --;
Line 44, "in case" should read -- in the case --;
Line 45, "in case" should read -- in the case --; and
Line 46, "in case" should read -- in the case --.

CERTIFICATE OF CORRECTION

PATENT NO. : 7,253,920 B2
APPLICATION NO. : 09/739373
DATED : August 7, 2007
INVENTOR(S) : Hosoda It is certified that error appears in the above-identified patent and that said Letters Patent is hereby corrected as shown below:

COLUMN 33:
Line 4, "entity is" should read -- entity --.

COLUMN 35:
Line 18, "blocks" should read -- block --; and
Line 34, "the a page" should read -- in a page --.

COLUMN 36:
Line 34, "pages" should read -- page --; and
Line 40, "the stored" should read -- stores --.

COLUMN 38:
Line 34, "such the" should read -- such --; and
Line 63, "such the" should read -- such --.

COLUMN 39:
Line 47, "ended," should read -- has ended,. --.

COLUMN 40:
Line 22, "many." should read -- many and the like. --; and
Line 30, "such the" should read -- such --.

COLUMN 41:
Line 44, "ended." should read -- has ended --.

COLUMN 42:
Line 10, "such the" should read -- such --;
Line 20, "ended," should read -- has ended, --; and
Line 22, "ended," should read -- has ended, --.

COLUMN 43:
Line 13, "process that is actually performed in part or entirely an" should read -- a process that is actually performed in part or entirely by an --;
Line 17, "process" should read -- a process --;
Line 20, "a instruction" should read -- an instruction --;
Line 44, "includes" should read -- include --; and
Line 60, "such the" should read -- such --.

UNITED STATES PATENT AND TRADEMARK OFFICE

CERTIFICATE OF CORRECTION

PATENT NO. : 7,253,920 B2

APPLICATION NO. : 09/739373

DATED : August 7, 2007

INVENTOR(S) : Hosoda

It is certified that error appears in the above-identified patent and that said Letters Patent is hereby corrected as shown below:

COLUMN 44:

Line 18, "such the" should read -- such --.

Signed and Sealed this

Thirteenth Day of May, 2008

JON W. DUDAS

*Director of the United States Patent and Trademark Office*